(12) United States Patent
Kawazu et al.

(10) Patent No.: US 9,571,773 B2
(45) Date of Patent: Feb. 14, 2017

(54) DRIVE APPARATUS, DRIVE METHOD, AND ELECTRONIC DEVICE

(71) Applicant: Sony Corporation, Tokyo (JP)

(72) Inventors: Naoki Kawazu, Kanagawa (JP); Atsushi Suzuki, Kanagawa (JP); Yosuke Isoo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/524,169

(22) Filed: Oct. 27, 2014

(65) Prior Publication Data

US 2015/0124133 A1 May 7, 2015

(30) Foreign Application Priority Data

Nov. 1, 2013 (JP) ................................. 2013-228180

(51) Int. Cl.
| | |
|---|---|
| H04N 5/378 | (2011.01) |
| H04N 5/359 | (2011.01) |
| H04N 5/343 | (2011.01) |
| H04N 5/345 | (2011.01) |
| H04N 5/376 | (2011.01) |

(52) U.S. Cl.
CPC .............. *H04N 5/378* (2013.01); *H04N 5/343* (2013.01); *H04N 5/3456* (2013.01); *H04N 5/3591* (2013.01); *H04N 5/376* (2013.01)

(58) Field of Classification Search
CPC .............................. H04N 5/335; G06F 1/0328
USPC .......................................... 348/312; 327/106
See application file for complete search history.

(56) References Cited

U.S. PATENT DOCUMENTS

| | | | | |
|---|---|---|---|---|
| 6,307,786 | B1 * | 10/2001 | Ogane ..................... | G11C 16/08 257/E21.69 |
| 2007/0103456 | A1 * | 5/2007 | Kubota ................... | G09G 5/395 345/204 |
| 2008/0192133 | A1 * | 8/2008 | Abiru ..................... | H04N 3/1568 348/302 |
| 2008/0284876 | A1 * | 11/2008 | Makino ................... | H04N 3/155 348/231.99 |
| 2010/0302421 | A1 * | 12/2010 | Nakano ................... | H04N 5/335 348/296 |
| 2010/0328507 | A1 * | 12/2010 | Kikutsugi .......... | H04N 5/37457 348/296 |

(Continued)

FOREIGN PATENT DOCUMENTS

| | | |
|---|---|---|
| JP | 2008-288903 A | 11/2008 |
| JP | 2008-288904 A | 11/2008 |

*Primary Examiner* — Roberto Velez
*Assistant Examiner* — Cynthia Segura
(74) *Attorney, Agent, or Firm* — Sheridan Ross P.C.

(57) ABSTRACT

Provided is a drive apparatus including an address decoder circuit provided in each pixel row of a pixel array inside a solid state image sensor, the address decoder circuit being configured to generate at least a control signal to cause, based on a V address signal to identify the pixel row in the pixel array, pixels of the pixel row corresponding to the V address signal to perform a read operation that reads accumulated charges from the relevant pixels or an electronic shutter operation that sweeps away the accumulated charges from the relevant pixels. The V address signals of at least two mutually different systems are supplied to the address decoder circuit, and at least the two mutually different address decoder circuits generate the control signal for at least the two mutually different pixel rows within one horizontal scanning period.

20 Claims, 25 Drawing Sheets

(56) References Cited

U.S. PATENT DOCUMENTS

2015/0181147 A1* 6/2015 Luo ................... H04N 5/3741
                                                     348/308
2015/0229857 A1* 8/2015 Ichikawa ............. H04N 5/363
                                                     348/250

* cited by examiner

DRIVE APPARATUS, DRIVE METHOD, AND ELECTRONIC DEVICE

CROSS REFERENCE TO RELATED APPLICATIONS

This application claims the benefit of Japanese Priority Patent Application JP 2013-228180 filed Nov. 1, 2013, the entire contents of which are incorporated herein by reference.

BACKGROUND

The present disclosure relates to a drive apparatus, a drive method, and an electronic device.

In a solid state image sensor such as a CMOS image sensor, the address of pixels arranged two-dimensionally is specified for each pixel row and a signal is input into pixels in the specified pixel row to drive the pixels. Driving pixels means various operations such an accumulation operation of charges in accordance with incident light, a reset (that is, sweeping away of accumulated charges) operation of pixels, and a read operation of accumulated charges being performed by pixels by driving various transistors constituting pixels. A captured image is formed by various kinds of signal processing being performed on a signal (pixel signal) corresponding to accumulated charges read from each pixel.

In an imaging apparatus, for example, a digital still camera or the like, on the other hand, a total-pixel read mode in which a captured image is generated from pixel signals read from all pixels in the solid state image sensor and a thinning-out read mode in which a captured image is generated from pixel signals read from a row in every several rows may be switchable. By applying the thinning-out read mode, the total time to read pixel signals from a pixel array, that is, the photographing time to obtain a captured image for one frame can be reduced.

In thinning-out read mode, however, a problem of deterioration in quality of a captured image by blooming may be posed. Blooming is a phenomenon in which charges overflow from a photodiode of a pixel in a state in which charges are accumulated up to a saturation state into neighboring pixels after light is further incident thereon. The inflow of charges into neighboring pixels could cause quality deterioration such as color mixing. In thinning-out read mode, thinned-out pixels are maintained in a state in which charges are accumulated without being read during exposure time and are likely to cause blooming.

Various measures are taken against deterioration in quality caused by blooming. According to the technology described in JP 2008-288904A, for example, a sweeping operation of extra charges from pixels to be thinned out (hereinafter, referred to as an electronic shutter operation) and a read operation of pixel signals from other pixels (hereinafter, referred to simply as a read operation) are both performed within a horizontal scanning period (1H period) as a time necessary to scan pixels of one row when a photograph is taken in thinned-out read mode to prevent the occurrence of blooming JP 2008-288904A discloses a technology that prevents the occurrence of blooming caused by thinned-out pixels and also reduces the blanking period in which no pixel signal can be read out by providing an address selection circuit combining an address decoder and a 2-bit memory in each row of a pixel array and making a selection of the address of the pixel row in which the electronic shutter operation is performed and a selection of the pixel row in which the read operation is performed by the address selection circuit. JP 2008-288903A discloses a concrete control method of the address selection circuit described in JP 2008-288904A.

SUMMARY

However, in the technology described in JP 2008-288904A, for example, if an attempt is made to increase the ratio of pixels thinned out in thinning-out read mode to shorten the photographing time, the number of electronic shutter operations performed in a 1H period relatively increases. Thus, the time in which the address selection circuit makes a selection of the address of the pixel row in which the electronic shutter operation is performed also increases and therefore, it is difficult to reduce the 1H period and, as a result, it may be difficult to further accelerate the photographing time.

In view of the above circumstances, when the electronic shutter operation and the read operation are both performed within the 1H period to further improve quality, technology to still accelerate the photographing time by reducing the 1H period still further is demanded. Therefore, the present disclosure proposes a novel and improved drive apparatus capable of further improving quality and also still accelerating the photographing time, a drive method, and an electronic device.

According to an embodiment of the present disclosure, there is provided a drive apparatus including an address decoder circuit provided in each pixel row of a pixel array inside a solid state image sensor, the address decoder circuit being configured to generate at least a control signal to cause, based on a V address signal to identify the pixel row in the pixel array, pixels of the pixel row corresponding to the V address signal to perform a read operation that reads accumulated charges from the relevant pixels or an electronic shutter operation that sweeps away the accumulated charges from the relevant pixels. The V address signals of at least two mutually different systems are supplied to the address decoder circuit, and at least the two mutually different address decoder circuits generate the control signal for at least the two mutually different pixel rows within one horizontal scanning period.

According to another embodiment of the present disclosure, there is provided a drive method including generating a control signal for at least two mutually different pixel rows within one horizontal scanning period by at least two mutually different address decoder circuits by V address signals of at least two mutually different systems being supplied to the address decoder circuit provided in each of the pixel rows of a pixel array inside a solid state image sensor to generate the control signal to cause, based on the V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels.

According to another embodiment of the present disclosure, there is provided an electronic device including a solid state image sensor including a pixel array in which a plurality of pixels that receive light from a subject and outputs a pixel signal in accordance with the received light are arranged, an optical system configured to guide the light from the subject up to the solid state image sensor in a housing, and an image processing unit configured to generate a captured image as an image of the subject based on the pixel signals output from the plurality of pixels. The solid state image sensor includes an address decoder circuit provided in each pixel row of the pixel array to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels, the V address signals of at least two mutually different systems are supplied to the address decoder circuit, and at least the two mutually different address decoder circuits generate the control signal for at least the two mutually different pixel rows within one horizontal scanning period.

According to another embodiment of the present disclosure, there is provided a drive apparatus including an address decoder circuit provided in each pixel row of a pixel array inside a solid state image sensor to generate at least a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels. The address decoder circuit includes a memory circuit that holds the V address signal in response to a logical product of the V address signal and a memory input signal, and the address decoder circuit detects input of the memory input signal during a rise or a fall of the memory input signal.

According to another embodiment of the present disclosure, there is provided a drive method including detecting a memory input signal input into an address decoder circuit provided in each pixel row of a pixel array inside a solid state image sensor to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels to cause a memory circuit provided inside the address decoder circuit to hold the V address signal during at least one of a rise and a fall of the memory input signal. The memory circuit holds the V address signal in response to a logical product of the V address signal and the memory input signal.

According to another embodiment of the present disclosure, there is provided an electronic device including a solid state image sensor including a pixel array in which a plurality of pixels that receive light from a subject and outputs a pixel signal in accordance with the received light are arranged, an optical system configured to guide the light from the subject up to the solid state image sensor in a housing, and an image processing unit configured to generate a captured image as an image of the subject based on the pixel signals output from the plurality of pixels. The solid state image sensor includes an address decoder circuit provided in each pixel row of the pixel array to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels, the address decoder circuit includes a memory circuit holding the V address signal in response to a logical product of the V address signal and a memory input signal, and the address decoder circuit detects input of the memory input signal during at least one of a rise and a fall of the memory input signal.

According to the present disclosure, V address signals of mutually different systems are input into the address decoder circuit and at least two mutually different address decoder circuits generate control signals to cause pixels of at least two mutually different pixel rows to perform predetermined operations within one horizontal scanning period. Thus, the number of pixel rows that can be identified by V address signals within one horizontal scanning period increases and, for example, the number of pixel rows in which an electronic shutter operation is performed within one horizontal scanning period increases. Therefore, the one horizontal scanning period can be shortened as a result and even if both of an electronic shutter operation and a read operation are performed within 1H period, improvement in quality and faster photographing can both be realized.

Also according to the present disclosure, the address decoder circuit includes a memory circuit that holds a V address signal in response to a logical product of the V address signal and a memory input signal. The address decoder circuit detects input of the memory input signal during a rise or a fall of the memory input signal. With input of the memory input signal being detected by the address decoder circuit according to the double data rate (DDR) method, when compared with detection according to the single data rate (SDR) method, the issuing period of the V address signal in consideration of a margin for input of the memory input signal can be shortened. Therefore, the one horizontal scanning period can be shortened as a result and even if both of an electronic shutter operation and a read operation are performed within 1H period, improvement in quality and faster photographing can both be realized.

According to the present disclosure, as described above, quality can further be improved and at the same time, the photographing time can still be accelerated. However, the above effect is not necessarily restrictive and together with the above effect or instead of the above effect, any effect described in this specification or another effect that can be grasped from this specification may be achieved.

DETAILED DESCRIPTION OF THE EMBODIMENTS

Figure 1:
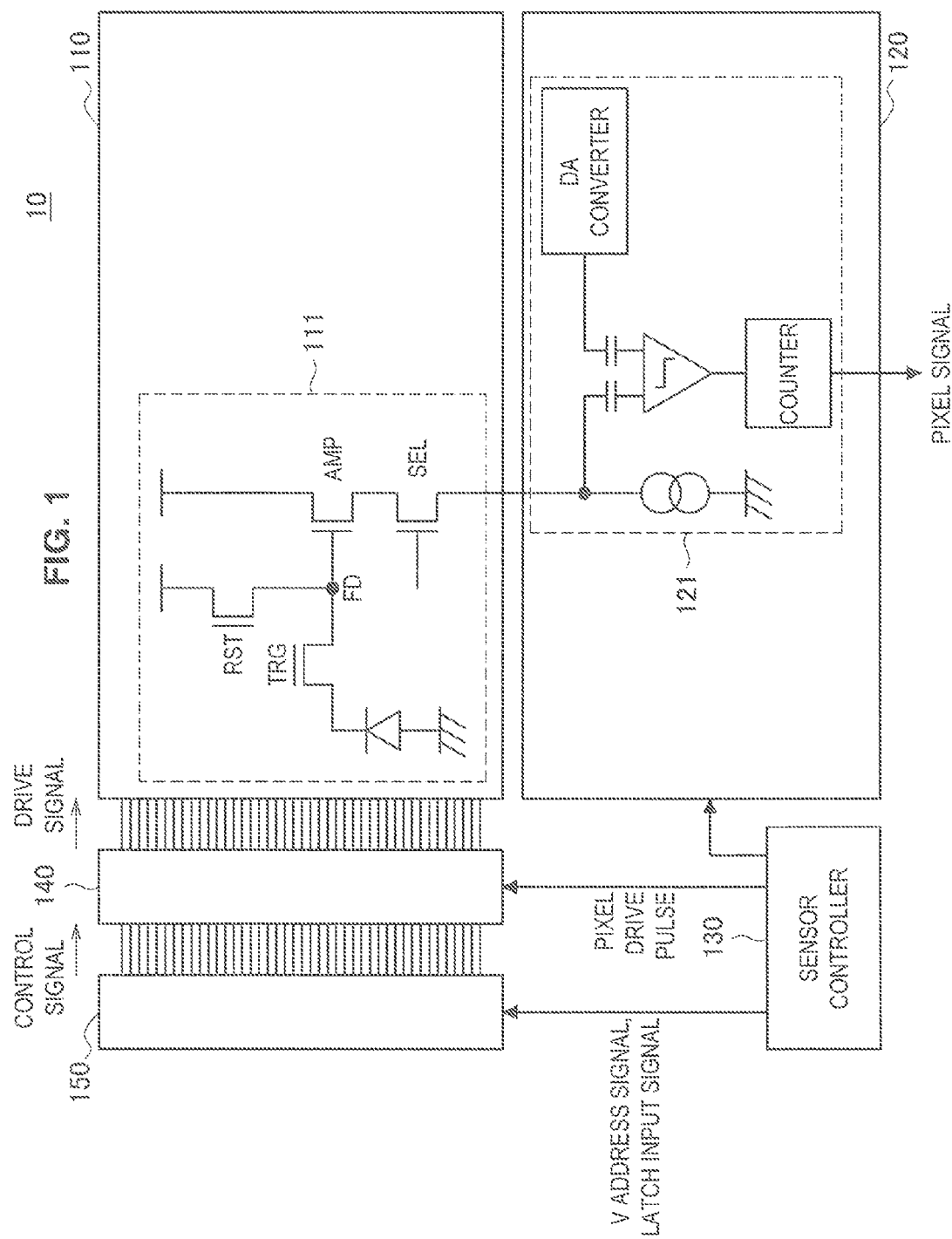
FIG. 1 is a schematic diagram showing an overall configuration of a solid state image sensor according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. First Embodiment
1-1. Overall Configuration of Solid state image sensor
1-2. Configuration of Pixel
1-3. Configuration of AD Conversion Circuit
1-4. Configuration of Pixel Timing Drive Circuit
1-5. Configuration of Address Decoder Circuit
1-6. Timing Chart of Whole Solid state image sensor
1-7 Summary of First Embodiment
2. Comparison with Common Solid state image sensor
2-1. Configuration of Common Address Decoder Circuit
2-2. Comparison of Address Decoder Circuit According to First Embodiment and Common Address Decoder Circuit
3. Second Embodiment
3-1. Configuration of Address Decoder Circuit
3-2. Timing Chart of Whole Solid state image sensor
3-3. Comparison of Address Decoder Circuit According to Second Embodiment and Common Address Decoder Circuit
4. Third Embodiment
4-1. Configuration of Address Decoder Circuit
4-2. Timing Chart of Whole Solid state image sensor
4-3. Comparison of Address Decoder Circuit According to Third Embodiment and Common Address Decoder Circuit
5. Modification
6. Application Example
7. Hardware Configuration
8. Supplementary Remarks The present technology can suitably be applied to the drive of a solid state image sensor in an imaging apparatus like, for example, a digital still camera and so on. Hereinafter, a suitable embodiment of the present disclosure will be described by taking an imaging mode called a thinned-out read mode in which a captured image is generated by pixel signals read from a row in every several rows or a column in every several columns in an imaging apparatus as an example. In thinned-out read mode, as described above, a sweeping operation of extra charges from pixels to be thinned out (hereinafter, referred to as an electronic shutter operation) and a read operation of pixel signals from other pixels (hereinafter, referred to simply as a read operation) are both performed within a horizontal scanning period (1H period) as a time necessary to scan pixels of one row.

However, the present technology is not limited to such an example and is applicable to the drive of the solid state image sensor in other photographing modes if an electronic shutter operation of predetermined pixels and a read operation of other pixels are both performed within a 1H period. As other photographing modes to which the present technology can be applied include, for example, a photographing mode in which pixels are more reliably reset by performing an electronic shutter operation on pixels before a read operation thereon being performed to reduce an after-image and the like.

1. First Embodiment

[1-1. Overall Configuration of Solid State Image Sensor]

First, an overall configuration of a solid state image sensor according to the first embodiment of the present disclosure will be described with reference to FIG. 1. FIG. 1 is a schematic diagram showing an overall configuration of a solid state image sensor according to the first embodiment of the present disclosure.

Referring to FIG. 1, a solid state image sensor 10 according to the first embodiment includes a pixel array unit 110, an AD converter 120, a sensor controller 130, a pixel timing drive unit 140, and an address decoder unit 150. The solid state image sensor 10 according to the first embodiment is, for example, a CMOS image sensor.

The pixel array unit 110 is configured by a plurality of pixels 111 being arranged two-dimensionally (with rows and columns). In the description that follows, regarding the arrangement direction of the pixels 111 in the pixel array unit 110 shown in FIG. 1, the left and right direction of paper is also called a row direction and the vertical direction of paper is also called column direction. For the sake of simplicity, FIG. 1 illustrates an equivalent circuit diagram of the one pixel 111 representing a plurality of the pixels 111. The pixel 111 receives light from a subject and also accumulates charges in accordance with the received light for each pixel after photoelectric conversion. Then, accumulated charges are propagated to the AD converter 120 via a vertical signal wire. A concrete configuration of the pixel 111 will be described in detail in [1-2. Configuration of Pixel] below. However, any configuration of a circuit in the pixel 111 according to the present embodiment may be adopted and the configuration may be other than the configuration shown in FIG. 1 or FIG. 2 described later.

The AD converter 120 performs an analog-digital conversion (AD conversion) that converts a potential of the vertical signal wire in accordance with charges propagated from the pixel 111 into a digital value. For the sake of simplicity, FIG. 1 representatively illustrates one AV conversion circuit 121 in the AD converter 120, but actually, a plurality of the AD conversion circuits 121 may be provided so as to correspond to each pixel column of the pixel array unit 110. An AD-converted signal by the AD conversion circuit 121 is output to a subsequent image processing circuit as a signal (pixel signal) in accordance with accumulated charges in the pixel 111. A captured image representing a subject is generated by various kinds of signal processing being performed on an output pixel signal from each pixel by the image processing circuit. Various kinds of publicly known processing may be applied as the processing to generate a captured image by the image processing circuit and therefore, a detailed description of the processing is omitted. A concrete configuration of the AD conversion circuit 121 will be described in detail in [1-3. Configuration of AD Conversion Circuit] below.

The sensor controller 130 is configured by various processors like, for example, a central processing unit (CPU) or a digital signal processor (DSP) and is an example of a control unit that controls the operation of the whole solid state image sensor 10. The sensor controller 130 may also be a small information processing apparatus including a processor like, for example, a microcontroller. For example, the sensor controller 130 controls the timing in which the pixel timing drive unit 140 outputs a drive signal to drive the pixel 111 to the pixel 111 based on a clock signal (CLK signal). More specifically, the sensor controller 130 causes the pixel timing drive unit 140 to generate a drive signal in predetermined timing by outputting a pixel drive pulse to the pixel timing drive unit 140 in the predetermined timing based on the CLK signal. The CLK signal may be generated by the sensor controller 130 itself or may be generated by another external circuit and provided to the sensor controller 130.

The sensor controller 130 also outputs a row address signal (V address signal) to identify the pixel row to be driven and a latch input signal to operate a latch circuit (details thereof will be described later) mounted in the address decoder unit 150 in predetermined timing to the address decoder unit 150 based on the CLK signal. The sensor controller 130 can also control the operation of each of the AD conversion circuits 121 by outputting a predetermined signal to the AD converter 120.

In the first embodiment, as described above, the sensor controller 130 can control the operation of the whole solid state image sensor 10 by controlling the operations of the pixel timing drive unit 140, the address decoder unit 150, and the AD converter 120. The control of the operations of the pixel timing drive unit 140, the address decoder unit 150, and the AD converter 120 by the sensor controller 130 is realized by a processor constituting the sensor controller 130 being operated according to a predetermined program. The sensor controller 130 is illustrated as a portion of the solid state image sensor 10 in the example shown in FIG. 1, but the present embodiment is not limited to such an example and the sensor controller 130 may be provided outside the solid state image sensor 10. When, for example, the solid state image sensor 10 is mounted on an electronic device such as an imaging apparatus, the solid state image sensor 10 may not include the function of the sensor controller 130 internally and instead, the processor controlling the operation of the electronic device may also include the function of the sensor controller 130.

The pixel timing drive unit 140 outputs a drive signal to drive the pixel 111 in predetermined timing to the pixel 111 in the pixel array unit 110 under the control of the sensor controller 130. The drive signal is a generic name for signals to drive each transistor in the pixel 111 and includes, for example, a TRG signal applied to a gate portion of a transfer transistor described later, an RST signal applied to the gate portion of a reset transistor, and a SEL signal applied to the gate portion of a select transistor. With a drive signal being input into the pixel 111 in the predetermined timing, the pixel 111 is driven to perform various operations such as an electronic shutter operation, a read operation, and an accumulation operation of charges.

In the present embodiment, though not illustrated in FIG. 1, the pixel timing drive unit 140 includes a plurality of pixel timing circuits provided in each pixel row of the pixel array unit 110 and a drive signal is output for each pixel row of the pixel array unit 110 by the pixel timing circuit. More specifically, the pixel timing drive unit 140 outputs a drive signal to pixels of a pixel row based on a control signal input from the address decoder unit 150 to drive pixels of the pixel row corresponding to V address signal and a pixel drive pulse input from the sensor controller 130. The pixel drive pulse is a generic name for pulses input to control the timing for the pixel timing drive unit 140 to generate a drive signal and includes, for example, a transfer transistor drive pulse (a TRG drive pulse or a TRG drive signal) that controls the timing to generate the above TRG signal, a reset transistor drive pulse (an RST drive pulse or an RST drive signal) that controls the timing to generate the above RST signal, and a select transistor drive pulse (a SEL drive pulse or a SEL drive signal) that controls the timing to generate the above SEL signal. A concrete configuration of the pixel timing circuit constituting the pixel timing drive unit 140 will be described in detail in [1-4. Configuration of Pixel Timing Drive Circuit] below.

The address decoder unit 150 generates, based on a V address signal to identify a pixel row in the pixel array unit 110, a control signal to drive pixels of the pixel row corresponding to the V address signal. The generated control signal is output to the pixel timing drive unit 140. In the present embodiment, though not illustrated in FIG. 1, the address decoder unit 150 includes a plurality of address decoder circuits provided in each pixel row of the pixel array unit 110 and a control signal is output for each pixel row of the pixel array unit 110 by the address decoder circuit. More specifically, the address decoder circuit outputs, based on a V address signal and a latch input signal input from the sensor controller 130, a control signal to the pixel timing drive circuit corresponding to the relevant pixel row. In the present embodiment, V address signals of at least two mutually different systems are supplied to the address decoder circuit of the address decoder unit 150. In the 1H period, at least two mutually different address decoder circuits generate control signals to cause the pixels 111 of at least the two mutually different pixel rows to perform an electronic shutter operation or a read operation. A concrete configuration of the address decoder circuit constituting the address decoder unit 150 will be described in detail in [1-5. Configuration of Address Decoder Circuit] below.

In the foregoing, an overall configuration of the solid state image sensor 10 according to the present embodiment has been described with reference to FIG. 1. Among components constituting the solid state image sensor 10 described above, the sensor controller 130, the pixel timing drive unit 140, and the address decoder unit 150 are components that process various signals to drive the solid state image sensor 10 and can be considered to be drive apparatuses to drive the solid state image sensor 10. Therefore, in the description that follows, an apparatus containing at least one of the sensor controller 130, the pixel timing drive unit 140, and the address decoder unit 150 will be called a drive apparatus. Also, a method of driving the drive apparatus will be called a drive method.

Next, each configuration of the solid state image sensor 10 will be described in detail.

[1-2. Configuration of Pixel]

Figure 2:
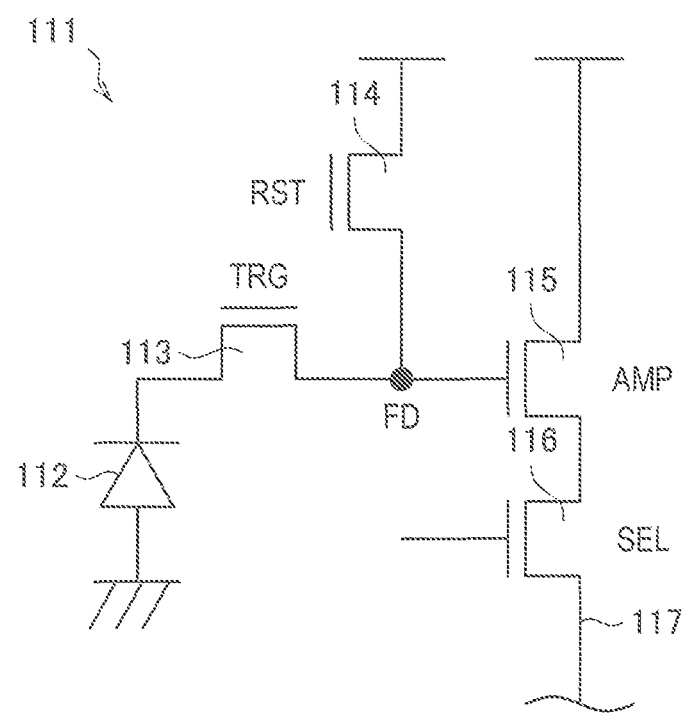
FIG. 2 is a diagram showing an equivalent circuit of a pixel according to the first embodiment.
Figure 3:
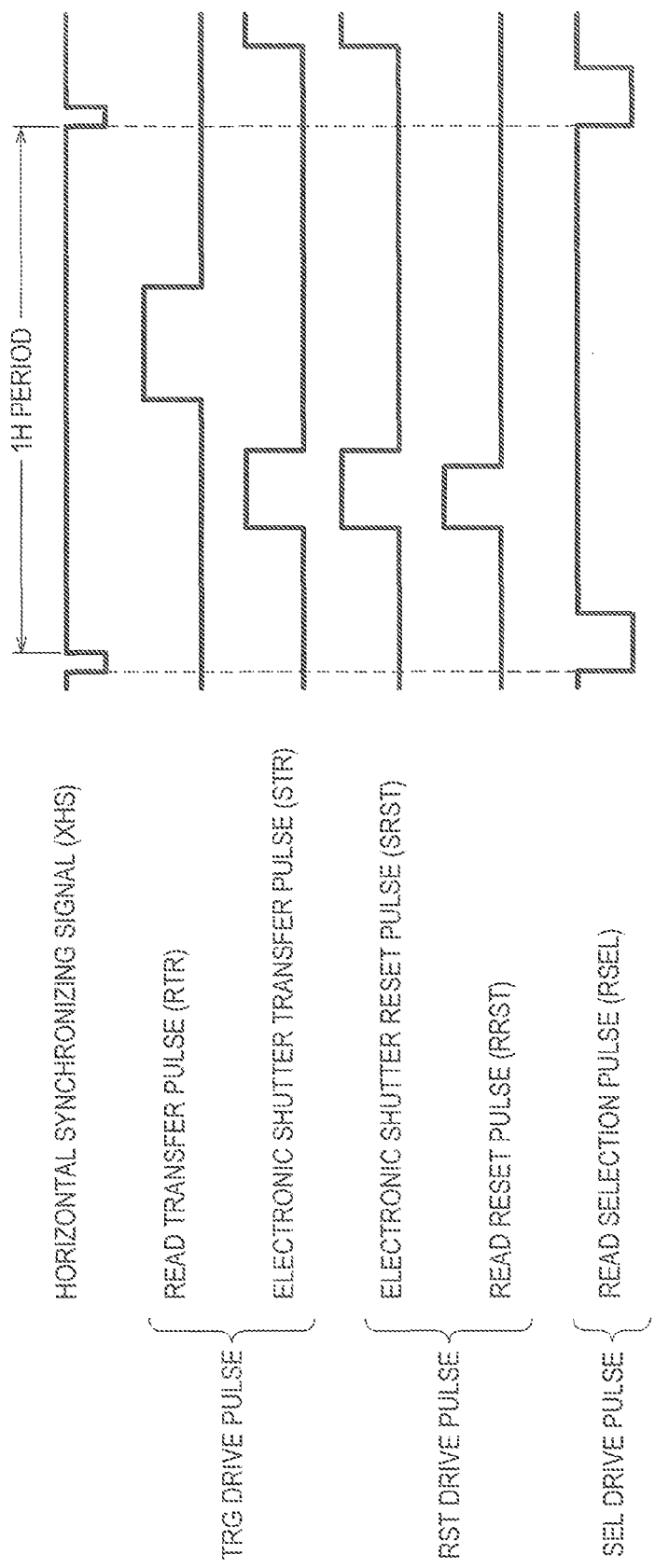
FIG. 3 is a timing chart showing an operation of the pixel shown in FIG. 2.

The configuration of the pixel 111 constituting the pixel array unit 110 described above will be described with reference to FIGS. 2 and 3. FIG. 2 is a diagram showing an equivalent circuit of the pixel 111. FIG. 3 is a timing chart showing the operation of the pixel 111 shown in FIG. 2.

Referring to FIG. 2, the pixel 111 according to the present embodiment includes a photodiode 112 as a photoreceptor that receives light from a subject and performs photoelectric conversion of the light, a transfer transistor 113 (TRG 113) that transfers charges accumulated by the photodiode 112 by photoelectric conversion to a floating diffusion (FD) amplifier, a reset transistor 114 (RST 114) that resets the potential of FD (FD potential), an amplifier transistor 115 (AMP 115) that propagates a signal in accordance with the FD potential via a source follower circuit, and a select transistor 116 (SEL 116) that selects the pixel row on which an electronic shutter operation or a read operation is performed. One of the source/drain (S/D) of the SEL 116 is connected to a vertical signal wire 117 and a signal in accordance with the FD potential is output to the subsequent AD conversion circuit 121 as the potential of the vertical signal wire 117. The configuration of the pixel 111 may be similar to a configuration of so-called 4-transistor pixels in a common CMOS image sensor and thus, a detailed description thereof is omitted.

The operation when the pixel 111 is driven will be described with reference to FIG. 3. In FIG. 3, the timing of pixel drive pulses (the TRG drive pulse, the RST drive pulse, and the SEL drive pulse) during electronic shutter operation and during read operation in one horizontal scanning period (1H period) is together illustrated. Actually, one of the electronic shutter operation and the read operation is performed in one of the pixel rows in some 1H period. With a pixel drive pulse being input from the sensor controller 130 into the pixel timing drive unit 140, drive signals (a TRG signal, an RST signal, and a SEL signal) to drive each transistor (the TRG 113, the RST 114, and the SEL 116) of the pixel 111 are generated by the pixel timing drive unit 140.

In the description of timing charts including FIG. 3, a case when accumulated charges in the photoreceptor 112 are electrons and each transistor constituting the pixel 111 is an nMOS transistor will be described. Therefore, each transistor is turned "ON" when the potential of a pulse representing a drive signal in a timing chart is high and each transistor is turned "OFF" when the potential of a pulse is low. However, the present embodiment is not limited to such an example and accumulated charges in the photoreceptor 112 may be holes and each transistor constituting the pixel 111 may be a pMOS transistor. When each transistor constituting the pixel 111 is a pMOS transistor, the relationship between high and low potentials of a pulse in an illustrated timing chart may be reversed, like embodiments described below, when necessary so that each circuit is driven.

First, the timing of a pixel drive pulse during electronic shutter operation will be described. An operation to sweep away charges accumulated in the photodiode 112 and the FD is performed. Therefore, during electronic shutter operation, as shown in FIG. 3, an electronic shutter transfer pulse (an STR pulse or an STR signal) as a TRG drive pulse during electronic shutter operation and an electronic shutter reset pulse (an SRST pulse or an SRST signal) as an RST drive pulse during electronic shutter operation are controlled so as to be both high in at least a predetermined period. With the STR pulse and the SRST pulse being input into the pixel timing drive unit 140, the TRG 113 and the RST 114 are turned ON in at least a predetermined period in the pixel 111 and charges accumulated in the photodiode 112 and the FD are discharged. As the timing of a pixel drive pulse during electronic shutter operation, the timing of a pixel drive pulse when an electronic shutter operation is performed in a common solid state image sensor may be applied.

Next, the timing of a pixel drive pulse during read operation will be described. During read operation, an operation to output the potential corresponding to charges accumulated in the photodiode 112 to the subsequent AD conversion circuit 121 via the vertical signal wire 117 is performed. In FIG. 3, the timing of the pixel drive pulse after charges are accumulated in a predetermined time in the photodiode 112 is illustrated. During read operation, as shown in FIG. 3, a read reset pulse (an RRST pulse or an RRST signal) as an RST drive pulse during read operation is first set to a high state. At this point, a read transfer pulse (an RTR pulse or an RTR signal) as a TRG drive pulse during read operation does not change from when charges are accumulated and is maintained in a low state. With the RTR pulse and the RRST pulse as described above being input into the pixel timing drive unit 140, only the RST 114 is turned ON while the TRG 113 remains OFF in the pixel 111 and the FD potential is reset while charges are accumulated in the photodiode 112. During read operation, as shown in FIG. 3, a read select pulse (an RSEL pulse or an RSEL signal) as a SEL drive pulse during read operation is maintained in a high state and the potential of the vertical signal wire 117 corresponding to the FD potential in a reset state is output to the subsequent AD conversion circuit 121 as the potential of a pre-data phase (P phase).

During read operation, the RRST pulse is next set to a low state and subsequently, the RTR pulse is set to a high state. With the RTR pulse and the RRST pulse as described above being input into the pixel timing drive unit 140, the TRG 113 is turned ON while the RST 114 remains OFF in the pixel 111 and thus, charges accumulated in the photodiode 112 are transferred to the FD. The potential of the vertical signal wire 117 corresponding to the FD potential in accordance with transferred charges is output to the subsequent AD conversion circuit 121 as the potential of a data phase (D phase). In this manner, the potential in the P phase and the potential in the D phase are continuously output to the AD conversion circuit 121 during read operation. As the timing of a pixel drive pulse during read operation, the timing of a pixel drive pulse when a read operation is performed in a common solid state image sensor may be applied.

[1-3. Configuration of AD Conversion Circuit]

Figure 4:
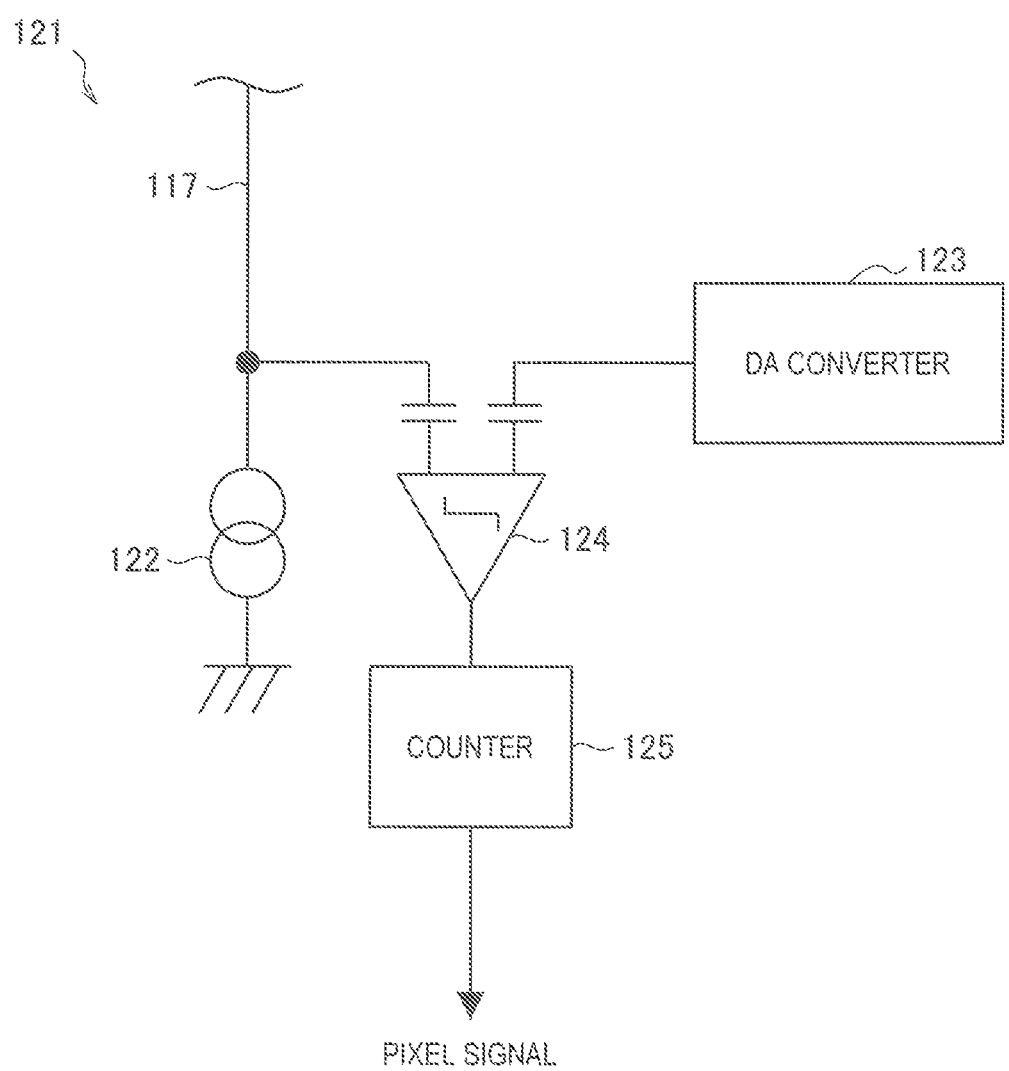
FIG. 4 is a block diagram showing an outline configuration of an AD conversion circuit according to the first embodiment.
Figure 5:
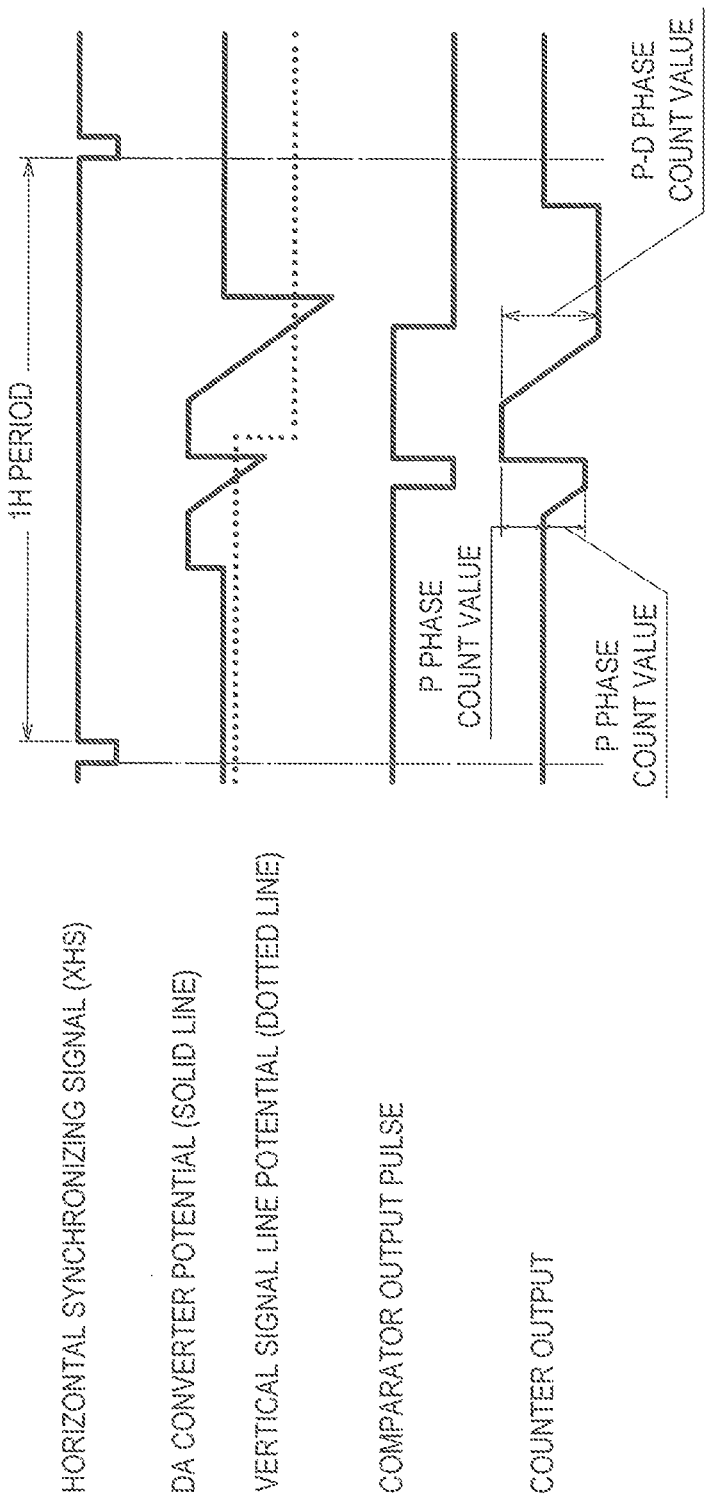
FIG. 5 is a timing chart showing the operation of the AD conversion circuit during read operation.

Next, the AD conversion circuit 121 constituting the aforementioned AD converter 120 will be described with reference to FIGS. 4 and 5. FIG. 4 is a block diagram showing an outline configuration of the AD conversion circuit 121 according to the first embodiment. FIG. 5 is a timing chart showing the operation of the AD conversion circuit 121 during read operation.

Referring to FIG. 4, the AD conversion circuit 121 according to the present embodiment includes a constant current circuit 122 to establish a source follower connection to the AMP 115 of the pixel 111 via the vertical signal wire 117, a single-sloped DA converter 123, a comparator 124 that compares the potential of the vertical signal wire 117 and the potential of the DA converter 123, and a counter 125 that converts an analog value into a digital value. The configuration of the AD conversion circuit 121 may be similar to a configuration of an AD conversion circuit in a common CMOS image sensor.

The operation of the AD conversion circuit 121 will be described with reference to FIG. 5. In FIG. 5, the potential (vertical signal wire potential) of the vertical signal wire 117, the potential (DA converter potential) of the DA converter 123, the output pulse (comparator output pulse) of the comparator 124, and the output (counter output) of the counter 125 in a 1H period during read operation are illustrated. As described in [1-2. Configuration of Pixel] described above, the potential in the P phase and the potential in the D phase are continuously input into the AD conversion circuit 121. Therefore, as shown in FIG. 3, the vertical signal wire potential changes its value stepwise matching the potential in the P phase and the potential in the D phase.

The DA converter 123 is configured to output a ramp slope and the comparator 124 is configured to output a reversed pulse in timing when the DA converter potential falls below the vertical signal wire potential. The counter 125 continues to count after starting to count until a reversed pulse is output from the comparator 124. While counting for the potential in the P phase and counting for the potential in the D phase are both counting down, the counter 125 is configured to reverse the count value corresponding to the P phase after counting for the potential in the P phase is completed and therefore, the count value for the potential in the D phase is a count value of the P phase-D phase obtained by performing correlated double sampling processing (CDS processing) thereon. A publicly known and generally used technique is applicable to the CDS processing by the counter 125 and thus, a detailed description thereof is omitted.

In the foregoing, the configuration of the AD conversion circuit 121 has been described with reference to FIGS. 4 and 5. The count value of the counter 125 on which CDS processing has been performed is output to the image processing circuit provided in subsequent processing as a pixel signal of the pixel 111. The operation of each element in the AD conversion circuit 121 as described above can be controlled by the sensor controller 130.

[1-4. Configuration of Pixel Timing Drive Circuit]

Figure 6:
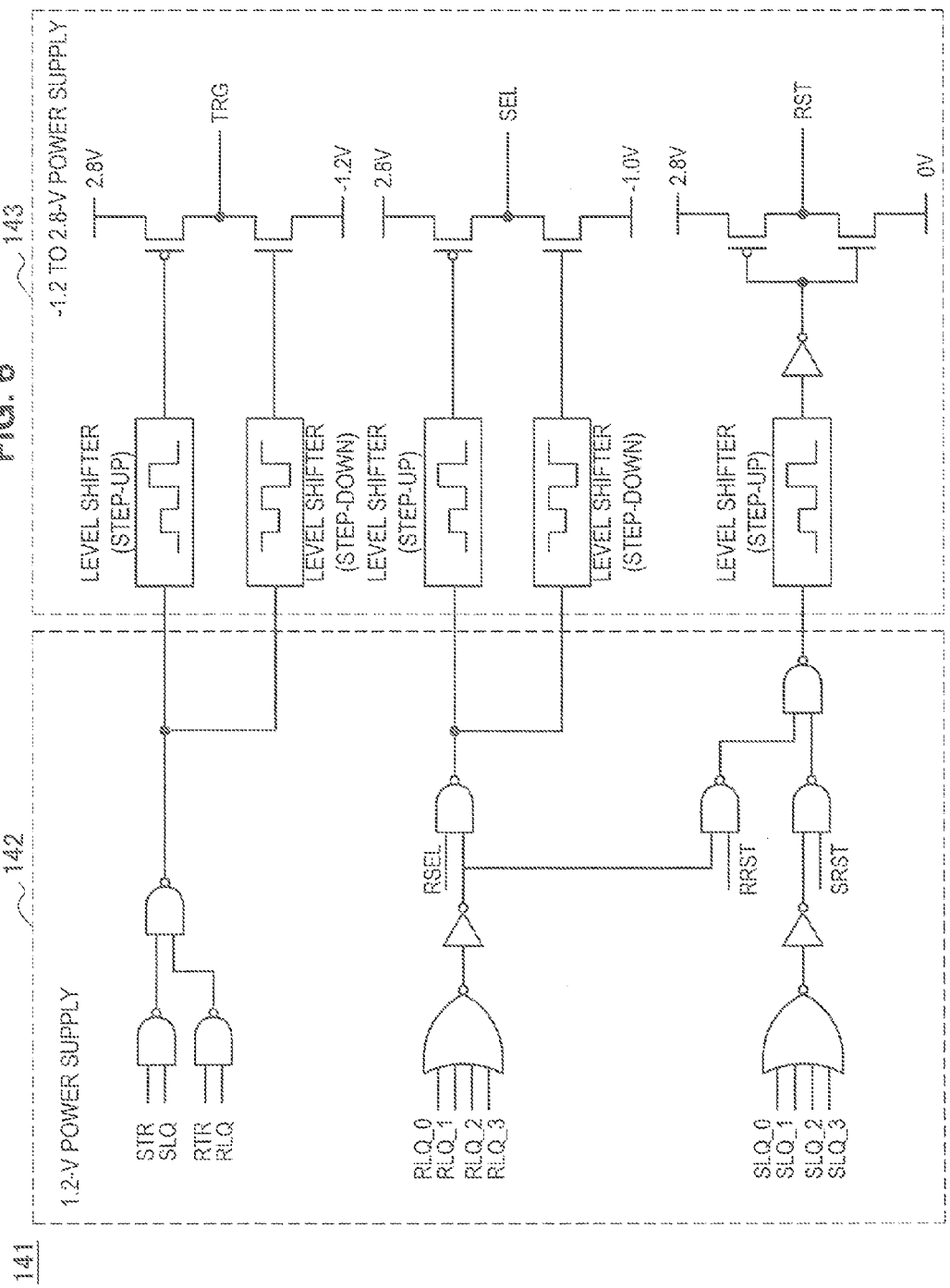
FIG. 6 is a diagram showing the equivalent circuit of a pixel timing drive circuit according to the first embodiment.

Next, the configuration of the pixel timing drive circuit constituting the pixel timing drive unit 140 described above will be described with reference to FIG. 6. FIG. 6 is a diagram showing an equivalent circuit of a pixel timing drive circuit according to the first embodiment. In FIG. 6, an equivalent circuit of one pixel timing circuit is shown, but actually, a plurality of pixel timing circuits may be provided in each pixel row of the pixel array unit 110.

Referring to FIG. 6, a pixel timing drive circuit 141 according to the present embodiment is configured to generate a TRG signal, an RST signal, and a SEL signal as drive signals based on an electronic shutter latch output signal (SLQ signal), a read latch output signal (RLQ signal), a TRG drive pulse (an RTR pulse and an STR pulse), an RST drive pulse (an RRST pulse and an SRST pulse), and a SEL drive pulse (an RSEL pulse). With the TRG signal, the RST signal, and the SEL signal being applied to the gate portion of the TRG 113, the RST 114, and the SEL 116 of the pixel 111 respectively, the pixel 111 performs predetermined operations such as an electronic shutter operation, a read operation, or an accumulation operation.

The SLQ signal and the RLQ signals are control signals generated by the address decoder unit 150. When, for example, the SLQ signal is high, the pixel timing drive circuit 141 generates a drive signal such that an electronic shutter operation is performed on pixels of the relevant pixel row and similarly, when the RLQ signal is high, the pixel timing drive circuit 141 generates a drive signal such that a read operation is performed on pixels of the relevant pixel row. Thus, the SLQ signal can be considered to be a signal indicating whether an electronic shutter operation is performed on pixels of the relevant pixel row and the RLQ signal can be considered to be a signal indicating whether a read operation is performed on pixels of the relevant pixel row. The SLQ signal and the RLQ signal will be described in detail in [1-5. Configuration of Address Decoder Circuit] below. A TRG drive pulse, an RST drive pulse, and a SEL drive pulse as pixel drive pulses are input from the sensor controller 130 into the pixel timing drive circuit 141 in timing shown in, for example, FIG. 3.

Referring to FIG. 6, the pixel timing drive circuit 141 includes a pre-stage unit 142 driven by a 1.2 V power supply and a post-stage unit 143 driven between −1.2 V and 2.8 V. The pre-stage unit 142 performs processing based on predetermined logic on an SLQ signal and an RLQ signal input from the prior address decoder unit 150 and an RTR pulse, an STR pulse, an RRST pulse, an SRST pulse, and an RSEL pulse input from the sensor controller 130 and outputs a processing result to the post-stage unit 143.

The post-stage unit 143 includes a level shifter that steps up or steps down an output signal from the pre-stage unit 142 and a driver that applies a TRG signal, an RST signal, and a SEL signal to the TRG 113, the RST 114, and SEL 116 of the pixel 111 respectively. The level shifter that steps up is configured to step up, for example, a signal of 1.2 V to 2.8 V and the level shifter that steps down is configured to step down, for example, a signal of 1.2 V to −1.2 V. For a TRG signal, for example, the TRG signal stepped up to 2.8 V when the TRG 113 is turned ON is applied to the gate portion of the TRG 113 and the TRG signal stepped down to −1.2 V when the TRG 113 is turned OFF is applied to the gate portion of the TRG 113.

The circuit configuration of the pixel timing drive circuit 141 shown in FIG. 6 is only an example and the pixel timing drive circuit 141 may have a different circuit configuration having the above function.

[1-5. Configuration of Address Decoder Circuit]

Figure 7:
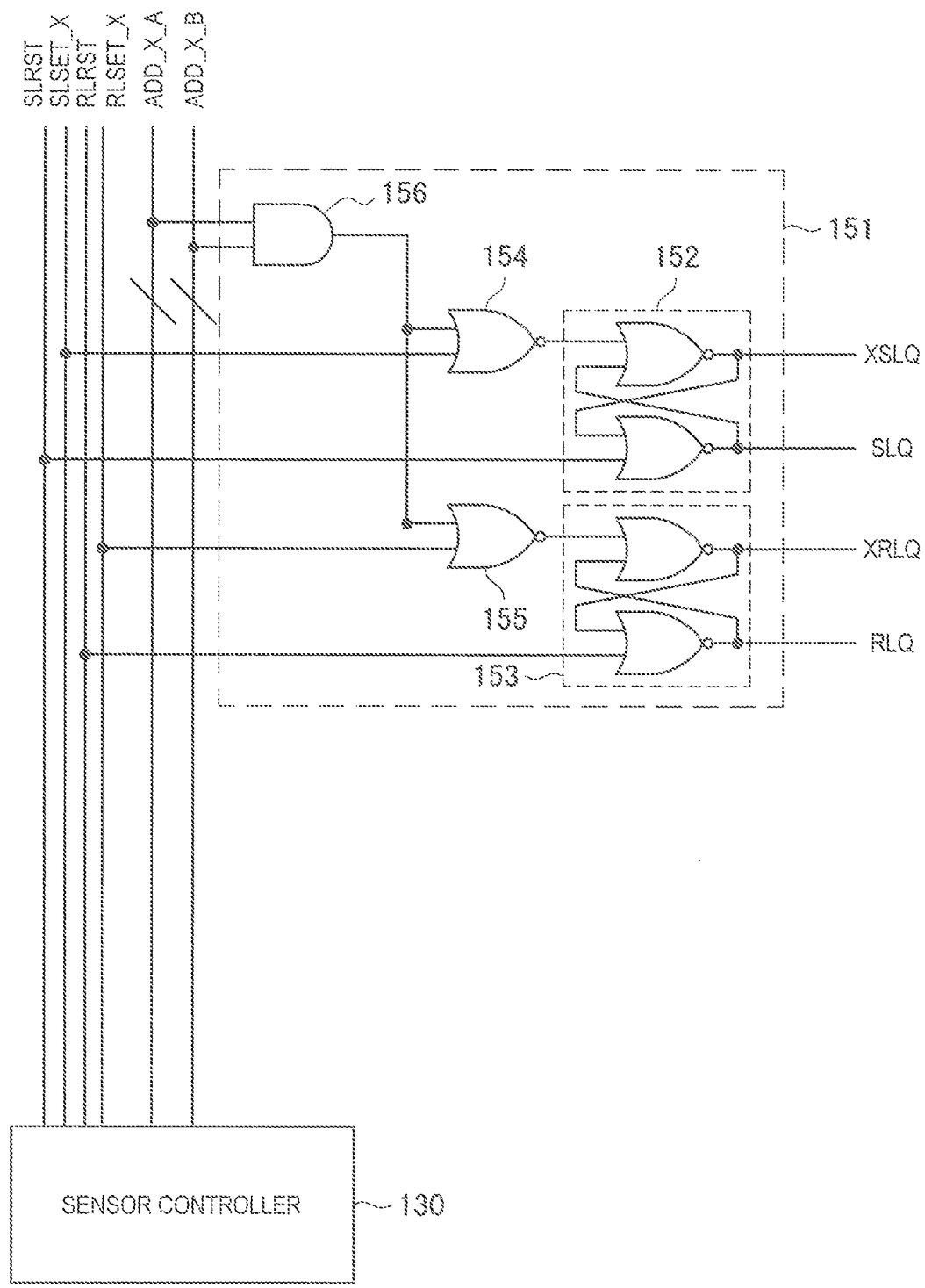
FIG. 7 is a diagram showing the equivalent circuit of an address decoder circuit according to the first embodiment.
Figure 8:
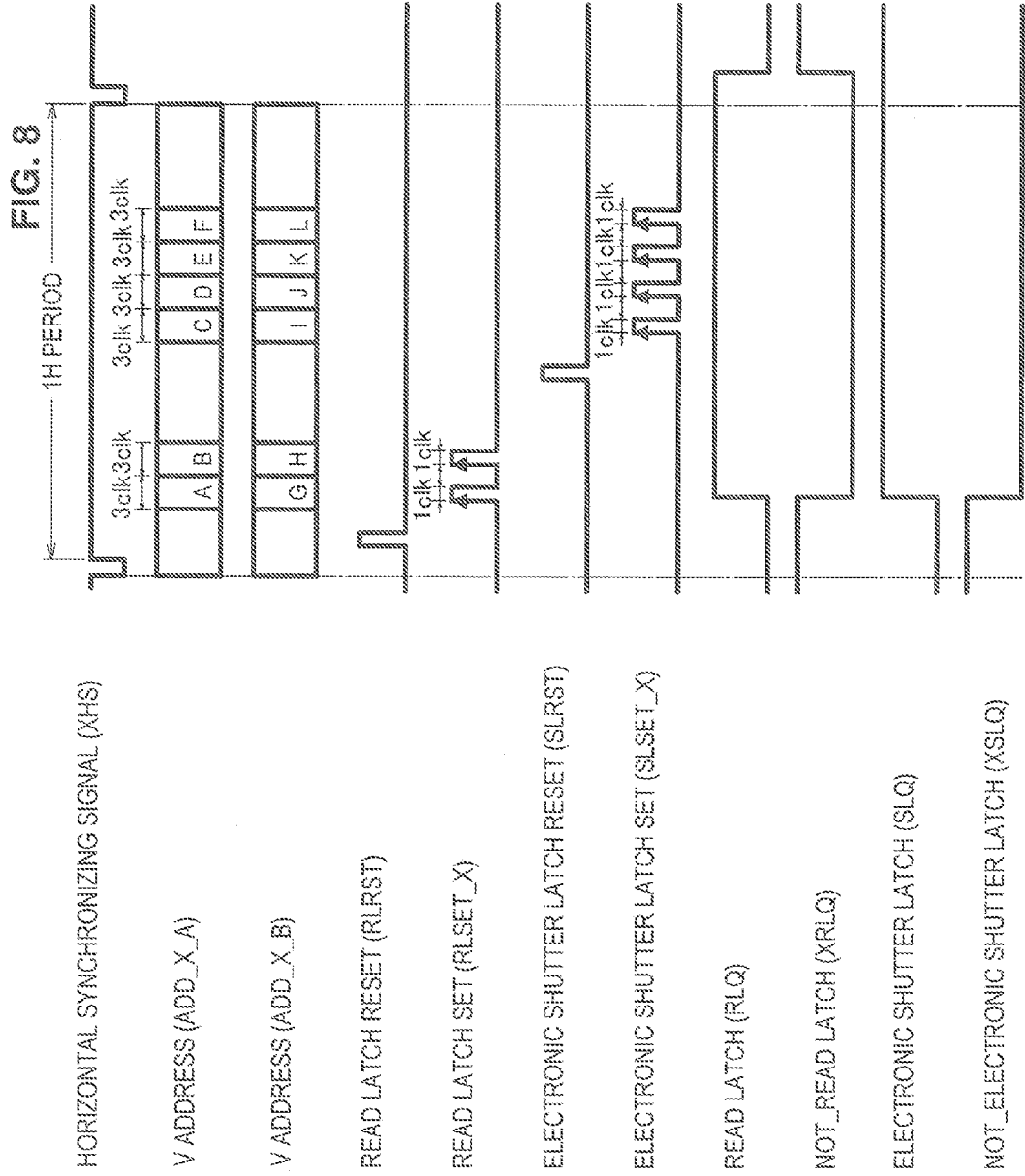
FIG. 8 is a diagram showing a timing chart of the operation of the address decoder circuit shown in FIG. 7.

Next, with reference to FIGS. 7 and 8, the configuration of the address decoder circuit constituting the above address decoder unit 150 will be described. FIG. 7 is a diagram showing the equivalent circuit of an address decoder circuit according to the first embodiment. FIG. 8 is a diagram showing a timing chart of the operation of the address decoder circuit shown in FIG. 7. In FIG. 7, an equivalent circuit of one address decoder circuit is shown, but actually, a plurality of address decoder circuits may be provided in each pixel row of the pixel array unit 110.

Referring to FIG. 7, an address decoder circuit 151 according to the present embodiment includes two latch circuits 152, 153 and is configured to generate an electronic shutter latch output signal (SLQ signal), a negative logic (NOT) electronic shutter latch output signal (XSLQ signal), a read latch output signal (RLQ signal), and a negative logic (NOT) read latch output signal (XRLQ signal) as control signals based on latch input signals (an SLRST signal, an SLSET_X signal, an RLRST signal, and an RLSET_X signal) as an input signal into the latch circuits 152, 153 and two-system V address signals (an ADD_X_A signal and an ADD_X_B signal) to identify the pixel row in the pixel array unit 110. The latch circuits 152, 153 are, for example, so-called SR latches. Latch input signals and V address signals are input from the sensor controller 130 into the address decoder circuit 151.

In the first embodiment, the one latch circuit 152 of the latch circuits 152, 153 is an electronic shutter operation latch circuit that outputs a control signal to cause pixels of the pixel row identified by the V address signal to perform an electronic shutter operation. The SLRST signal and the SLSET_X signal among the above latch input signals are signals related to the electronic shutter operation. The SLRST signal is applied to an input terminal on a Reset side of the latch circuit 152 and is an electronic shutter latch reset signal to reset the latch circuit 152. The SLSET_X signal is applied to an input terminal on a Set side of the latch circuit 152 and is an electronic shutter latch reset signal to cause the latch circuit 152 to hold the value of the V address signal.

The latch circuit 152 generates an electronic shutter latch output signal (SLQ signal) as a signal indicating whether an electronic shutter operation is performed for the relevant pixel row and a negative logic (NOT) electronic shutter latch output signal (XSLQ signal) as a negative logic signal of the SLQ signal based on the V address signal, the SLRST signal, and the SLSET_X signal. In the example shown in FIG. 7, the SLRST signal input from the sensor controller 130 is directly input into the input terminal on the Reset side of the latch circuit 152. A NOR gate 154 is provided prior to the latch circuit 152 and a logical sum of the SLSET_X signal by the NOR gate 154 and a V address signal is input into the input terminal on the Set side of the latch circuit 152.

The other latch circuit 153 is a read operation latch circuit that outputs a control signal to cause pixels of the pixel row identified by the V address signal to perform a read operation. The RLRST signal and the RLSET_X signal among the above latch input signals are signals related to the read operation. The RLRST signal is applied to an input terminal on a Reset side of the latch circuit 153 and is a read latch reset signal to reset the latch circuit 153. The RLSET_X signal is applied to an input terminal on a Set side of the latch circuit 153 and is a read latch reset signal to cause the latch circuit 153 to hold the value of the V address signal.

The latch circuit 153 generates a read latch output signal (RLQ signal) as a signal indicating whether a read operation is performed for the relevant pixel row and a negative logic (NOT) read latch output signal (XRLQ signal) as a negative logic signal of the RLQ signal based on the V address signal, the RLRST signal, and the RLSET_X signal. In the example shown in FIG. 7, the RLRST signal input from the sensor controller 130 is directly input into the input terminal on the Reset side of the latch circuit 153. A NOR gate 155 is provided prior to the latch circuit 153 and a logical sum of the RLSET_X signal by the NOR gate 155 and a V address signal is input into the input terminal on the Set side of the latch circuit 153.

The latch circuits 152, 153 are an example of a memory circuit that holds a predetermined signal value. In the first embodiment, the memory circuit at least has a function to hold a V address signal in response to a logical product of the V address signal and a memory input signal. The memory input signal may include a read memory signal to cause the memory circuit to hold a V address signal that identifies the pixel row for which a read operation is performed and an electronic shutter memory signal to cause the memory circuit to hold a V address signal that identifies the pixel row for which an electronic shutter operation is performed and the sensor controller 130 may cause the address decoder circuit 151 to generate a control signal to cause pixels of the pixel row identified by the V address signal to perform a read operation or an electronic shutter operation by inputting one of the read memory signal and the electronic shutter memory signal into the address decoder circuit 151 together with the V address signal.

In the first embodiment, a memory circuit having such a function is realized by the latch circuits 152, 153 as SR latches. Latch set signals (the SLSET_X signal and the RLSET_X described above) applied to the input terminal on the Set side of the SR latch are input from the sensor controller 130 into the latch circuits 152, 153 as memory input signals and the latch circuits 152, 153 can hold a V address signal in response to a logical product of the V address signal and the relevant latch set signal. The latch set signal may include a read latch set signal (RLSET_X signal corresponding to the above read memory signal) and an electronic shutter latch set signal (SLSET_X signal corresponding to the above electronic shutter memory signal) and the sensor controller 130 may cause the address decoder circuit 151 to generate a control signal to cause pixels of the pixel row identified by the V address signal to perform a read operation or an electronic shutter operation by inputting one of the RLSET_X signal and the SLSET_X signal into the address decoder circuit 151 together with the V address signal.

In the first embodiment, as shown in FIG. 7, V address signals (the ADD_X_A signal and the ADD_X_B signal) of two mutually different systems are input into the address decoder circuit 151. The address decoder circuit 151 is provided with an AND gate 156 prior to NOR gates 154, 155 and a logical product of the ADD_X_A signal and the ADD_X_B signal by the AND gate 156 is input into the NOR gates 154, 155 as a V address signal. In FIG. 7, the signal wire indicating the ADD_X_A signal or the ADD_X_B signal is illustrated as a bus as a single line. The sensor controller 130 can issue V address signals such that a pixel row within the bus of the system of the ADD_X_A signal is identified and at the same time, a different pixel row is identified within the bus of the system of the ADD_X_B signal. In the first embodiment, therefore, mutually different V address signals to identify two mutually different pixel rows can be output from the sensor controller 130 to the address decoder unit 150 in the same timing. The gate into which the ADD_X_A signal and the ADD_X_B signal are input is not limited to the AND gate 156 and may be a logical gate of other types. The address decoder circuit 151 is at least configured to generate a control signal to cause pixels of the pixel row identified by a V address signal to perform a read operation or an electronic shutter operation by the V address signal and a latch set signal being input in appropriate timing and the configuration thereof is not limited to the configuration example shown in FIG. 7. For example, the address decoder circuit 151 may include a different circuit from the latch circuit as the memory circuit and the configuration of the logical gate may also be appropriately designed to have the above function.

The operation of the address decoder circuit 151 will be described with reference to FIG. 8. In FIG. 8, the timing of V address signals (the ADD_X_A signal and the ADD_X_B signal), latch input signals (the SLRST signal, the SLSET_X signal, the RLRST signal and the RLSET_X signal), and control signals (the SLQ signal, the XSLQ signal, the RLQ signal, and the XRLQ signal) as output of the address decoder circuit 151 in a 1H period is illustrated.

First, the operation of the address decoder circuit 151 during read operation will be described. In the example shown in FIG. 8, a read operation of pixels of four pixel rows (a pixel row A, a pixel row B, a pixel row G, and a pixel row H) is performed in the first half of the 1H period. For example, the pixel row A and the pixel row B are identified by the V address signal of the system represented by the ADD_X_A signal and the pixel row G and the pixel row H are identified by the V address signal of the system represented by the ADD_X_B signal. In addition, for example, the V address signal that identifies the pixel row A and the V address signal that identifies the pixel row G are input into the address decoder circuit 151 in the same timing and the V address signal that identifies the pixel row B and the V address signal that identifies the pixel row H are input into the address decoder circuit 151 in the same timing During read operation, the RLRST signal is first input into the latch circuit 153 as a read operation latch circuit and the latch circuit 153 is reset. Next, while the V address signal that identifies the pixel row A and the V address signal that identifies the pixel row G are input into the latch circuits 153, the RLSET_X signal is input into the address decoder circuit 151 to cause each of the latch circuits 153 corresponding to the pixel row A and the pixel row G to hold these V address signals. Then, similarly for the pixel row B and the pixel row H, while the V address signals to identify the pixel row B and the pixel row H are input the latch circuits 153, the RLSET_X signal is input into the address decoder circuit 151 to cause each of the latch circuits 153 corresponding to the pixel row B and the pixel row H to hold these V address signals.

From characteristics of the SR latch, when, after the latch circuit 153 is reset by the RLRST signal, the logical product of the V address signal and the RLSET_X signal is high, the RLQ signal becomes high. Conversely, when the logical product of the V address signal of the read row and the RLSET_X signal is low, the RLQ signal remains low. In the example shown in FIG. 8, as the RLQ signal and the XRLQ signal, the timing of the RLQ signal and the XRLQ signal in the address decoder circuit 151 corresponding to some pixel row for which the V address signal is issued as a pixel row for which a read operation is performed is illustrated. In reality, the address decoder circuit 151 corresponding to other pixel rows specified as pixel rows for which a read operation is performed can also output the RLQ signal and the XRLQ signal in similar timing, for example, relative to timing when a V address signal is input. In the present embodiment, therefore, by inputting the V address signal and the RLSET_X signal into the address decoder circuit 151 corresponding to the pixel row for which a read operation should be performed in appropriate timing, the RLQ signal as output thereof can be set to a high state. The RLQ signal is input into the subsequent pixel timing drive circuit 141 and if the RLQ output signal is in a high state, the pixel timing drive circuit 141 can generate a drive signal to cause pixels of the relevant pixel row to perform a read operation.

Next, the operation of the address decoder circuit 151 during electronic shutter operation will be described. In the example shown in FIG. 8, an electronic shutter operation of pixels of eight pixel rows (a pixel row C, a pixel row D, a pixel row E, a pixel row F, a pixel row I, a pixel row J, a pixel row K, and a pixel row L) is performed in the second half of the 1H period. For example, the pixel row C, the pixel row D, the pixel row E, and the pixel row F are identified by the V address signal of the system represented by the ADD_X_A signal and the pixel row I, the pixel row J, the pixel row K, and the pixel row L are identified by the V address signal of the system represented by the ADD_X_B signal. In addition, for example, the V address signal that identifies the pixel row C and the V address signal that identifies the pixel row I, the V address signal that identifies the pixel row D and the V address signal that identifies the pixel row J, the V address signal that identifies the pixel row E and the V address signal that identifies the pixel row K, and the V address signal that identifies the pixel row F and the V address signal that identifies the pixel row L are each input into the address decoder circuit 151 in the same timing.

During electronic shutter operation, the SLRST signal is first input into the latch circuit 152 as an electronic shutter operation latch circuit and the latch circuit 152 is reset. Next, while the V address signal that identifies the pixel row C and the V address signal that identifies the pixel row I are input into the latch circuits 152, the RLSET_X signal is input into the address decoder circuit 151 to cause each of the latch circuits 152 corresponding to the pixel row C and the pixel row I to hold these V address signals. Then, similarly for the pixel row D and the pixel row I, for the pixel row E and the pixel row K, and for the pixel row F and the pixel row L, respectively, while the V address signals to identify these pixel rows are input the latch circuits 152, the SLSET_X signal is input into the address decoder circuit 151 to cause each of the latch circuits 152 corresponding to these pixel rows to hold these V address signals.

From characteristics of the SR latch, when, after the latch circuit 152 is reset by the SLRST signal, the logical product of the V address signal and the SLSET_X signal is high, the SLQ signal becomes high. Conversely, when the logical product of the V address signal of the electronic shutter row and the SLSET_X signal is low, the SLQ signal remains low. In the example shown in FIG. 8, as the SLQ signal and the XSLQ signal, the timing of the SLQ signal and the XSLQ signal in the address decoder circuit 151 corresponding to some pixel row for which the V address signal is issued as a pixel row for which an electronic shutter operation is performed is illustrated. In reality, the address decoder circuit 151 corresponding to other pixel rows specified as pixel rows for which an electronic shutter operation is performed can also output the SLQ signal and the XSLQ signal in similar timing, for example, relative to timing when a V address signal is input. In the present embodiment, therefore, by inputting the V address signal and the SLSET_X signal into the address decoder circuit 151 corresponding to the pixel row for which an electronic shutter operation should be performed in appropriate timing, the SLQ signal as output thereof can be set to a high state. The SLQ signal is input into the subsequent pixel timing drive circuit 141 and if the SLQ output signal is in a high state, the pixel timing drive circuit 141 can generate a drive signal to cause pixels of the relevant pixel row to perform an electronic shutter operation.

In the foregoing, the configuration and the operation of the address decoder circuit 151 according to the first embodiment have been described. As has been described above, the address decoder circuit 151 according to the first embodiment generates, based on a V address signal to identify the pixel row in the pixel array unit 110, a control signal to drive pixels of the pixel row corresponding to the V address signal. The address decoder circuit 151 can generate at least a control signal to cause pixels of the pixel row corresponding to the V address signal to perform a read operation or an electronic shutter operation. Also, V address signals of at least two mutually different systems are supplied to the address decoder circuit 151 and at least the two address decoder circuits 151 that are mutually different can generate control signals to at least two mutually different pixel rows.

Figure 9:
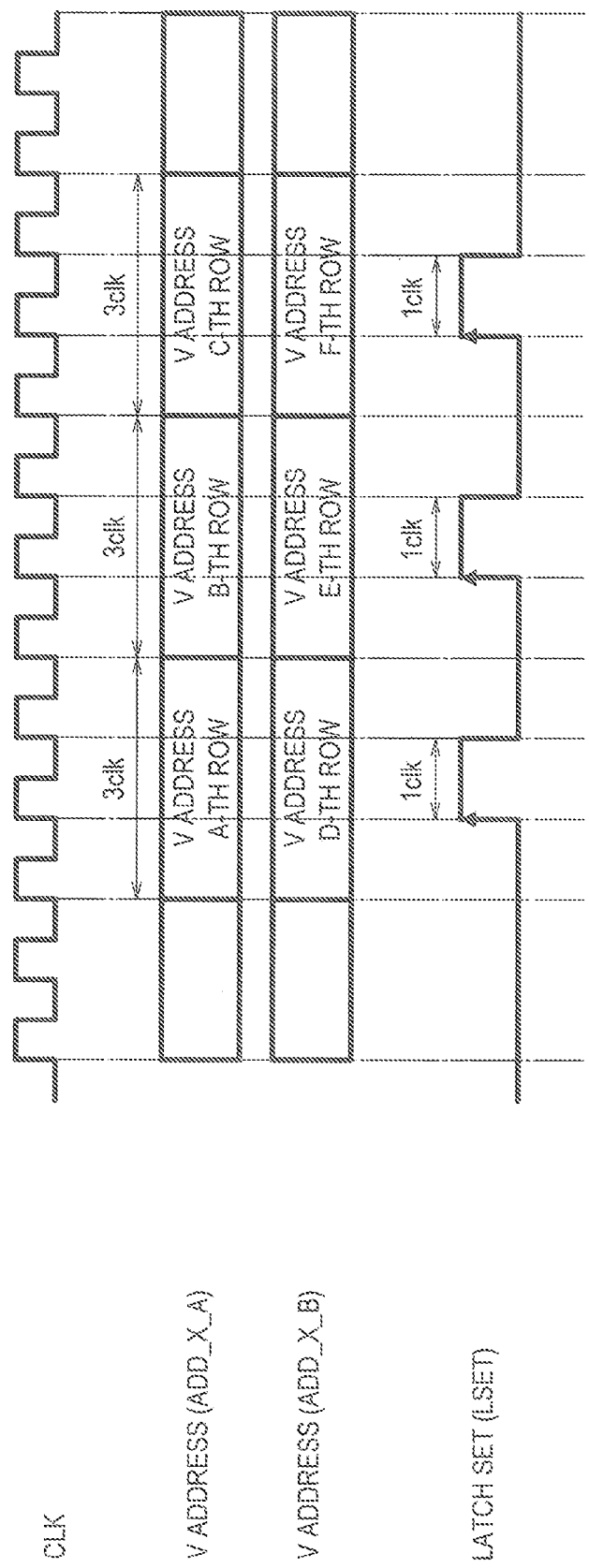
FIG. 9 is an explanatory view illustrating a relationship between a V address signal and a latch set signal (LSET signal) in the address decoder circuit according to the first embodiment.

Here, among signals related to the operation of the address decoder circuit 151 according to the first embodiment, particularly the relationship between the V address signal and the latch set signal (LSET signal) will be described with reference to FIG. 9. FIG. 9 is an explanatory view illustrating the relationship between the V address signal and the latch set signal (LSET signal) in the address decoder circuit 151 according to the first embodiment. The latch set signal (LSET signal) is a signal applied to the input terminal on the Set side of the latch circuits 152, 153 and in the above example, corresponds to the SLSET_X signal and the RLSET_X signal.

In FIG. 9, the timing chart of, among signals related to the operation of the address decoder circuit 151, the CLK signal, the ADD_X_A signal and the ADD_X_B signal as V address signals, and the LSET signal is illustrated. V address signals of two mutually different systems are input into the address decoder circuit 151 in the first embodiment and thus, in FIG. 9, for example, V address signals identifying the pixel row A, the pixel row B, and the pixel row C are input from the system represented by the ADD_X_A signal and V address signals representing the pixel row D, the pixel row E, and the pixel row F are input from the system represented by the ADD_X_B signal in the same timing as the V address signals identifying the pixel row A, the pixel row B, and the pixel row C.

The ADD_X_A signal and the ADD_X_B signal shown in FIG. 9 are V address signals to identify the pixel row for which an electronic shutter operation or a read operation is performed and values of the ADD_X_A signal and the ADD_X_B signal are held by the address decoder circuit 151 by the LSET signal being input into the address decoder circuit 151 in timing overlapping with input of the ADD_X_A signal and the ADD_X_B signal. It is assumed here that, for example, the latch set period in the latch circuits 152, 153 is one clock period, which is the minimum unit. In this case, in consideration of a margin of a setup/hold period in the latch circuits 152, 153, it is preferable to secure a buffer for one clock before and after the latch set period. In the first embodiment, therefore, the V address signal can be issued for the total of three clocks, one clock for the latch set period and one clock each secured as a buffer before and after the latch set period. Also in the example shown in FIG. 8 described above, in consideration of a margin of the setup/hold period in the latch circuits 152, 153, three clocks are secured for the issuing period of the V address signal while the latch set period (that is, the period in which the SLSET_X signal and the RLSET_X signal are input) is one clock.

In the example shown in FIG. 9, the ADD_X_A signal representing the pixel row A and the ADD_X_B signal representing the pixel row D are input in the same timing for a period of three clocks and also the LSET signal is input for one clock so as to overlap with the period. Similarly, the ADD_X_A signal representing the pixel row B and the ADD_X_B signal representing the pixel row E are input in the same timing for a period of three clocks and also the ADD_X_A signal representing the pixel row C and the ADD_X_B signal representing the pixel row F are input in the same timing for a period of three clocks and the LSET signal is input for one clock so as to overlap with these periods. In the first embodiment, therefore, V address signals indicating two mutually different pixel rows are input while the LSET signal is input into the address decoder circuit 151 for a period of one clock.

[1-6. Timing Chart of Whole Solid State Image Sensor]

Figure 10:
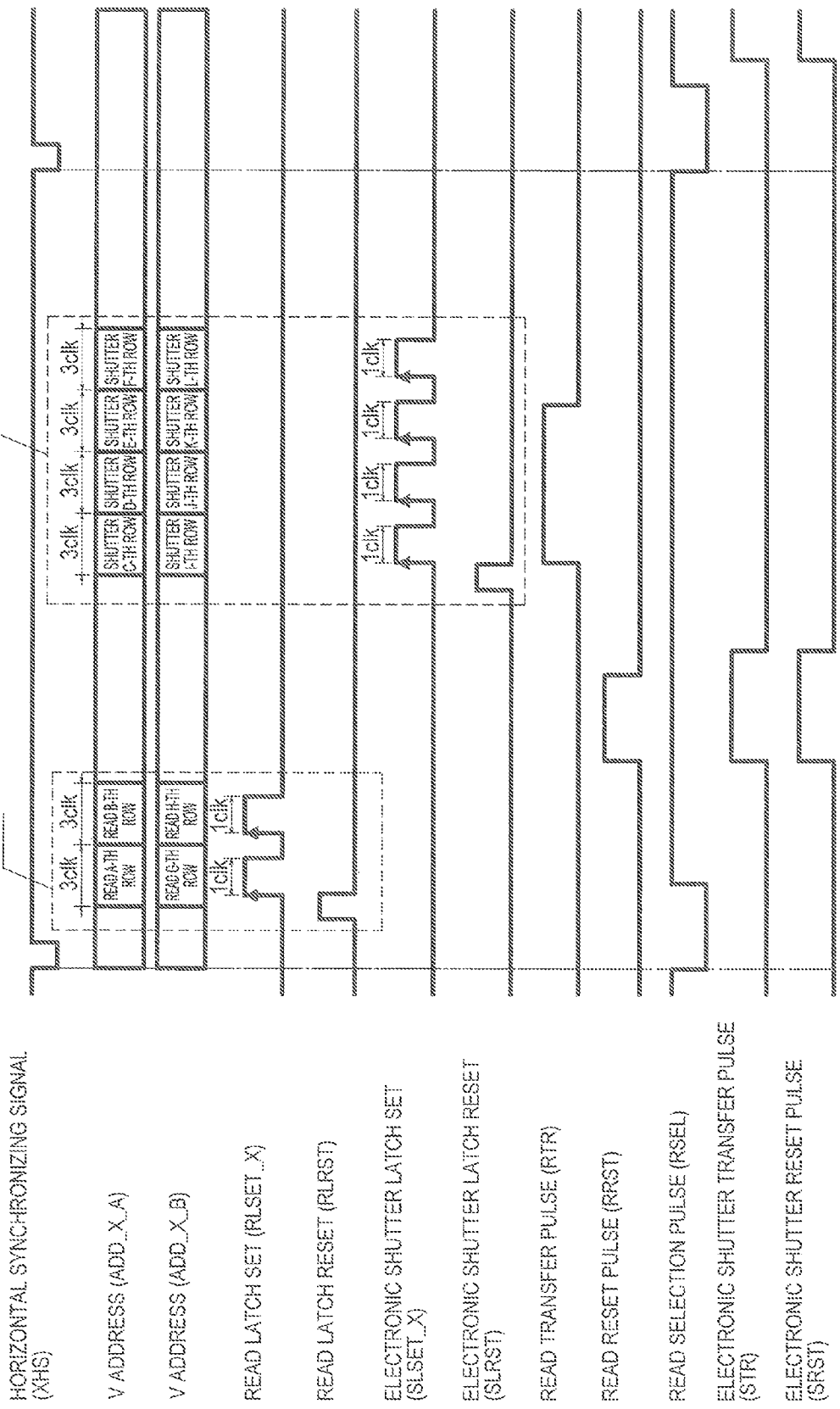
FIG. 10 is a diagram showing a timing chart of the operation of the whole solid state image sensor according to the first embodiment.

Next, the operation of the whole solid state image sensor 10 according to the first embodiment will be described with reference to FIG. 10. FIG. 10 is a diagram showing a timing chart of the operation of the whole solid state image sensor 10 according to the first embodiment. In FIG. 10, the timing of signals input from the sensor controller 130 into the pixel timing drive unit 140 and the address decoder unit 150 in the 1H period is illustrated. More specifically, the timing of V address signals (the ADD_X_A signal and the ADD_X_B signal), latch input signals (the RLRST signal, the RLSET_X signal, the SLRST signal, and the SLSET_X signal), and pixel drive pulses (the RTR pulse, the RRST pulse, the RSEL pulse, the STR pulse, and the SRST pulse) in the 1H period is illustrated.

In the example shown in FIG. 10, a read operation of pixels of four pixel rows (a pixel row A, a pixel row B, a pixel row G, and a pixel row H) is performed in the first half of the 1H period. First, V address signals identifying the pixel row A, the pixel row B, the pixel row G and the pixel row H and the RLRST signal and the RLSET_X signal as latch input signals related to a read operation are input from the sensor controller 130 into the address decoder unit 150 in predetermined timing. Based on these signals, the address decoder unit 150 generates an RLQ signal and an XRLQ signal as latch output signals related to a read operation and outputs the generated RLQ signal and XRLQ signal into the subsequent pixel timing drive unit 140. The timing of the V address signal, the latch input signal, and the latch output signal related to a read operation in the address decoder unit 150 is similar to, for example, the timing described with reference to FIG. 8 and so a detailed description thereof is omitted.

Next, the RTR pulse, the RRST pulse, and the RSEL pulse as pixel drive pulses related to a read operation are input from the sensor controller 130 into the pixel timing drive unit 140 in predetermined timing by matching the input timing of the V address signals identifying the pixel row A, the pixel row B, the pixel row G, and the pixel row H and the RLRST signal and the RLSET_X signal. In the example shown in FIG. 10, as the RTR pulse, the RRST pulse, and the RSEL pulse, the timing of the RTR pulse, the RRST pulse, and the RSEL pulse input into the pixel timing drive circuit 141 corresponding to some pixel row for which a read operation is performed is illustrated. Actually, the RTR pulse, the RRST pulse, and the RSEL pulse may also be input into the pixel timing drive circuit 141 corresponding to other pixel rows for which a read operation is performed in similar timing, for example, relative to timing when the V address signal is input. The pixel timing drive unit 140 outputs drive signals (the TRG signal, the RST signal, and the SEL signal) to drive the pixel 111 so as to cause the pixel to perform a read operation based on these pixel drive pulses and the RLQ signal input from the address decoder unit 150. Thus, in the solid state image sensor 10 according to the first embodiment, the operation of pixels of the selected pixel row can be controlled by the sensor controller 130 such that the pixels perform a read operation in desired timing. The timing of pixel drive pulses in the 1H period is similar to, for example, the timing described with reference to FIG. 3 and so a detailed description thereof is omitted.

In addition, in the example shown in FIG. 10, an electronic shutter operation of pixels of eight pixel rows (a pixel row C, a pixel row D, a pixel row E, a pixel row F, a pixel row I, a pixel row J, a pixel row K, and a pixel row L) is performed in the second half of the 1H period. First, V address signals identifying the pixel row C, the pixel row D, the pixel row E, a pixel row F, a pixel row I, a pixel row J, a pixel row K and the pixel row L and the SLRST signal and the SLSET_X signal as latch input signals related to an electronic shutter operation are input from the sensor controller 130 into the address decoder unit 150 in predetermined timing. Based on these signals, the address decoder unit 150 generates an SLQ signal and an XSLQ signal as latch output signals related to an electronic shutter operation and outputs the generated SLQ signal and XSLQ signal into the subsequent pixel timing drive unit 140. The timing of the V address signal, the latch input signal, and the latch output signal related to an electronic shutter operation in the address decoder unit 150 is similar to, for example, the timing described with reference to FIG. 8 and so a detailed description thereof is omitted.

Next, the STR pulse and the SRST pulse as pixel drive pulses related to an electronic shutter operation are input from the sensor controller 130 into the pixel timing drive unit 140 in predetermined timing by matching the input timing of the V address signals indicating the pixel row C, the pixel row D, the pixel row E, a pixel row F, a pixel row I, a pixel row J, a pixel row K and the pixel row L and the SLRST signal and the SLSET_X signal. In the example shown in FIG. 10, as the STR pulse and the SRST pulse the timing of the STR pulse and the SRST pulse input into the pixel timing drive circuit 141 corresponding to some pixel row for which an electronic shutter operation is performed is illustrated. Actually, the STR pulse and the SRST pulse may also be input into the pixel timing drive circuit 141 corresponding to other pixel rows for which an electronic shutter operation is performed in similar timing, for example, relative to timing when the V address signal is input. The pixel timing drive unit 140 outputs drive signals (the TRG signal, the RST signal, and the SEL signal) to drive the pixel 111 so as to cause the pixel to perform an electronic shutter operation based on these pixel drive pulses and the SLQ signal input from the address decoder unit 150. Thus, in the solid state image sensor 10 according to the first embodiment, the operation of pixels of the selected pixel row can be controlled by the sensor controller 130 such that the pixels perform an electronic shutter operation in desired timing. The timing of pixel drive pulses in the 1H period is similar to, for example, the timing described with reference to FIG. 3 and so a detailed description thereof is omitted.

[1-7 Summary of First Embodiment]

In the foregoing, the first embodiment of the present disclosure has been described with reference to FIGS. 1 to 8. A case when V address signals of two mutually different systems are input into the address decoder circuit 151 is described above, but the first embodiment is not limited to such an example. For example, V address signals of three or more mutually different systems may be input into the address decoder circuit 151 according to the first embodiment. In such a case, the address decoder circuit 151 can be configured so as to have a function similar to the above-described function by increasing the number of input terminals of the AND gates 156 shown in FIG. 7 to the number of systems of V address signals.

<2. Comparison with Common Solid State Image Sensor>

Next, the configuration of a solid state image sensor according to the first embodiment described above and the configuration of a common existing solid state image sensor will be compared. The solid state image sensor according to the first embodiment may be configured in the same manner as the common solid state image sensor excluding the configuration of the address decoder unit 150. Therefore, the configuration of an address decoder unit in a common solid state image sensor will first be described below as a main difference from the first embodiment. Next, the configuration of the address decoder unit 150 according to the first embodiment and the configuration of the address decoder unit in a common solid state image sensor will be compared.

[2-1. Configuration of Common Address Decoder Circuit]

Figure 11:
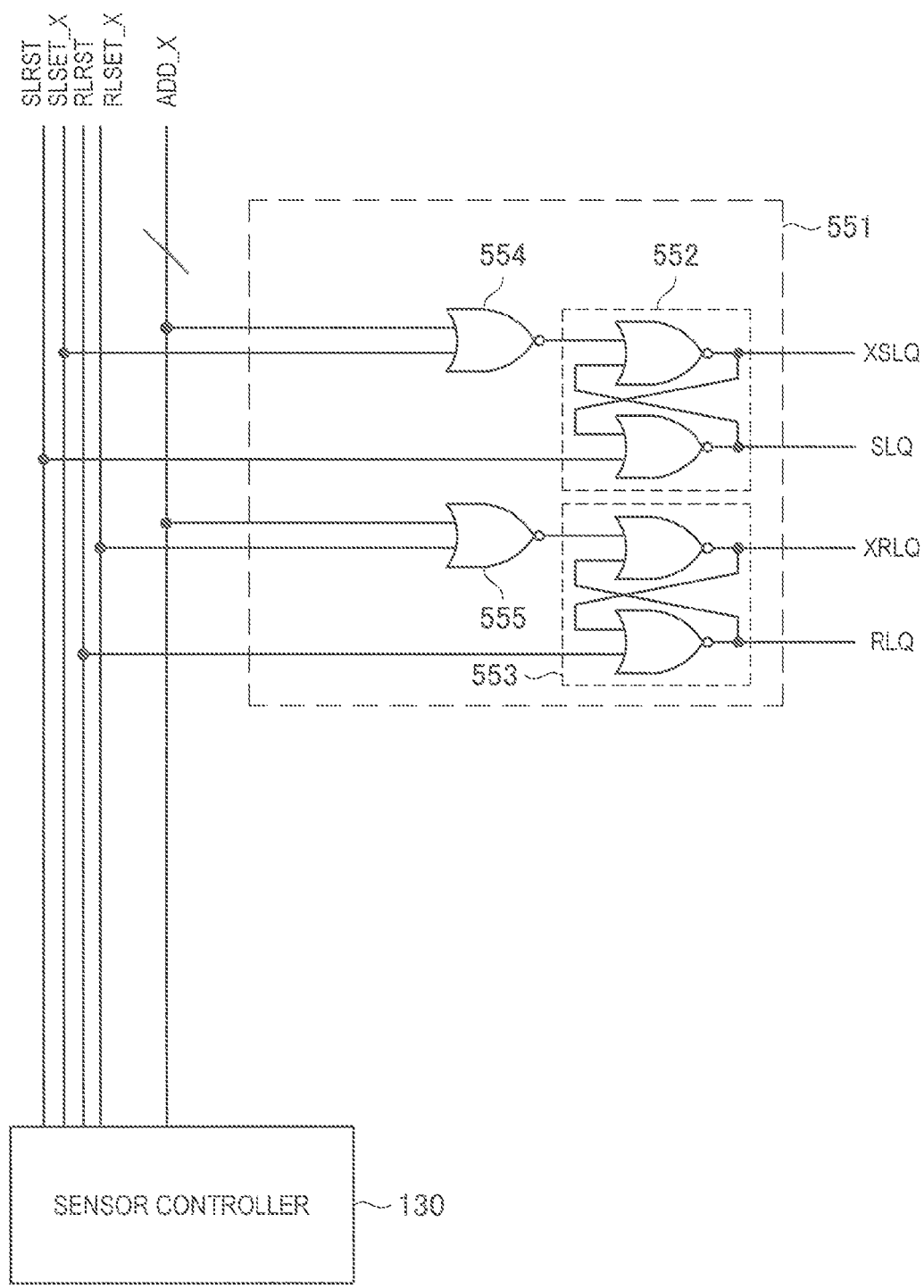
FIG. 11 is a diagram showing the equivalent circuit of a common address decoder circuit.
Figure 12:
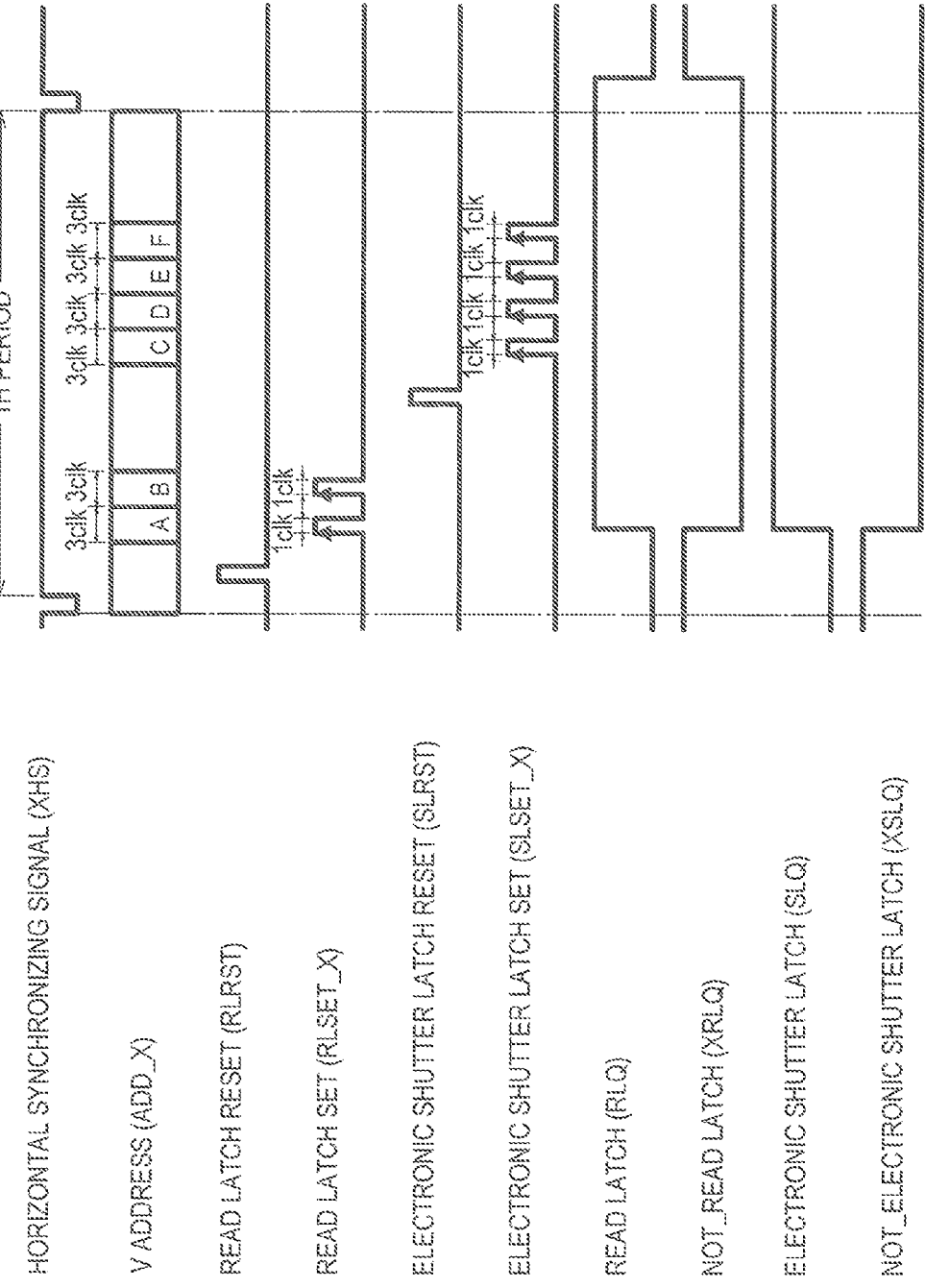
FIG. 12 is a diagram showing a timing chart of the operation of the common address decoder circuit shown in FIG. 11.

Also, in a common solid state image sensor, the address decoder unit includes a plurality of address decoder circuits corresponding to each pixel row of a pixel array. The configuration of an address decoder circuit constituting the address decoder unit of a common solid state image sensor will be described with reference to FIGS. 11 and 12. FIG. 11 is a diagram showing an equivalent circuit of a common address decoder circuit. FIG. 12 is a diagram showing a timing chart of the operation of the common address decoder circuit shown in FIG. 11.

Referring to FIG. 11, a common address decoder circuit 551 includes two latch circuits 552, 553 and is configured to generate an electronic shutter latch output signal (SLQ signal), a negative logic (NOT) electronic shutter latch output signal (XSLQ signal), a read latch output signal (RLQ signal), and a negative logic (NOT) read latch output signal (XRLQ signal) as control signals based on latch input signals (an SLRST signal, an SLSET_X signal, an RLRST signal, and an RLSET_X signal) as an input signal into the latch circuits 552, 553 and V address signals (an ADD_X signal) to identify the pixel row in the pixel array. The latch circuits 552, 553 are, for example, so-called SR latches.

A latch circuit 552 corresponds to the latch circuit 152 of the address decoder circuit 151 according to the first embodiment shown in FIG. 7. That is, the latch circuit 552 is an electronic shutter operation latch circuit that outputs a control signal to cause pixels of the pixel row identified by the V address signal to perform an electronic shutter operation. More specifically, the latch circuit 552 generates an electronic shutter latch output signal (SLQ signal) as a signal indicating whether an electronic shutter operation is performed for the relevant pixel row and a negative logic (NOT) electronic shutter latch output signal (XSLQ signal) as a negative logic signal of the SLQ signal based on the V address signal, the SLRST signal, and the SLSET_X signal. In the example shown in FIG. 11, the SLRST signal input from the sensor controller is directly input into the input terminal on the Reset side of the latch circuit 552. A NOR gate 554 is provided prior to the latch circuit 552 and a logical sum of the SLSET_X signal by the NOR gate 554 and a V address signal is input into the input terminal on the Set side of the latch circuit 552.

A latch circuit 553 corresponds to the latch circuit 153 of the address decoder circuit 151 according to the first embodiment shown in FIG. 7. That is, the latch circuit 553 is a read operation latch circuit that outputs a control signal to cause pixels of the pixel row identified by the V address signal to perform a read operation. More specifically, the latch circuit 553 generates a read latch output signal (RLQ signal) as a signal indicating whether a read operation is performed for the relevant pixel row and a negative logic (NOT) read latch output signal (XRLQ signal) as a negative logic signal of the RLQ signal based on the V address signal, the RLRST signal, and the RLSET_X signal. In the example shown in FIG. 11, the RLRST signal input from the sensor controller is directly input into the input terminal on the Reset side of the latch circuit 553. A NOR gate 555 is provided prior to the latch circuit 553 and a logical sum of the RLSET_X signal by the NOR gate 555 and a V address signal is input into the input terminal on the Set side of the latch circuit 553.

As shown in FIG. 11, only a V address signal of one system is input into a common address decoder circuit 551. Accordingly, the common address decoder circuit 551 does not include a logical gate to calculate a logical sum of V address signals of different systems like the address decoder circuit 151 according to the first embodiment shown in FIG. 7 and an ADD_X signal as a V address signal is directly input into NOR gates 554, 555. With the address decoder circuit 551 configured as described above, the common solid state image sensor fails to select a plurality of mutually different pixel rows in the same timing as pixel rows for which a read operation or an electronic shutter operation is performed.

FIG. 12 shows a timing chart of various signals representing the operation of the common address decoder circuit 551. In FIG. 12, the timing of a V address signal (the ADD_X signal), latch input signals (the SLRST signal, the SLSET_X signal, the RLRST signal and the RLSET_X signal), and control signals (the SLQ signal, the XSLQ signal, the RLQ signal, and the XRLQ signal) as output of the address decoder circuit 551 in a 1H period is illustrated.

Figure 13:
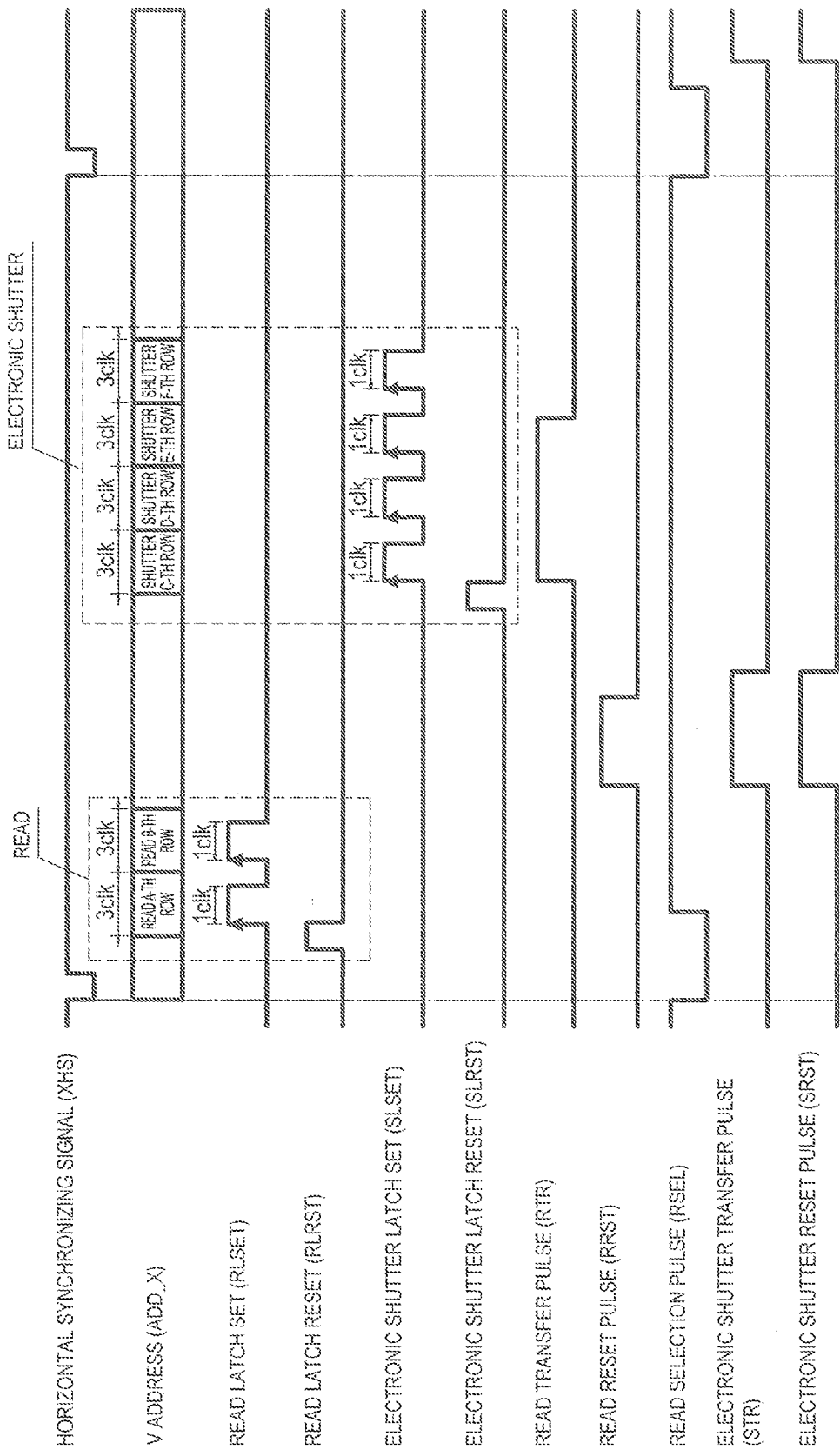
FIG. 13 is a diagram showing a timing chart of the operation of the whole common solid state image sensor.

FIG. 13 shows a timing chart of various signals representing the operation of the whole common solid state image sensor. FIG. 13 is a diagram showing a timing chart of the operation of the whole common solid state image sensor. In FIG. 13, the timing of a V address signal (the ADD_X signal), latch input signals (the RLRST signal, the RLSET_X signal, the SLRST signal, and the SLSET_X signal), and pixel drive pulses (the RTR pulse, the RRST pulse, the RSEL pulse, the STR pulse, and the SRST pulse) in the 1H period is illustrated.

In the timing chart shown in FIG. 12, the timing of latch input signals and control signals is similar to the timing of these signals in the address decoder circuit 151 according to the first embodiment shown in FIG. 8. In the timing chart shown in FIG. 13, the timing of latch input signals and pixel drive pulses is similar to the timing of these signals in the solid state image sensor 10 according to the first embodiment shown in FIG. 10. As shown in FIGS. 12 and 13, the common address decoder circuit 551 and solid state image sensor are different from the address decoder circuit 151 and the solid state image sensor 10 according to the first embodiment in that the ADD_X signal of only one system is input as a V address signal. Thus, in the common address decoder circuit 551 and solid state image sensor, only one pixel row can be selected in the same timing as a pixel row for which a read operation or an electronic shutter operation is performed.

[2-2. Comparison of Address Decoder Circuit According to First Embodiment and Common Address Decoder Circuit]

Next, an address decoder circuit according to the first embodiment and a common address decoder circuit will be compared.

Figure 14:
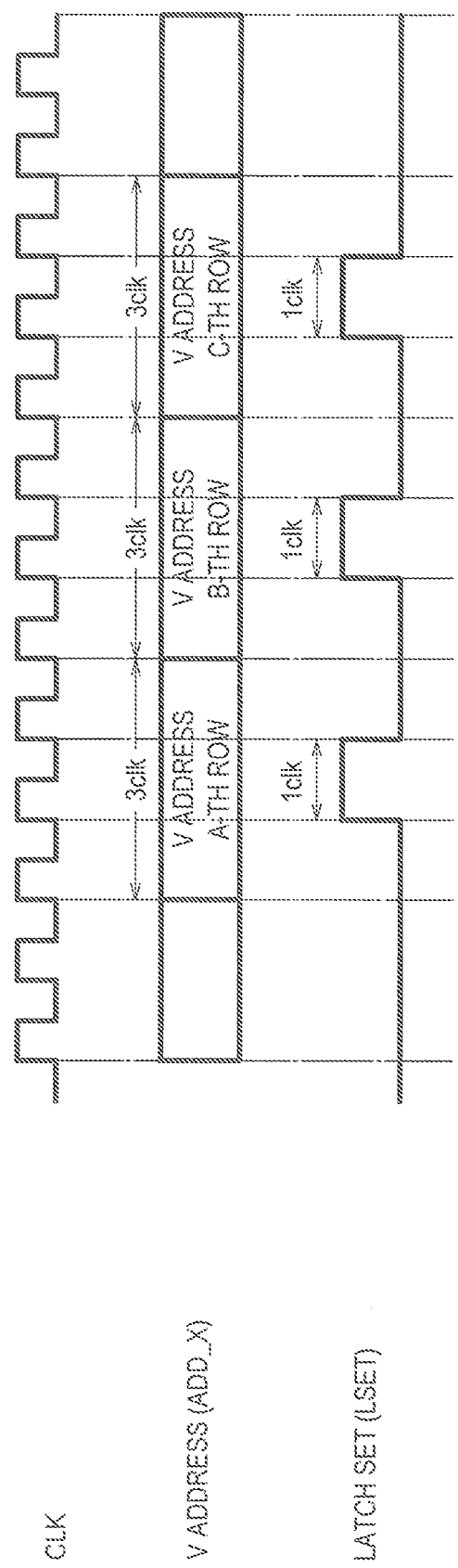
FIG. 14 is an explanatory view illustrating the relationship between the V address signal and the latch set signal (LSET signal) in the common address decoder circuit.

For the comparison, FIG. 14 shows, among signals related to the operation of the common address decoder circuit 551, the relationship particularly between the V address signal and the latch set signal (LSET signal). FIG. 14 is a diagram corresponding to FIG. 9 described above and an explanatory view illustrating the relationship between the V address signal and the latch set signal (LSET signal) in the common address decoder circuit 551.

In FIG. 14, a timing chart of, among signals related to the operation of the address decoder circuit 551, the CLK signal, the ADD_X signal as a V address signal, and the LSET signal is illustrated. Comparison of the timing chart shown in FIG. 14 and the timing chart of the V address signal and the LSET signal according to the first embodiment shown in FIG. 9 shows that the numbers of systems of input V address signals are different.

As described above, the V address signal (ADD_X signal) of only one system is input into the common address decoder circuit 551. Also as described above, in consideration of a margin of the setup/hold period in the latch circuits 552, 553, it is preferable to issue a V address signal to identify some pixel row for a period of at least three clocks. Therefore, the number of address rows that can be identified by V address signals in the 1H period is limited in the common address decoder circuit 551. However, for example, to prevent deterioration in quality by blooming in thinned-out read mode, it is preferable to perform an electronic shutter operation on pixels to be thinned out and to perform the electronic shutter operation, it is necessary to issue a V address signal to identify the pixel row for which the electronic shutter operation is performed. As a result, when an electronic shutter operation and a read operation are both performed within the 1H period in a common solid state image sensor, the reduction of length of the 1H period is limited and it is difficult to take photographs faster while preventing deterioration in quality by blooming.

On the other hand, as described with reference to FIG. 9, V address signals of a plurality of mutually different systems are input into the address decoder circuit 151 according to the first embodiment. Therefore, it becomes possible to input V address signals to identify a plurality of mutually different pixel rows in the same timing. In the example shown in FIG. 9, V address signals of two systems (the ADD_X_A signal and the ADD_X_B signal) are input and thus, when compared with the common case shown in FIG. 13, the number of pixel rows that can be identified by V address signals in the 1H period is doubled. Therefore, the number of pixel rows for which an electronic shutter operation is performed in the 1H period is increased and, as a result, the 1H period can be reduced. In the first embodiment, therefore, even if an electronic shutter operation and a read operation are both performed within the 1H period, improvement in quality and faster photographing can both be realized. In the first embodiment, as described above, the number of systems of input V address signals is not limited to two and the address decoder circuit 151 can be configured such that V address signals of more systems can be input. With V address signals of more systems being input, the number of pixel rows of V address signals that can be issued in the 1H period further increases and thus, the length of the 1H period can further be reduced.

Comparison of the configuration of the address decoder circuit 151 according to the first embodiment shown in FIG. 7 and the configuration of the common address decoder circuit 551 shown in FIG. 11 shows that the address decoder circuit 151 according to the first embodiment is realized only by adding one logical gate (AND gate 156) to the configuration of the common address decoder circuit 551 and the subsequent configuration of the AND gate 156 may be the same as the configuration of the common address decoder circuit 551. Therefore, an increase of the circuit area of the address decoder circuit 151 from the common address decoder circuit 551 is very small and does not cause an increase of the chip size of the solid state image sensor 10.

3. Second Embodiment

The second embodiment of the present disclosure will be described. A solid state image sensor according to the second embodiment of the present disclosure corresponds to an embodiment in which the configuration of an address decoder unit is different from that of the solid state image sensor 10 according to the first embodiment described above. In the description of the second embodiment below, therefore, the configuration of the address decoder unit will mainly be described by focusing on differences from the first embodiment and a detailed description of the other configuration of the solid state image sensor is omitted. The solid state image sensor according to the second embodiment may be, like the solid state image sensor 10 according to the first embodiment, for example, a CMOS image sensor.

[3-1. Configuration of Address Decoder Circuit]

Figure 15:
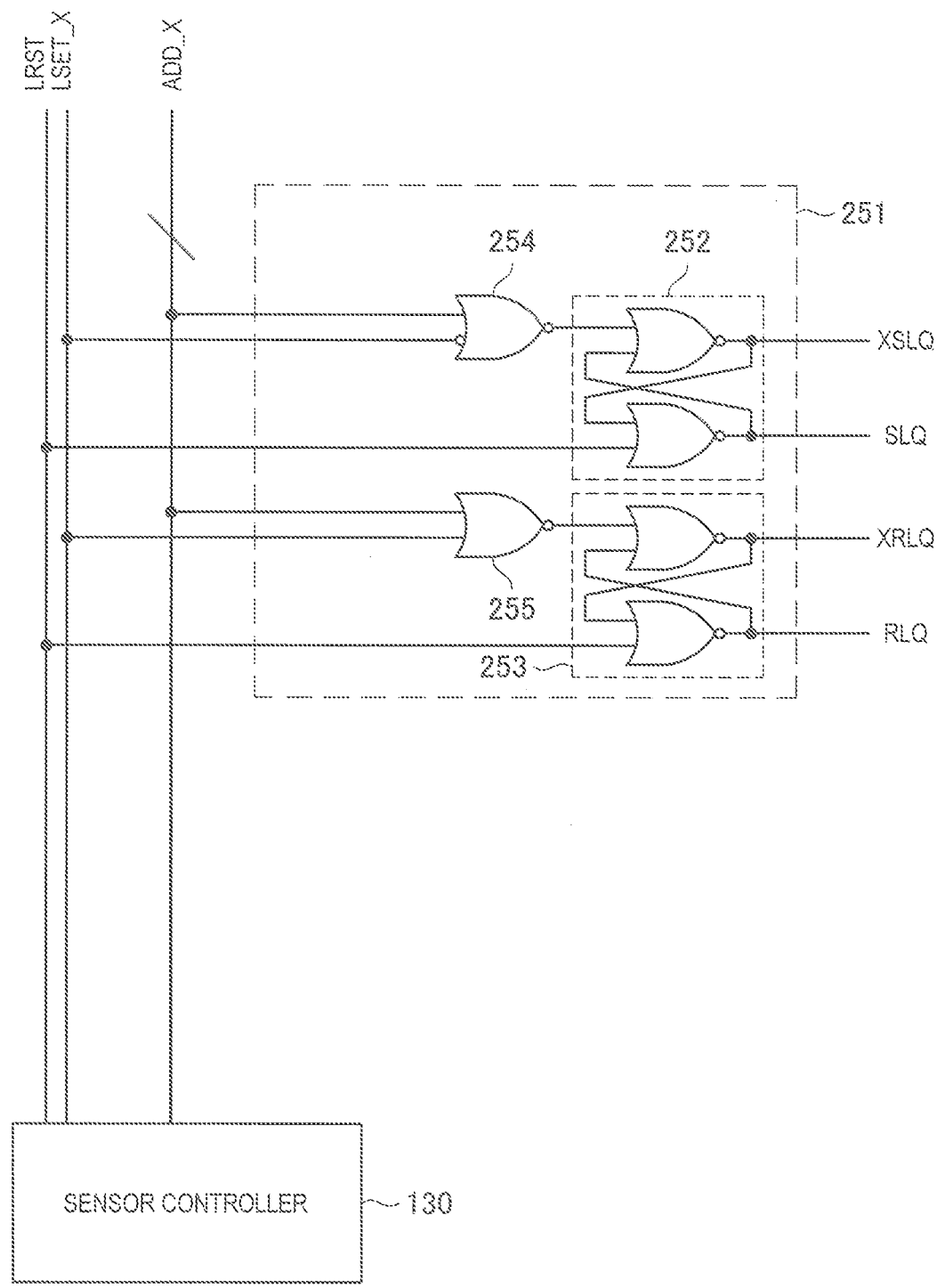
FIG. 15 is a diagram showing the equivalent circuit of an address decoder circuit according to the second embodiment.
Figure 16:
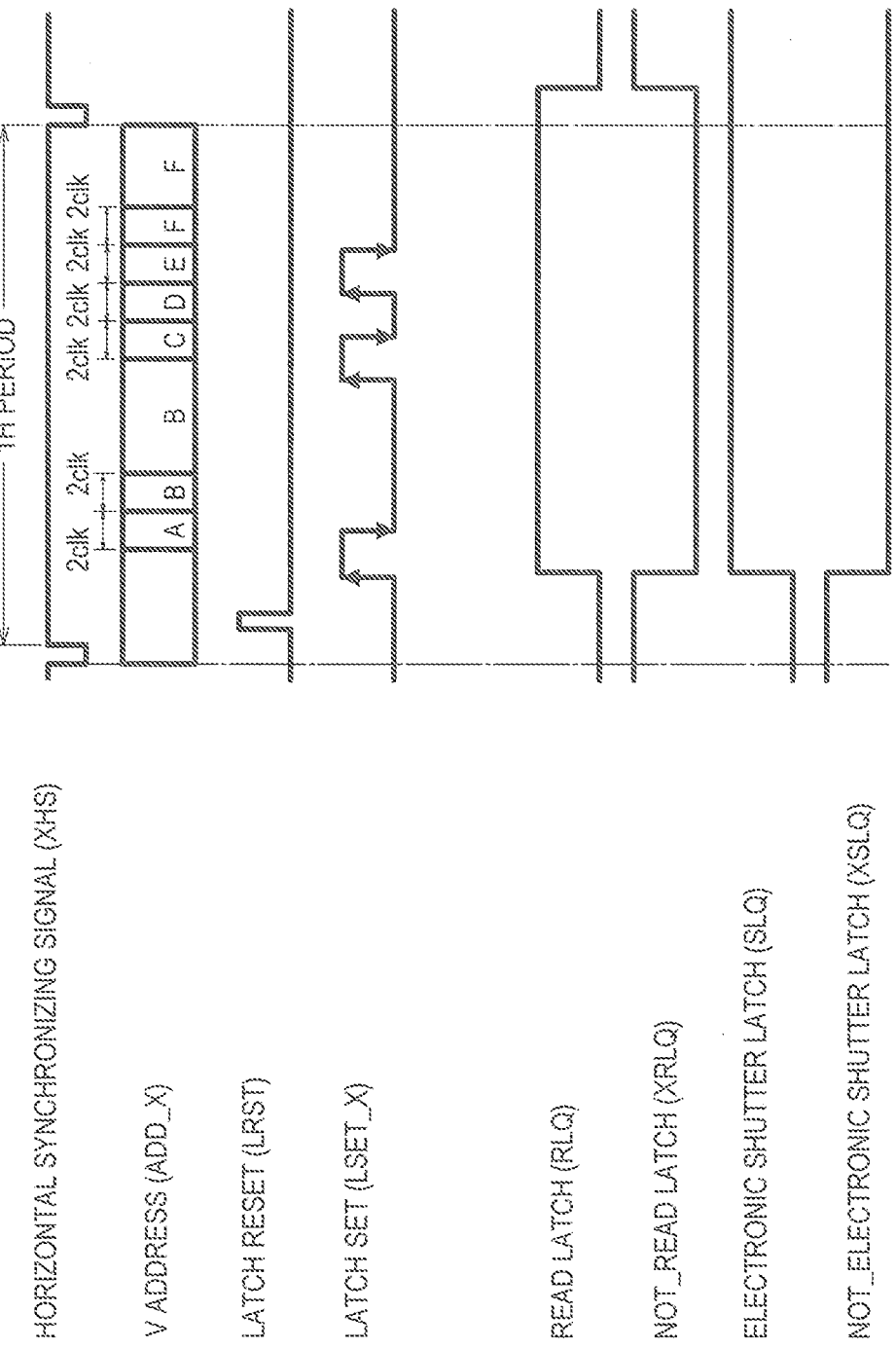
FIG. 16 is a diagram showing a timing chart of the operation of the address decoder circuit according to the second embodiment shown in FIG. 15.

Also, in a solid state image sensor according to the second embodiment of the present disclosure, the address decoder unit includes a plurality of address decoder circuits corresponding to each pixel row of a pixel array. The configuration of an address decoder circuit constituting the address decoder unit of the solid state image sensor according to the second embodiment of the present disclosure will be described with reference to FIGS. 15 and 16. FIG. 15 is a diagram showing an equivalent circuit of the address decoder circuit according to the second embodiment of the present disclosure. FIG. 16 is a diagram showing a timing chart of the operation of the address decoder circuit according to the second embodiment of the present disclosure shown in FIG. 15.

Referring to FIG. 15, an address decoder circuit 251 according to the second embodiment of the present disclosure includes two latch circuits 252, 253 and is configured to generate an electronic shutter latch output signal (SLQ signal), a negative logic (NOT) electronic shutter latch output signal (XSLQ signal), a read latch output signal (RLQ signal), and a negative logic (NOT) read latch output signal (XRLQ signal) as control signals based on latch input signals (a LRST signal and a LSET_X signal) as an input signal into the latch circuits 252, 253 and V address signals (an ADD_X signal) to identify the pixel row in the pixel array. The latch circuits 252, 253 are, for example, so-called SR latches. The latch input signals and the V address signal are input from a sensor controller (having a function similar to that of the sensor controller 130 shown, for example, in FIG. 1) provided inside the solid state image sensor according to the second embodiment into the address decoder circuit 251.

The LRST signal is applied to the input terminal on the Reset side of the latch circuits 252, 253 and is a latch reset signal to reset the latch circuits 252, 253. The LSET_X signal is applied to the input terminal on the Set side of the latch circuits 252, 253 and is a latch set signal to cause the latch circuits 252, 253 to hold the value of the V address signal. In the existing common address decoder circuit 551 described above, two systems of a read latch set signal (RLSET_X signal) and an electronic shutter latch set signal (SLSET_X signal) are available as latch set signals and two systems of a read latch reset signal (RLRST signal) and an electronic shutter latch reset signal (SLRST signal) are available as latch reset signals. In the second embodiment, on the other hand, both of the latch circuit 252 as an electronic shutter operation latch circuit and the latch circuit 253 as a read operation latch circuit are driven by a latch set signal (LSET_X signal) of one system and a latch reset signal (LRST signal) of one system. This is realized in the second embodiment by the double data rate (DDR) method that detects edges (rising and falling) on both sides of a pulse being applied for detection of the LSET_X signal. The detection of the LSET_X signal will be described later with reference to FIG. 16.

A more detailed configuration of the address decoder circuit 251 will be described with reference to FIG. 15. A latch circuit 252 corresponds to the latch circuit 152 of the address decoder circuit 151 according to the first embodiment shown in FIG. 7. That is, the latch circuit 252 is an electronic shutter operation latch circuit that outputs a control signal to cause pixels of the pixel row identified by the V address signal to perform an electronic shutter operation. More specifically, the latch circuit 252 generates an electronic shutter latch output signal (SLQ signal) as a signal indicating whether an electronic shutter operation is performed for the relevant pixel row and a negative logic (NOT) electronic shutter latch output signal (XSLQ signal) as a negative logic signal of the SLQ signal based on the V address signal, the LRST signal, and the LSET_X signal. In the example shown in FIG. 15, the LRST signal input from the sensor controller is directly input into the input terminal on the Reset side of the latch circuit 252. A NOR gate 254 is provided prior to the latch circuit 252 and a logical sum of the LSET_X signal by the NOR gate 254 and a V address signal is input into the input terminal on the Set side of the latch circuit 252. However, the sign of the LSET_X signal is reversed before the signal being input into the NOR gate 254.

A latch circuit 253 corresponds to the latch circuit 153 of the address decoder circuit 151 according to the first embodiment shown in FIG. 7. That is, the latch circuit 253 is a read operation latch circuit that outputs a control signal to cause pixels of the pixel row identified by the V address signal to perform a read operation. More specifically, the latch circuit 253 generates a read latch output signal (RLQ signal) as a signal indicating whether a read operation is performed for the relevant pixel row and a negative logic (NOT) read latch output signal (XRLQ signal) as a negative logic signal of the RLQ signal based on the V address signal, the LRST signal, and the LSET_X signal. In the example shown in FIG. 15, the LRST signal input from the sensor controller is directly input into the input terminal on the Reset side of the latch circuit 253. A NOR gate 255 is provided prior to the latch circuit 253 and a logical sum of the LSET_X signal by the NOR gate 255 and a V address signal is input into the input terminal on the Set side of the latch circuit 253.

The latch circuits 252, 253 are an example of the memory circuit that holds a predetermined signal value. In the second embodiment, the memory circuit has a function to hold a V address signal in response to a logical product of the V address signal and a memory input signal. The sensor controller according to the second embodiment can cause the address decoder circuit 251 to generate a control signal to cause pixels of the pixel row identified by the V address signal to perform a read operation or an electronic shutter operation by inputting the memory input signal into the address decoder circuit 251 together with the V address signal.

In the second embodiment, the memory circuit having such a function is realized by the latch circuits 252, 253 as SR latches. The latch set signal (the aforementioned LSET_X) is input into the latch circuits 252, 253 as the memory input signal and the latch circuits 252, 253 can hold the V address signal in response to a logical product of the V address signal and the latch set signal. The sensor controller according to the second embodiment may cause the address decoder circuit 251 to generate a control signal to cause pixels of the pixel row identified by the V address signal to perform a read operation or an electronic shutter operation by inputting the latch set signal into the address decoder circuit 251 together with the V address signal.

The operation of the address decoder circuit 251 according to the second embodiment will be described with reference to FIG. 16. In FIG. 16, the timing of a V address signal (the ADD_X signal), latch input signals (the LRST signal and the LSET_X signal), and control signals (the SLQ signal, the XSLQ signal, the RLQ signal, and the XRLQ signal) as output of the address decoder circuit 251 in the 1H period is illustrated. In the example shown in FIG. 16, as the SLQ signal, the XSLQ signal, the RLQ signal, and the XRLQ signal, the timing of the SLQ signal, the XSLQ signal, the RLQ signal, and the XRLQ signal in the address decoder circuit 251 corresponding to some pixel row for which the V address signal is issued as a pixel row for which an electronic shutter operation or a read operation is performed is illustrated. In reality, the address decoder circuit 251 corresponding to other pixel rows specified as pixel rows for which an electronic shutter operation or a read operation is performed can also output the SLQ signal, the XSLQ signal, the RLQ signal, and the XRLQ signal in similar timing, for example, relative to timing when a V address signal is input.

Referring to FIG. 16, the LRST signal is first input into the address decoder circuit 251 and both of the latch circuits 252, 253 are reset. In the common address decoder circuit 551 described with reference to FIG. 12, the RLRST signal to reset the read operation latch circuit 553 and the SLRST signal to reset the electronic shutter operation latch circuit 552 are input as signals of different systems, but in the second embodiment, both of the latch circuits 252, 253 are reset by the latch reset signal of one system.

Next, the ADD_X signal and the LSET_X signal are input into the address decoder circuit 251. In the second embodiment, as described above, the DDR method is applied for detection of the LSET_X signal. A latch set operation in the latch circuits 252, 253 is performed by using detection of rising and falling edges on both sides as a trigger after the LSET_X signal being detected by the DDR method. Thus, even if a margin of the setup/hold period in the latch circuits 252, 253 is taken into consideration, a stable operation becomes possible if a period of, for example, two clocks is secured as the issuing period of the address.

In the second embodiment, the address decoder circuit 251 may be configured such that one of the latch circuits 252, 253 is driven when a rise is detected during detection of the LSET_X signal by the DDR method and the other of the latch circuits 252, 253 is driven when a fall is detected. For example, when a rise of the LSET_X signal is detected, the latch circuit 253 may be driven and when a fall of the LSET_X signal is detected, the latch circuit 252 may be driven. By configuring the address decoder circuit 251 in this manner, when, for example, a rise of the LSET_X signal is detected, the latch circuit 253 is driven and the RLQ signal and the XRLQ signal as control signals to cause pixels of the selected pixel row to perform a read operation are output and when, for example, a fall of the LSET_X signal is detected, the latch circuit 252 is driven and the SLQ signal and the XSLQ signal as control signals to cause pixels of the selected pixel row to perform an electronic shutter operation are output. In the subsequent pixel timing drive circuit, a drive signal to cause pixels of the corresponding pixel row to perform a read operation or an electronic shutter operation is generated based on these control signals. In the second embodiment, as described above, by applying the DDR method, the address decoder circuit 251 can perform processing to cause pixels of the selected pixel row to perform a read operation and processing to cause pixels of the selected pixel row to perform an electronic shutter operation by the latch reset signal of one system. The address decoder circuit 251 is at least configured to generate a control signal to cause pixels of the pixel row identified by a V address signal to perform a read operation or an electronic shutter operation by the V address signal and a latch reset signal being input in appropriate timing and the configuration thereof is not limited to the configuration example shown in FIG. 15. For example, the address decoder circuit 251 may include a different circuit from the latch circuit as the memory circuit and the configuration of the logical gate may also be appropriately designed to have the above function.

[3-2 Timing Chart of Whole Solid State Image Sensor]

Figure 17:
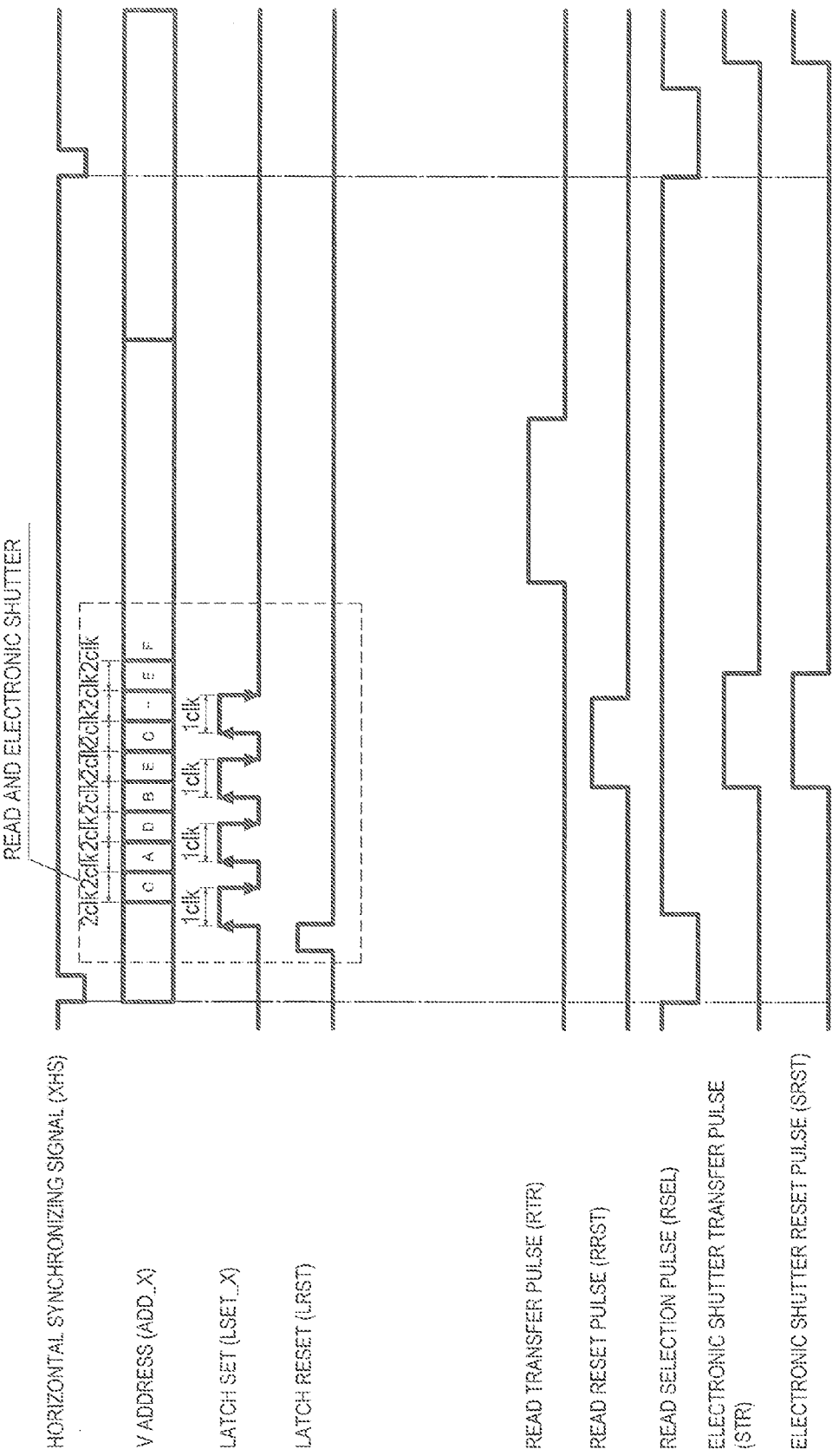
FIG. 17 is a diagram showing a timing chart of the operation of the whole solid state image sensor according to the second embodiment.

Next, the operation of the whole solid state image sensor according to the second embodiment will be described with reference to FIG. 17. FIG. 17 is a diagram showing a timing chart of the operation of the whole solid state image sensor according to the second embodiment. In FIG. 17, the timing of signals input from the sensor controller according to the second embodiment of the present disclosure into the pixel timing drive unit and the address decoder unit in the 1H period is illustrated. More specifically, the timing of V address signals (the ADD_X signal), latch input signals (the LSET_X signal and the LRST signal), and pixel drive pulses (the RTR pulse, the RRST pulse, the RSEL pulse, the STR pulse, and the SRST pulse) in the 1H period is illustrated.

In the example shown in FIG. 17, the LRST signal is first input into the address decoder circuit 251 and the latch circuits 252, 253 are reset and then, the ADD_X signal and the LSET_X signal are input in predetermined timing. In the second embodiment, as described above, the LSET_X signal as a latch set signal is detected through its rise and fall. Therefore, as shown in FIG. 17, the input timing of the LSET_X signal and the V address signal is appropriately controlled such that the rise or fall of the LSET_X signal is detected during input of a signal to identify each pixel row in the V address signal.

The address decoder circuit 251 generates latch output signals (the RLQ signal, the XRLQ signal, the SLQ signal, and the XSLQ signal) related to a read operation or an electronic shutter operation based on the rise or fall of the detected LSET_X signal and the V address signal when the rise or fall is detected and outputs these signals to the subsequent pixel timing drive unit. In the second embodiment, as described above, the address decoder circuit 251 may be configured such that when, for example, the rise of the LSET_X signal is detected, the RLQ signal and the XRLQ signal as control signals to cause pixels of the selected pixel row to perform a read operation and when, for example, the fall of the LSET_X signal is detected, the SLQ signal and the XSLQ signal as control signals to cause pixels of the selected pixel row to perform an electronic shutter operation. Therefore, for example, in the second embodiment, for example, with a rise of the LSET_X signal being detected, a read operation is performed on pixels of the pixel row represented by the V address signal input in the timing when the rise is detected and with a fall being detected, an electronic shutter operation is performed on pixels of the pixel row represented by the V address signal input in the timing when the fall is detected. The timing of the V address signal, the latch input signal, and the latch output signal in the address decoder circuit 251 is similar to, for example, the timing shown in FIG. 16 and so a detailed description thereof is omitted.

Next, the RTR pulse, the RRST pulse, the RSEL pulse, the STR pulse, and the SRST pulse as pixel drive pulses related to a read operation or an electronic shutter operation are input from the sensor controller into the pixel timing drive unit in predetermined timing by matching the input timing of the V address signal, the LRST signal, and the LSET_X signal. In the example shown in FIG. 17, as the RTR pulse, the RRST pulse, the RSEL pulse, the STR pulse, and the SRST pulse, the timing of the RTR pulse, the RRST pulse, the RSEL pulse, the STR pulse, and the SRST pulse to the pixel timing drive circuit corresponding to some pixel row for which the V address signal is issued as a pixel row for which a read operation or an electronic shutter operation is performed is illustrated. Actually, the RTR pulse, the RRST pulse, the RSEL pulse, the STR pulse, and the SRST pulse may also be input into the pixel timing drive circuit corresponding to other pixel rows specified as pixel rows for which a read operation or an electronic shutter operation is performed in similar timing, for example, relative to timing when the V address signal is input.

The pixel timing drive unit outputs drive signals (the TRG signal, the RST signal, and the SEL signal) to drive pixels so as to cause the pixels to perform a read operation or an electronic shutter operation based on these pixel drive pulses and the RLQ signal or the SLQ signal input from the address decoder circuit 251. Thus, in the solid state image sensor according to the second embodiment, the operation of pixels of the selected pixel row can be controlled by the sensor controller such that the pixels perform a read operation or an electronic shutter operation in desired timing. The timing of pixel drive pulses in the 1H period may be like in the first embodiment and is similar to, for example, the timing described with reference to FIG. 3 and so a detailed description thereof is omitted.

[3-3. Comparison of Address Decoder Circuit According to Second Embodiment and Common Address Decoder Circuit]

Next, an address decoder circuit according to the second embodiment and a common address decoder circuit will be compared.

Figure 18:
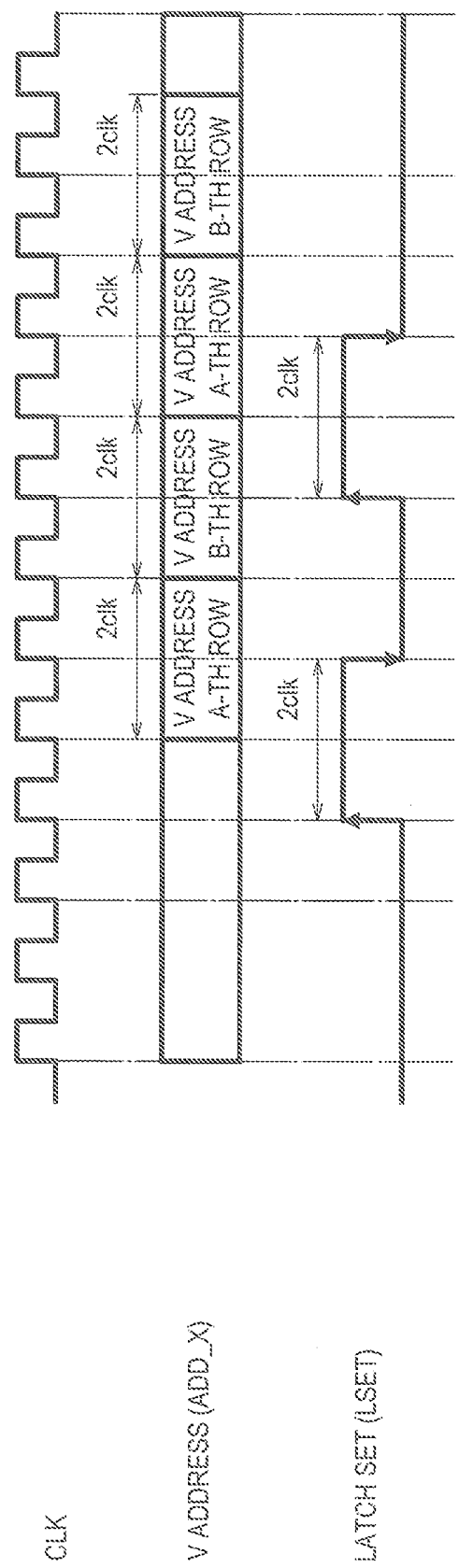
FIG. 18 is an explanatory view illustrating a relationship between a V address signal and a latch set signal (LSET signal) in the address decoder circuit according to the second embodiment.

For the comparison, FIG. 18 shows, among signals related to the operation of the address decoder circuit 251 according to the second embodiment of the present disclosure, the relationship particularly between the V address signal and the latch set signal (LSET signal). FIG. 18 is a diagram corresponding to FIG. 14 described above and an explanatory view illustrating the relationship between the V address signal and the latch set signal (LSET signal) in the address decoder circuit 251 according to the second embodiment of the present disclosure.

In FIG. 18, a timing chart of, among signals related to the operation of the address decoder circuit 251, the CLK signal, the ADD_X signal as a V address signal, and the LSET_X signal is illustrated. Comparison of the timing chart shown in FIG. 18 and the timing chart of the V address signal and the LSET signal in the common address decoder circuit 551 shown in FIG. 14 shows that issuing periods the V address signal to identify each pixel row are different.

In the common address decoder circuit 551, as shown in FIG. 12, the single data rate (SDR) method that detects one edge (the rise or fall) of a pulse is applied when a latch set signal (the RLSET_X signal, the SLSET_X signal) is detected. Thus, as described in [2-1. Configuration of Common Address Decoder Circuit] above, in consideration of a margin of the setup/hold period in the latch circuits 552, 553 of the address decoder circuit 551, it is preferable to secure a period of at least three clocks as an address issuing period. Therefore, the reduction of length of the 1H period is limited and it is difficult to take photographs faster while preventing deterioration in quality by blooming On the other hand, in the address decoder circuit 251 according to the second embodiment, as described above, the DDR method is applied to detect the LSET signal. Thus, even if a margin of the setup/hold period in the latch circuits 252, 253 of the address decoder circuit 251 is taken into consideration, a stable operation becomes possible if a period of at least two clocks is secured as the issuing period of the V address signal to identify each pixel row. Thus, in the second embodiment, as shown in FIG. 18, the issuing period of the V address signal is reduced to two clocks by applying the DDR method. In the second embodiment, therefore, even if an electronic shutter operation and a read operation are both performed within the 1H period, improvement in quality and faster photographing can both be realized because the length of the 1H period can further be reduced.

In the second embodiment, the different latch circuits 252, 253 may be driven in the rise and the fall of the latch set signal. Also, the latch circuits 252, 253 may be reset by the latch reset signal of one system. In the second embodiment, therefore, the latch circuit 252 as an electronic shutter operation latch circuit and the latch circuit 253 as a read operation latch circuit can both be driven by the latch set signal of one system and the latch reset signal of one system. In the common address decoder circuit 551, signals of two systems for a read operation and an electronic shutter operation exist for each of the latch set signal and the latch reset signal. In the second embodiment, the number of systems of the latch set signal and the latch reset signal can be reduced by applying the DDR method and therefore, the layout area (circuit area) can be made smaller and power consumption can be reduced.

In the above embodiment, a case when the address decoder circuit 251 is configured such that one of a read operation and an electronic shutter operation is performed after the rise or fall of the LSET signal being detected, but the second embodiment is not limited to such an example. In the present embodiment, processing performed when the rise of the LSET signal is detected and processing performed when the fall of the LSET signal is detected are not limited to the above example and various kinds of processing performed by a solid state image sensor may be allocated. When, for example, moving images are taken by a solid state image sensor, the solid state image sensor may be configured such that when the rise of the LSET signal is detected, captured images are generated in a lower frame rate and a pixel signal corresponding to the preview mode in which so-called images are output to the user is read and when the fall of the LSET signal is detected, captured images are generated in a higher frame rate and a pixel signal corresponding to the auto-focus mode in which processing to determine the focal position based on obtained captured image is performed is read.

In recent years, still more pixels and speedups of a solid state image sensor are demanded and still more speedups of processing in the address decoder unit is also demanded. Until now, processing methods of the address decoder unit in an existing common solid state image sensor are considered that required specifications may be satisfied, but in view of the above circumstances, satisfying demands of still more speedups by processing methods of the address decoder unit in a common solid state image sensor in the future is assumed to be difficult. In the aforementioned second embodiment, as described above, not only the 1H period is reduced (that is, the processing speed is accelerated) by applying the DDR method to detect the LSET signal, but also a higher-functionality solid state image sensor can be realized by the solid state image sensor being configured to perform various kinds of mutually different processing for the rise and the fall of the LSET signal.

4. Third Embodiment

The third embodiment of the present disclosure will be described. A solid state image sensor according to the third embodiment of the present disclosure corresponds to an embodiment in which the configuration of an address decoder unit is different from that of the solid state image sensor 10 according to the first embodiment described above. In the description of the third embodiment below, therefore, the configuration of the address decoder unit will mainly be described by focusing on differences from the first embodiment and a detailed description of the other configuration of the solid state image sensor is omitted. The third embodiment corresponds to an embodiment which includes the first embodiment and the second embodiment described above. The solid state image sensor according to the third embodiment may be, like the solid state image sensor 10 according to the first embodiment, for example, a CMOS image sensor.

[4-1. Configuration of Address Decoder Circuit]

Figure 19:
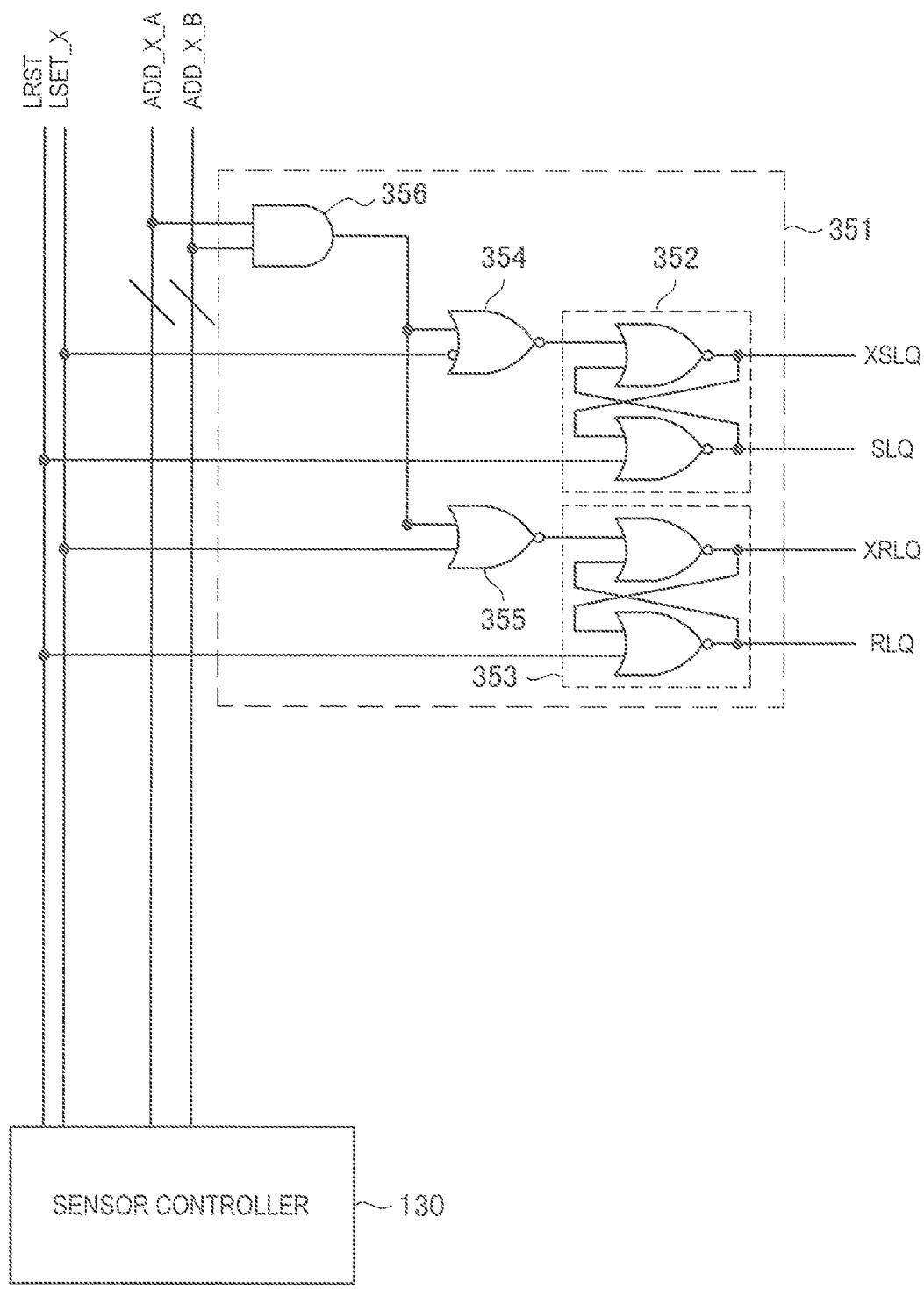
FIG. 19 is a diagram showing the equivalent circuit of an address decoder circuit according to the third embodiment.
Figure 20:
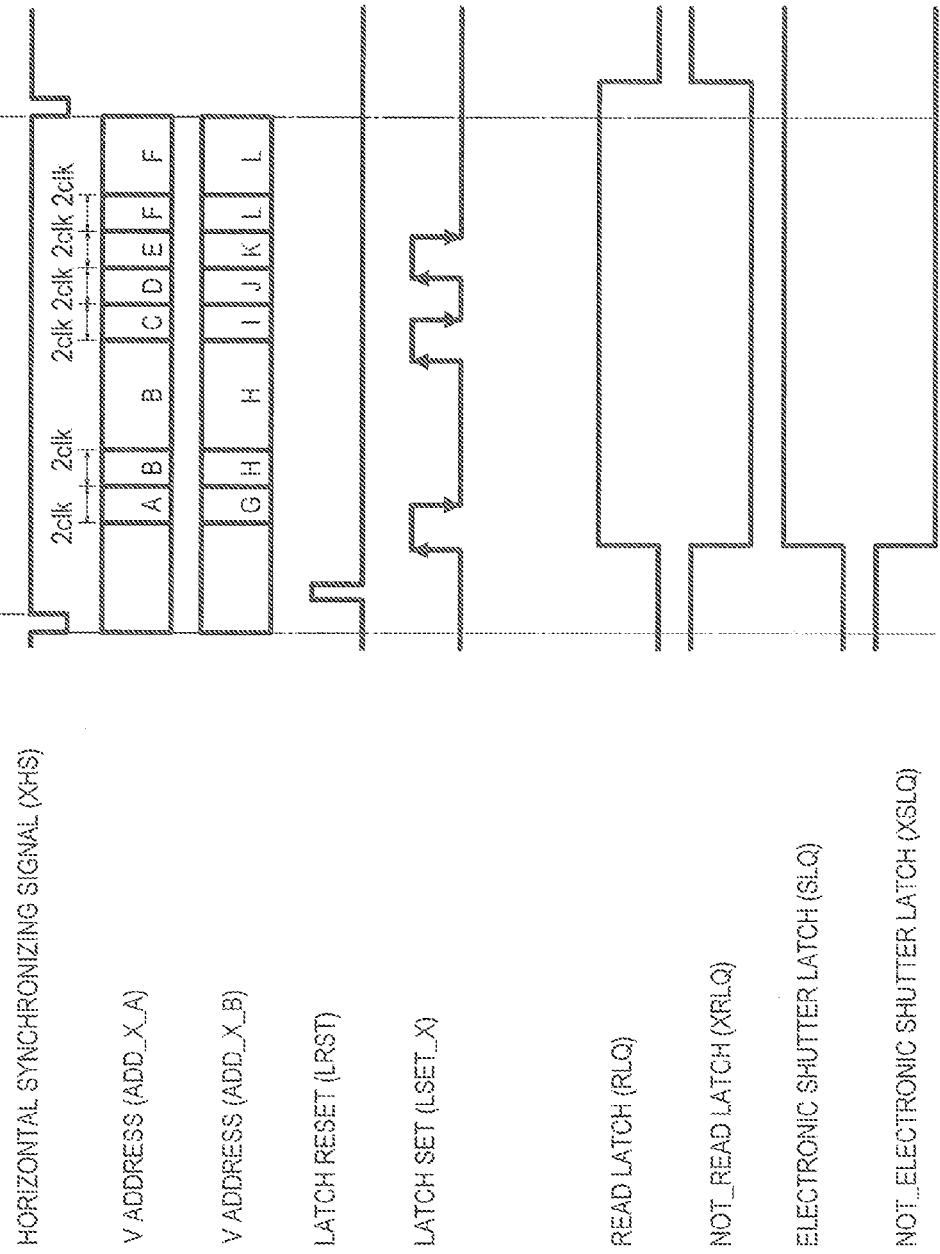
FIG. 20 is a diagram showing a timing chart of the operation of the address decoder circuit according to the third embodiment shown in FIG. 19.

Also, in a solid state image sensor according to the third embodiment of the present disclosure, the address decoder unit includes a plurality of address decoder circuits corresponding to each pixel row of a pixel array. The configuration of an address decoder circuit constituting the address decoder unit of the solid state image sensor according to the third embodiment of the present disclosure will be described with reference to FIGS. 19 and 20. FIG. 19 is a diagram showing an equivalent circuit of the address decoder circuit according to the third embodiment of the present disclosure. FIG. 20 is a diagram showing a timing chart of the operation of the address decoder circuit according to the third embodiment of the present disclosure shown in FIG. 19.

Referring to FIG. 19, an address decoder circuit 351 according to the third embodiment of the present disclosure includes two latch circuits 352, 353 and is configured to generate an electronic shutter latch output signal (SLQ signal), a negative logic (NOT) electronic shutter latch output signal (XSLQ signal), a read latch output signal (RLQ signal), and a negative logic (NOT) read latch output signal (XRLQ signal) as control signals based on latch input signals (a LSET_X signal and a LRST signal) as an input signal into the latch circuits 352, 353 and V address signals (an ADD_X_A signal and an ADD_X_B signal) to identify the pixel row in the pixel array. The latch circuits 352, 353 are, for example, so-called SR latches. The latch input signals and the V address signal are input from a sensor controller (having a function similar to that of the sensor controller 130 shown, for example, in FIG. 1) provided inside the solid state image sensor according to the third embodiment into the address decoder circuit 351.

The LRST signal is applied to the input terminal on the Reset side of the latch circuits 352, 353 and is a latch reset signal to reset the latch circuits 352, 353. The LSET_X signal is applied to the input terminal on the Set side of the latch circuits 352, 353 and is a latch reset signal to cause the latch circuits 352, 353 to hold the value of the V address signal. Also in the third embodiment, like in the second embodiment, the DDR method is applied to detect the LSET_X signal. In the third embodiment, therefore, like in the second embodiment, both of the latch circuit 352 as an electronic shutter operation latch circuit and the latch circuit 353 as a read operation latch circuit are driven by a latch set signal (LSET_X signal) of one system and a latch reset signal (LRST signal) of one system.

A more detailed configuration of the address decoder circuit 351 will be described with reference to FIG. 19. A latch circuit 352 corresponds to the latch circuit 152 of the address decoder circuit 151 according to the first embodiment shown in FIG. 7. That is, the latch circuit 352 is an electronic shutter operation latch circuit that outputs a control signal to cause pixels of the pixel row identified by the V address signal to perform an electronic shutter operation. More specifically, the latch circuit 352 generates an electronic shutter latch output signal (SLQ signal) as a signal indicating whether an electronic shutter operation is performed for the relevant pixel row and a negative logic (NOT) electronic shutter latch output signal (XSLQ signal) as a negative logic signal of the SLQ signal based on the V address signal, the LRST signal, and the LSET_X signal. In the example shown in FIG. 19, the LRST signal input from the sensor controller is directly input into the input terminal on the Reset side of the latch circuit 352. A NOR gate 354 is provided prior to the latch circuit 352 and a logical sum of the LSET_X signal by the NOR gate 354 and a V address signal is input into the input terminal on the Set side of the latch circuit 352. However, the sign of the LSET_X signal is reversed before the signal being input into the NOR gate 354.

A latch circuit 353 corresponds to the latch circuit 153 of the address decoder circuit 151 according to the first embodiment shown in FIG. 7. That is, the latch circuit 353 is a read operation latch circuit that outputs a control signal to cause pixels of the pixel row identified by the V address signal to perform a read operation. More specifically, the latch circuit 353 generates a read latch output signal (RLQ signal) as a signal indicating whether a read operation is performed for the relevant pixel row and a negative logic (NOT) read latch output signal (XRLQ signal) as a negative logic signal of the RLQ signal based on the V address signal, the LRST signal, and the LSET_X signal. In the example shown in FIG. 19, the LRST signal input from the sensor controller is directly input into the input terminal on the Reset side of the latch circuit 353. A NOR gate 355 is provided prior to the latch circuit 353 and a logical sum of the RLSET_X signal by the NOR gate 355 and a V address signal is input into the input terminal on the Set side of the latch circuit 353.

The latch circuits 352, 353 are an example of the memory circuit that holds a predetermined signal value. In the third embodiment, the memory circuit has a function to hold a V address signal in response to a logical product of the V address signal and a memory input signal. The sensor controller according to the third embodiment can cause the address decoder circuit 351 to generate a control signal to cause pixels of the pixel row identified by the V address signal to perform a read operation or an electronic shutter operation by inputting the memory input signal into the address decoder circuit 351 together with the V address signal.

In the third embodiment, the memory circuit having such a function is realized by the latch circuits 352, 353 as SR latches. The latch set signal (the aforementioned LSET_X) is input into the latch circuits 352, 353 as the memory input signal and the latch circuits 352, 353 can hold the V address signal in response to a logical product of the V address signal and the latch set signal. The sensor controller according to the second embodiment may cause the address decoder circuit 351 to generate a control signal to cause pixels of the pixel row identified by the V address signal to perform a read operation or an electronic shutter operation by inputting the latch set signal into the address decoder circuit 351 together with the V address signal.

In the third embodiment, similarly to the first embodiment, V address signals (the ADD_X_A signal and the ADD_X_B signal) of two mutually different systems are input into the address decoder circuit 351. The address decoder circuit 351 is provided with an AND gate 356 prior to NOR gates 354, 355 and a logical product of the ADD_X_A signal and the ADD_X_B signal by the AND gate 356 is input into the NOR gates 354, 355 as a V address signal. In FIG. 19, the signal wire indicating the ADD_X_A signal or the ADD_X_B signal is illustrated as a bus as a single line. The sensor controller can issue V address signals such that a pixel row within the bus of the system of the ADD_X_A signal is identified and at the same time, a different pixel row is identified within the bus of the system of the ADD_X_B signal. In the third embodiment, therefore, mutually different V address signals to identify two mutually different pixel rows can be output from the sensor controller to the address decoder circuit 151 in the same timing. The gate into which the ADD_X_A signal and the ADD_X_B signal are input is not limited to the AND gate 356 and may be a logical gate of other types. The address decoder circuit 351 is at least configured to generate a control signal to cause pixels of the pixel row identified by a V address signal to perform a read operation or an electronic shutter operation by the V address signal and a latch set signal being input in appropriate timing and the configuration thereof is not limited to the configuration example shown in FIG. 19. For example, the address decoder circuit 351 may include a different circuit from the latch circuit as the memory circuit and the configuration of the logical gate may also be appropriately designed to have the above function.

The operation of the address decoder circuit 351 according to the third embodiment will be described with reference to FIG. 20. In FIG. 20, the timing of a V address signal (the ADD_X_A signal and the ADD_X_B signal), latch input signals (the LRST signal and the LSET_X signal), and control signals (the SLQ signal, the XSLQ signal, the RLQ signal, and the XRLQ signal) as output of the address decoder circuit 251 in the 1H period is illustrated. In the example shown in FIG. 20, as the SLQ signal, the XSLQ signal, the RLQ signal, and the XRLQ signal, the timing of the SLQ signal, the XSLQ signal, the RLQ signal, and the XRLQ signal in the address decoder circuit 251 corresponding to some pixel row for which the V address signal is issued as a pixel row for which an electronic shutter operation or a read operation is performed is illustrated. In reality, the address decoder circuit 251 corresponding to other pixel rows specified as pixel rows for which an electronic shutter operation or a read operation is performed can also output the SLQ signal, the XSLQ signal, the RLQ signal, and the XRLQ signal in similar timing, for example, relative to timing when a V address signal is input.

Referring to FIG. 20, the LRST signal is first input into the address decoder circuit 351 and both of the latch circuits 352, 353 are reset. In the common address decoder circuit 551 described with reference to FIG. 12, the RLRST signal to reset the read operation latch circuit 553 and the SLRST signal to reset the electronic shutter operation latch circuit 552 are input as signals of different systems, but in the third embodiment, similarly to the second embodiment, both of the latch circuits 352, 353 are reset by the latch reset signal of one system.

Next, the ADD_X_A signal, the ADD_X_B signal and the LSET_X signal are input into the address decoder circuit 351. In the third embodiment, as described above, the DDR method is applied for detection of the LSET_X signal. A latch set operation in the latch circuits 352, 353 is performed by using detection of rising and falling edges on both sides as a trigger after the LSET_X signal being detected by the DDR method. Thus, even if a margin of the setup/hold period is taken into consideration, a stable operation becomes possible if a period of, for example, two clocks is secured as the issuing period of the address.

In the third embodiment, similarly to the second embodiment, the address decoder circuit 351 may be configured such that one of the latch circuits 352, 353 is driven when a rise is detected during detection of the LSET_X signal by the DDR method and the other of the latch circuits 352, 353 is driven when a fall is detected. For example, when a rise of the LSET_X signal is detected, the latch circuit 353 may be driven and when a fall of the LSET_X signal is detected, the latch circuit 352 may be driven. By configuring the address decoder circuit 351 in this manner, when, for example, a rise of the LSET_X signal is detected, the latch circuit 353 is driven and the RLQ signal and the XRLQ signal as control signals to cause pixels of the selected pixel row to perform a read operation are output and when, for example, a fall of the LSET_X signal is detected, the latch circuit 352 is driven and the SLQ signal and the XSLQ signal as control signals to cause pixels of the selected pixel row to perform an electronic shutter operation are output. In the subsequent pixel timing drive circuit, a drive signal to cause pixels of the corresponding pixel row to perform a read operation or an electronic shutter operation is generated based on these control signals. In the third embodiment, as described above, by applying the DDR method, the address decoder circuit 351 can perform processing to cause pixels of the selected pixel row to perform a read operation and processing to cause pixels of the selected pixel row to perform an electronic shutter operation by the latch reset signal of one system.

Further in the third embodiment, like in the first embodiment, V address signals of two mutually different systems are input into the address decoder circuit 351. In the example shown in FIG. 20, V address signals identifying the pixel row A, the pixel row B, the pixel row C, the pixel row D, the pixel row E, and the pixel row F are input as V address signals of the system represented by the ADD_X_A signal and V address signals identifying the pixel row G, the pixel row H, the pixel row I, the pixel row J, the pixel row K, and the pixel row L are input as V address signals of the system represented by the ADD_X_B signal in the 1H period. In the third embodiment, as shown in FIG. 20, V address signals to identify two mutually different pixel rows can be input into the address decoder circuit 351 in the same timing.

[4-2 Timing Chart of Whole Solid State Image Sensor]

Figure 21:
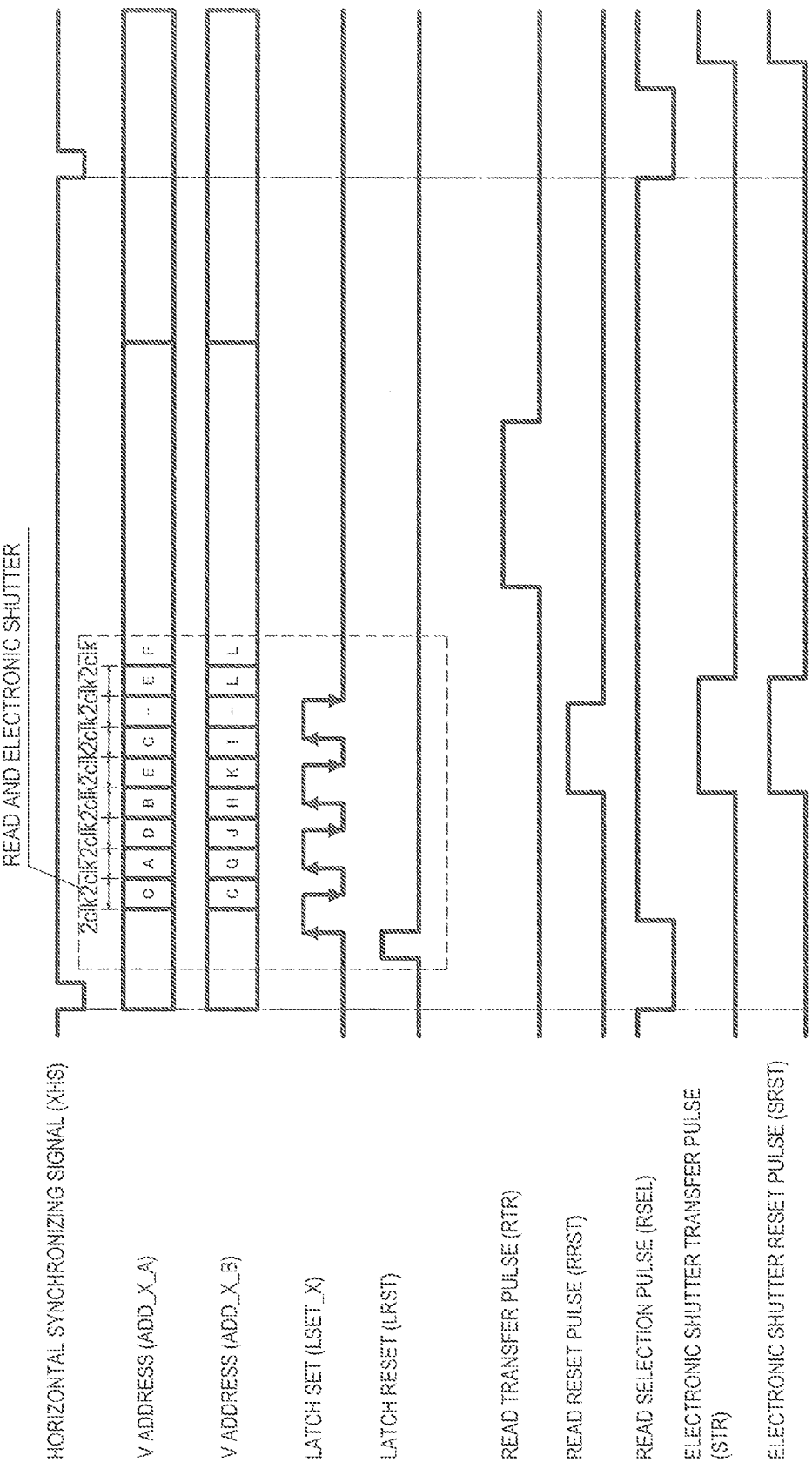
FIG. 21 is a diagram showing a timing chart of the operation of the whole solid state image sensor according to the third embodiment.

Next, the operation of the whole solid state image sensor according to the third embodiment will be described with reference to FIG. 21. FIG. 21 is a diagram showing a timing chart of the operation of the whole solid state image sensor according to the third embodiment. In FIG. 21, the timing of signals input from the sensor controller into the pixel timing drive unit 140 and the address decoder in the 1H period is illustrated. More specifically, the timing of V address signals (the ADD_X_A signal and the ADD_X_B signal), latch input signals (the LSET_X signal and the LRST signal), and pixel drive pulses (the RTR pulse, the RRST pulse, the RSEL pulse, the STR pulse, and the SRST pulse) in the 1H period is illustrated.

In the example shown in FIG. 21, the LRST signal is first input into the address decoder circuit 351 and the latch circuits 352, 353 are reset and then, the ADD_X_A signal, the ADD_X_B signal and the LSET_X signal are input in predetermined timing. Here, as described above, in the third embodiment, the V address signals (the ADD_X_A signal and the ADD_X_B signal) to identify two mutually different pixel rows can be input into the address decoder circuit 351 in the same timing. In addition, in the second embodiment, as described above, the LSET_X signal as a latch set signal is detected through its rise and fall. Therefore, as shown in FIG. 21, the input timing of the LSET_X signal and the V address signal is appropriately controlled such that the rise or fall of the LSET_X signal is detected during input of a signal to identify each pixel row in the V address signal of two mutually different systems.

The address decoder circuit 351 generates latch output signals (the RLQ signal, the XRLQ signal, the SLQ signal, and the XSLQ signal) related to a read operation or an electronic shutter operation based on the rise or fall of the detected LSET_X signal and the V address signal when the rise or fall is detected and outputs these signals to the subsequent pixel timing drive unit. In the third embodiment, as described above, the address decoder circuit 351 may be configured such that when, for example, the rise of the LSET_X signal is detected, the RLQ signal and the XRLQ signal as control signals to cause pixels of the selected pixel row to perform a read operation and when, for example, the fall of the LSET_X signal is detected, the SLQ signal and the XSLQ signal as control signals to cause pixels of the selected pixel row to perform an electronic shutter operation. Therefore, for example, in the third embodiment, for example, with a rise of the LSET_X signal being detected, a read operation is performed on pixels of the pixel row represented by the V address signal input in the timing when the rise is detected and with a fall being detected, an electronic shutter operation is performed on pixels of the pixel row represented by the V address signal input in the timing when the fall is detected. The timing of the V address signal, the latch input signal, and the latch output signal in the address decoder circuit 351 is similar to, for example, the timing shown in FIG. 20 and so a detailed description thereof is omitted.

Next, the RTR pulse, the RRST pulse, the RSEL pulse, the STR pulse, and the SRST pulse as pixel drive pulses related to a read operation or an electronic shutter operation are input into the pixel timing drive unit in predetermined timing by matching the input timing of the V address signal, the LRST signal, and the LSET_X signal. In the example shown in FIG. 21, as the RTR pulse, the RRST pulse, the RSEL pulse, the STR pulse, and the SRST pulse, the timing of the RTR pulse, the RRST pulse, the RSEL pulse, the STR pulse, and the SRST pulse to the pixel timing drive circuit corresponding to some pixel row for which the V address signal is issued as a pixel row for which a read operation or an electronic shutter operation is performed is illustrated. Actually, the RTR pulse, the RRST pulse, the RSEL pulse, the STR pulse, and the SRST pulse may also be input into the pixel timing drive circuit corresponding to other pixel rows specified as pixel rows for which a read operation or an electronic shutter operation is performed in similar timing, for example, relative to timing when the V address signal is input.

The pixel timing drive unit outputs drive signals (the TRG signal, the RST signal, and the SEL signal) to drive pixels so as to cause the pixels to perform a read operation or an electronic shutter operation based on these pixel drive pulses and the RLQ signal or the SLQ signal input from the address decoder circuit 351. Thus, in the solid state image sensor according to the third embodiment, the operation of pixels of the selected pixel row can be controlled by the sensor controller such that the pixels perform a read operation or an electronic shutter operation in desired timing. The timing of pixel drive pulses in the 1H period may be like in the first embodiment and is similar to, for example, the timing described with reference to FIG. 3 and so a detailed description thereof is omitted.

[4-3. Comparison of Address Decoder Circuit According to Third Embodiment and Common Address Decoder Circuit]

Next, an address decoder circuit according to the third embodiment and a common address decoder circuit will be compared.

Figure 22:
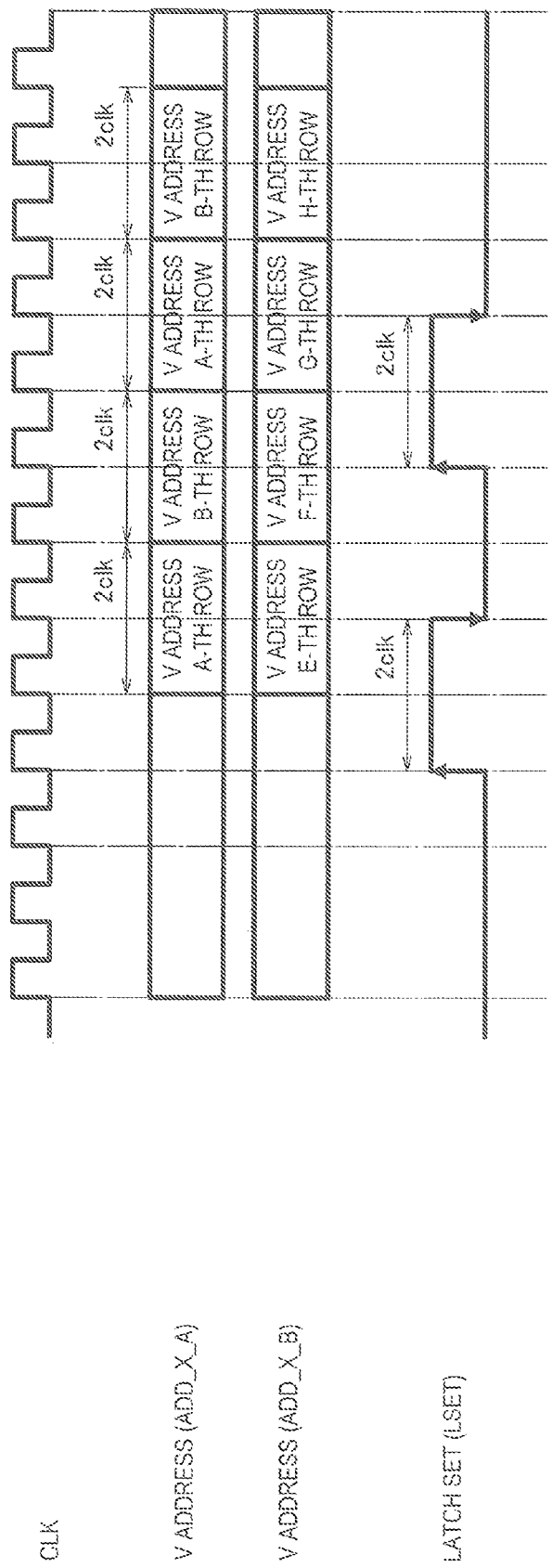
FIG. 22 is an explanatory view illustrating a relationship between a V address signal and a latch set signal (LSET signal) in the address decoder circuit according to the third embodiment.

For the comparison, FIG. 22 shows, among signals related to the operation of the address decoder circuit 351 according to the third embodiment of the present disclosure, the relationship particularly between the V address signal and the latch set signal (LSET signal). FIG. 22 is a diagram corresponding to FIG. 14 described above and an explanatory view illustrating the relationship between the V address signal and the latch set signal (LSET signal) in the address decoder circuit 351 according to the third embodiment of the present disclosure.

In FIG. 22, a timing chart of, among signals related to the operation of the address decoder circuit 351, the CLK signal, the ADD_X_A signal and the ADD_X_B signal as a V address signal, and the LSET_X signal is illustrated. Comparison of the timing chart shown in FIG. 22 and the timing chart of the V address signal and the LSET signal in the common address decoder circuit 551 shown in FIG. 14 shows that an issuing period of the V address signal to identify each pixel row and the number of systems of V address signals are different.

Here, the issuing period of the V address signal will be described. In the common address decoder circuit 551, as described above, the single data rate (SDR) method is applied to detect the LSET signal. Thus, in consideration of a margin of the setup/hold period in the latch circuits 552, 553 of the address decoder circuit 551, it is preferable to secure a period of at least three clocks as an address issuing period. Therefore, the reduction of length of the 1H period is limited and it is difficult to take photographs faster while preventing deterioration in quality by blooming On the other hand, in the address decoder circuit 351 according to the third embodiment, as described above, the DDR method is applied to detect the LSET_X signal. Thus, even if a margin of the setup/hold period in the latch circuits 352, 353 of the address decoder circuit 351 is taken into consideration, a stable operation becomes possible if a period of at least two clocks is secured as the issuing period of the V address signal to identify each pixel row. Thus, in the third embodiment, as shown in FIG. 22, the issuing period of the V address signal is reduced to two clocks by applying the DDR method. In the third embodiment, therefore, even if an electronic shutter operation and a read operation are both performed within the 1H period, improvement in quality and faster photographing can both be realized because the length of the 1H period can further be reduced.

In the third embodiment, the different latch circuits 352, 353 may be driven in the rise and the fall of the latch set signal. Also, the latch circuits 352, 353 may be reset by the latch reset signal of one system. In the third embodiment, therefore, the latch circuit 352 as an electronic shutter operation latch circuit and the latch circuit 353 as a read operation latch circuit can both be driven by the latch set signal of one system and the latch reset signal of one system. In the common address decoder circuit 551, signals of two systems for a read operation and an electronic shutter operation exist for each of the latch set signal and the latch reset signal. In the third embodiment, the number of systems of the latch set signal and the latch reset signal can be reduced by applying the DDR method and therefore, the layout area (circuit area) can be made smaller and power consumption can be reduced.

Next, the number of systems of V address signals will be described. As described above, the V address signal (ADD_X_A signal) of only one system is input into the common address decoder circuit 551. On the other hand, as shown in FIG. 22, V address signals of a plurality of mutually different system are input into the address decoder circuit 351 according to the third embodiment and therefore, a plurality of mutually different V address signals can be input in the same timing. In the example shown in FIG. 22, V address signals (the ADD_X_A signal and the ADD_X_B signal) of two mutually different systems are input into the address decoder circuit 351 and thus, when compared with the common case address decoder circuit 551, the number of pixel rows that can be identified by V address signals in the 1H period is doubled. Thus, the number of pixel rows for which an electronic shutter operation is performed in the 1H period is increased and, as a result, the 1H period can further be reduced. Therefore, when an electronic shutter operation and a read operation are both performed within the 1H period, still faster photographing is realized. Also in the third embodiment, like in the first embodiment, the number of systems of input V address signals is not limited to two and the address decoder circuit 151 can be configured such that V address signals of more systems can be input. With V address signals of more systems being input, the number of pixel rows of V address signals that can be issued in the 1H period further increases and thus, the length of the 1H period can further be reduced.

Thus, the third embodiment corresponds to an embodiment combining the first embodiment and the second embodiment. In the third embodiment, therefore, an effect obtained in the first embodiment and an effect obtained in the second embodiment are both obtained and when an electronic shutter operation and a read operation are both performed in the 1H period, still faster photographing can be realized while preventing deterioration in quality by blooming 5. Modification Next, a modification of the present embodiment will be described. The present modification corresponds to a modification of the aforementioned second embodiment. In the second embodiment, the latch set signal (LSET_X signal) is detected by the DDR method. Also, the address decoder circuit 251 is configured such that the different latch circuits 252, 253 are driven by the rise and the fall of the LSET_X signal. On the other hand, while the present modification is the same as the second embodiment in that the LSET_X signal is detected by the DDR method, the rise and the fall of the LSET_X signal are not distinguished and the latch circuit of the address decoder circuit is configured to hold a V address signal using detection of the rise or the fall of the LSET_X signal as a trigger. In the present modification, therefore, the LSET_X signal includes two systems of a read latch set signal (RLSET_X signal) and an electronic shutter latch set signal (SLSET_X signal). In the present embodiment, the timing of the RLSET_X signal and the timing of the SLSET_X signal can independently be controlled and thus, the present modification can be said to be a modification of the second embodiment in which the timing to perform a read operation and the timing to perform an electronic shutter operation are split.

Figure 23:
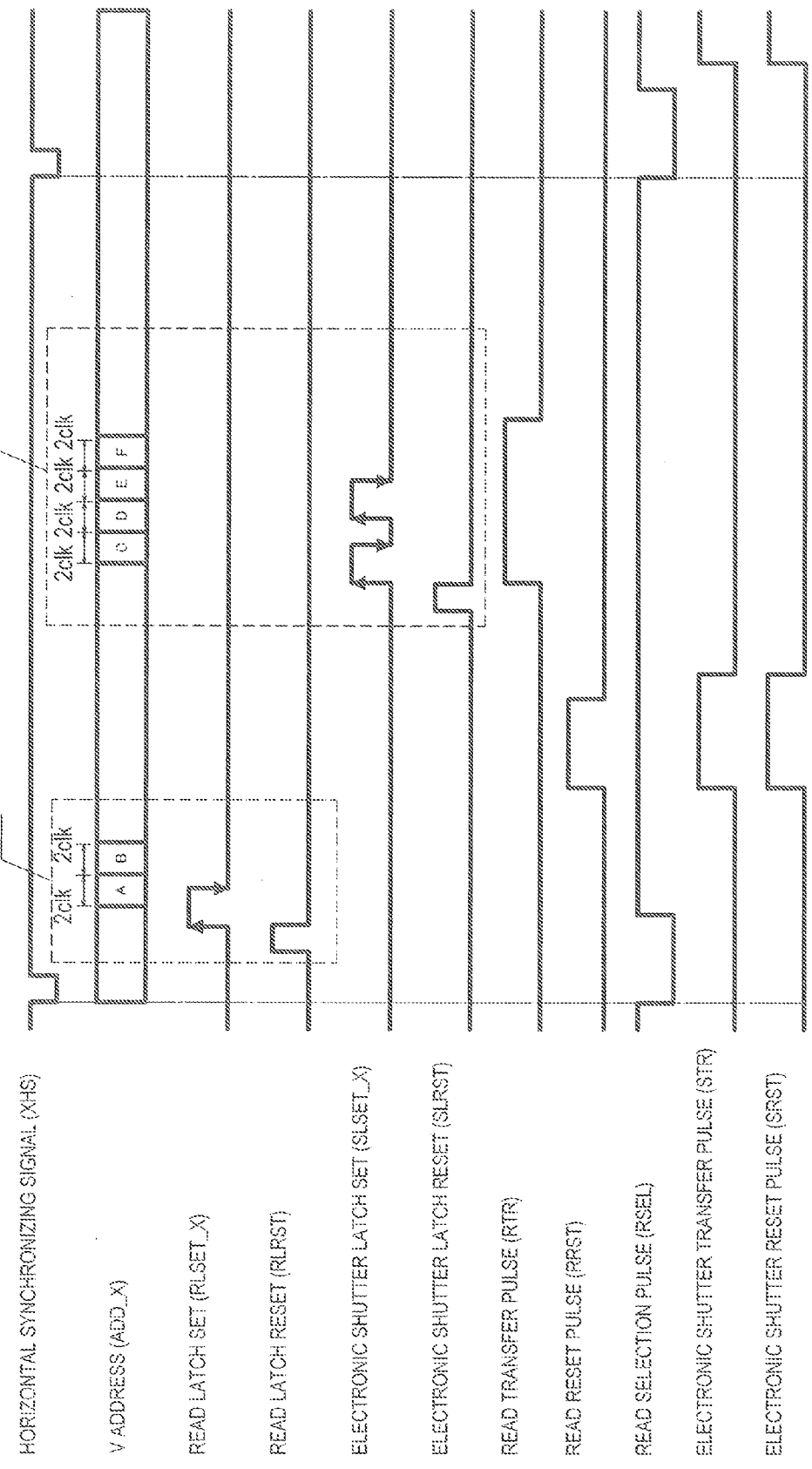
FIG. 23 is a timing chart showing the operation of the whole solid state image sensor in a modification in which the timing to perform a read operation and the timing to perform an electronic shutter operation are split in the second embodiment.

Such a modification of the second embodiment in which the timing to perform a read operation and the timing to perform an electronic shutter operation are split will be described with reference to FIG. 23. FIG. 23 is a timing chart showing the operation of the whole solid state image sensor in a modification in which the timing to perform a read operation and the timing to perform an electronic shutter operation are split in the second embodiment.

In FIG. 23, the timing of signals input from the sensor controller into the pixel timing drive unit or address decoder unit in the 1H period is illustrated. More specifically, the timing of a V address signal (the ADD_X signal), latch input signals (the RLRST signal, the RLSET_X signal, the SLRST signal, and the SLSET_X signal), and pixel drive pulses (the RTR pulse, the RRST pulse, the RSEL pulse, the STR pulse, and the SRST pulse) in the 1H period is illustrated.

The timing chart shown in FIG. 23 may be the same as the timing chart of the whole solid state image sensor 10 according to the first embodiment shown in FIG. 10 except that the DDR method is applied to detect the latch set signal (the RLSET_X signal, the SLSET_X signal) and the V address signal has only one system. In the example shown in FIG. 23, a read operation of pixels of two pixel rows (the pixel row A and the pixel row B) is performed in the first half of the 1H period. First, the RLRST signal is input into the address decoder circuit according to the present modification and two latch circuits provided in the address decoder circuits are both reset and then, the ADD_X signals representing the pixel row A and the pixel row B and the RLSET_X signal are input in predetermined timing. In the address decoder circuit, the RLSET_X signal is detected by the DDR method. Therefore, as described in the second embodiment, even if a margin of the setup/hold period in the latch circuit of the address decoder circuit is taken into consideration, a stable operation is guaranteed if a period of two clocks is secured as the issuing period of the V address signal to identify the pixel row for which a read operation is performed. The address decoder circuit according to the present embodiment generates the RLQ signal and the XRLQ signal as latch output signals related to a read operation based on the ADD_X signal and the RLSET_X signal and outputs the generated RLQ signal and XRLQ signal to a subsequent pixel timing drive circuit.

Next, the RTR pulse, the RRST pulse, and the RSEL pulse as pixel drive pulses related to a read operation are input into the pixel timing drive unit in predetermined timing by matching the input timing of the V address signals representing the pixel row A and the pixel row B, and the RLRST signal and the RLSET_X signal. In the example shown in FIG. 23, as the RTR pulse, the RRST pulse, and the RSEL pulse, the timing of the RTR pulse, the RRST pulse, and the RSEL pulse to the pixel timing drive circuit corresponding to some pixel row for which the V address signal is issued as a pixel row for which a read operation is performed is illustrated. Actually, the RTR pulse, the RRST pulse, and the RSEL pulse may also be input into the pixel timing drive circuit corresponding to other pixel rows specified as pixel rows for which a read operation is performed in similar timing, for example, relative to timing when the V address signal is input. The pixel timing drive unit outputs drive signals (the TRG signal, the RST signal, and the SEL signal) to drive pixels so as to cause the pixels to perform a read operation based on these pixel drive pulses and the RLQ signal input from the address decoder unit. Thus, in the solid state image sensor according to the present modification, the operation of pixels of the selected pixel row can be controlled by the sensor controller such that the pixels perform a read operation in desired timing. The timing of pixel drive pulses in the 1H period may be similar to, for example, the timing described with reference to FIG. 3 in the first embodiment and so a detailed description thereof is omitted.

In the example shown in FIG. 23, an electronic shutter operation of pixels of four pixel rows (the pixel row C, the pixel row D, the pixel row E and the pixel row F) is performed in the second half of the 1H period. First, the SLRST signal is input into the address decoder circuit according to the present modification and two latch circuits provided in the address decoder circuits are both reset and then, the ADD_X signals representing the pixel row C, the pixel row D, the pixel row E and the pixel row F and the SLSET_X signal are input in predetermined timing. In the address decoder circuit, the SLSET_X signal is detected by the DDR method. Therefore, as described in the second embodiment, even if a margin of the setup/hold period in the latch circuit of the address decoder circuit is taken into consideration, a stable operation is guaranteed if a period of two clocks is secured as the issuing period of the V address signal to identify the pixel row for which an electronic shutter operation is performed. The address decoder circuit according to the present embodiment generates the SLQ signal and the XSLQ signal as latch output signals related to an electronic shutter operation based on the ADD_X signal and the SLSET_X signal and outputs the generated SLQ signal and XSLQ signal to a subsequent pixel timing drive circuit.

Next, the STR pulse and the SRST pulse as pixel drive pulses related to an electronic shutter operation are input into the pixel timing drive unit in predetermined timing by matching the input timing of the V address signals representing the pixel row C, the pixel row D, the pixel row E and the pixel row F, and the SLRST signal and the SLSET_X signal. In the example shown in FIG. 23, as the STR pulse and the SRST pulse, the timing of the STR pulse and the SRST pulse to the pixel timing drive circuit corresponding to one pixel row for which the V address signal is issued as a pixel row for which an electronic shutter operation is performed is illustrated. Actually, the STR pulse and the SRST pulse may also be input into the pixel timing drive circuit corresponding to other pixel rows specified as pixel rows for which an electronic shutter operation is performed in similar timing, for example, relative to timing when the V address signal is input. The pixel timing drive unit outputs drive signals (the TRG signal and the RST signal) to drive pixels so as to cause the pixels to perform an electronic shutter operation based on these pixel drive pulses and the SLQ signal input from the address decoder unit. Thus, in the solid state image sensor according to the present modification, the operation of pixels of the selected pixel row can be controlled by the sensor controller such that the pixels perform an electronic shutter operation in desired timing. The timing of pixel drive pulses in the 1H period may be similar to, for example, the timing described with reference to FIG. 3 in the first embodiment and so a detailed description thereof is omitted.

In the foregoing, the modification in which the timing to perform a read operation and the timing to perform an electronic shutter operation are split in the second embodiment has been described with reference to FIG. 23. In the present modification, as described above, the RLSET_X signal and the SLSET_X signal are detected by the DDR method. Therefore, even if the setup/hold period in the latch circuit of the address decoder unit is taken into consideration, a stable operation is guaranteed if a period of two clocks is secured as the issuing period of the V address signal to identify the pixel row for which a read operation or an electronic shutter operation is performed. As described in <2. Comparison with Common Solid state image sensor> above, the SDR method is applied to detect the LSET signal in the common address decoder circuit 551 and in consideration of a margin of the setup/hold period in the latch circuits 552, 553 of the address decoder circuit 551, it is preferable to secure a period of at least three clocks as the issuing period of the V address signal to identify each pixel row. In the common solid state image sensor, therefore, the reduction of length of the 1H period is limited and it is difficult to take photographs faster while preventing deterioration in quality by blooming. In the present modification, on the other hand, as shown above, the issuing period of the V address signal to identify the pixel row can be shortened to two clocks. Therefore, the 1H period can be reduced and even if an electronic shutter operation and a read operation are both performed within the 1H period, improvement in quality and faster photographing can both be realized.

6. Application Example

Figure 24:
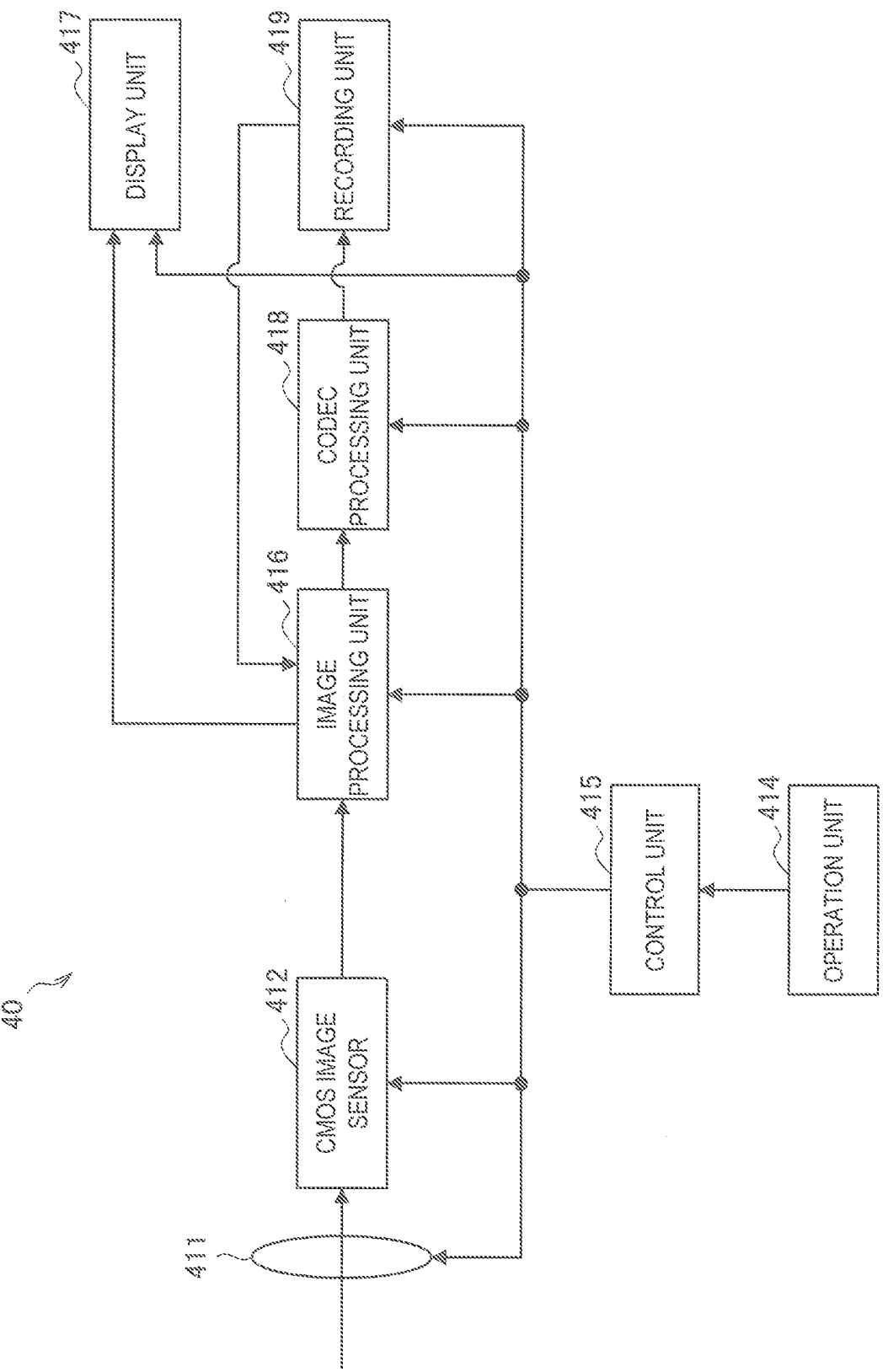
FIG. 24 is a functional block diagram showing a functional configuration of an imaging apparatus to which the solid state image sensor according to the first, second, or third embodiment is applied.

Next, an application example of the first, second, and third embodiments described above will be described. Here, as an example of an electronic device to which a solid state image sensor according to the first, second, or third embodiment can be applied, the configuration of, for example, a digital still camera or the like will be described with reference to FIG. 24. FIG. 24 is a functional block diagram showing a functional configuration of an imaging apparatus to which the solid state image sensor according to the first, second, or third embodiment is applied.

Referring to FIG. 24, an imaging apparatus 40 to which the first, second, or third embodiment is applied includes a lens unit 411, a CMOS image sensor 412, an operation unit 414, a control unit 415, an image processing unit 416, a display unit 417, a codec processing unit 418, and a recording unit 419. The imaging apparatus 40 is an apparatus that captures an image of a subject and outputs a captured image as an image of the subject as an electric signal.

The lens unit 411 is configured by optical elements such as lenses and a diaphragm and guides light from the subject to the CMOS image sensor 412. Driving of the lens unit 411 is controlled by the control unit 415. For example, in the lens unit 411, positions of various lenses are adjusted such that the subject is in focus or the diaphragm is adjusted such that the exposure value during photographing is a predetermined value under the control of the control unit 415. The light from the subject having passed through the lens unit 411 in which various parameters related to photographing such as the focus and exposure value are appropriately adjusted enters the CMOS image sensor 412.

The CMOS image sensor 412 is an example of the solid state image sensor that images a subject and corresponds to a solid state image sensor according to the first, second, or third embodiment. Driving of the CMOS image sensor 412 is controlled by the control unit 415 and a pixel signal as an output signal from each pixel in accordance with light from a subject is obtained by photoelectrically converting incident light from the subject by a photodiode in the pixel and AD-converting the potential in accordance with accumulated charges of each pixel. The CMOS image sensor 412 provides an obtained pixel signal to the image processing unit 416.

The operation unit 414 is configured by, for example, a jog dial (registered trademark), keys, buttons, a touch panel and the like and is an input interface to input information in accordance with operation input by the user into the imaging apparatus 40. Various kinds of information input by the user via the operation unit 414 are provided to the control unit 415 and the control unit 415 performs various kinds of processing based on the information.

The control unit 415 is configured by various processors like, for example, a CPU, a DSP and so on and controls the operation of the imaging apparatus 40 in a unified manner. For example, the control unit 415 controls driving of the lens unit 411, the CMOS image sensor 412, the image processing unit 416, the display unit 417, the codec processing unit 418, and the recording unit 419 to cause each unit to perform various kinds of processing related to imaging based on information in accordance with operation input of the user input via the operation unit 414. The control unit 415 may also have the function of the sensor controller 130 shown in FIG. 1. The function of the control unit 415 is realized by the processor constituting the control unit 415 being operated based on a predetermined program. The program may be stored in a storage device such as a read only memory (ROM) or a random access memory (RAM) (both are not shown) mounted inside the imaging apparatus 40 and the processor constituting the control unit 415 can perform a set of processing by accessing such a storage device and reading the relevant program.

The image processing unit 416 is configured by various processors like, for example, a CPU, a DSP and so on and generates a captured image as an image of the subject by performing various kinds of processing on a pixel signal provided from the CMOS image sensor 412. For example, the image processing unit 416 performs various kinds of signal processing that can be performed when a captured image is generated such as the black level correction processing, color mixing correction processing, defect correction processing, demosaic processing, matrix processing, gamma correction processing, and YC conversion on a pixel signal. The content of signal processing performed by the image processing unit 416 is optional and in addition to the above processing, the image processing unit 416 may perform various kinds of publicly known signal processing performed when a captured image is generated by a common imaging apparatus. The image processing unit 416 provides information about a generated captured image to the display unit 417 and the codec processing unit 418.

The display unit 417 is configured by, for example, a display apparatus such as a liquid crystal display apparatus and visually displays various kinds of information processed by the imaging apparatus 40 on the display screen thereof. For example, the display unit 417 displays a captured image (that is, an image of a subject) on the display screen thereof based on an image signal provided from the image processing unit 416. The display unit 417 may also display various kinds of information about photographing such as a setting screen to set various parameters related to photographing by the user on the display screen thereof.

The codec processing unit 418 is configured by various processors like, for example, a CPU, a DSP and so on and performs coding processing of a predetermined method on an image signal provided from the image processing unit 416. Image data obtained as a result of coding processing is provided to the recording unit 419. Various publicly known methods used for coding processing on a common image signal may be applied as the method of coding processing performed by the codec processing unit 418.

The recording unit 419 can record various kinds of information processed by the imaging apparatus 40. For example, the recording unit 419 records image data provided from the codec processing unit 418. Image data recorded in the recording unit 419 is read by the image processing unit 416 when necessary and provided to the display unit 417 to display the corresponding image on the display screen of the display unit 417. The recording unit 419 may be configured by various media used for recording image data of captured images in a common imaging apparatus.

As described above, the CMOS image sensor 412 of the imaging apparatus 40 corresponds to a solid state image sensor according to the first, second, or third embodiment. As described in <1. First Embodiment>, <3. Second Embodiment>, and <4. Third Embodiment> above, when an electronic shutter operation and a read operation are both performed within the 1H period, the 1H period can further be reduced, and improvement in quality and faster photographing can both be realized by a solid state image sensor according to the first, second, or third embodiment. Therefore, by applying a solid state image sensor according to the first, second, or third embodiment to the imaging apparatus 40, the imaging apparatus 40 capable of obtaining a higher-quality captured image under faster photographing conditions can be realized.

The configuration of the imaging apparatus 40 shown in FIG. 24 shows only a configuration example of an electronic device to which a solid state image sensor according to the first, second, or third embodiment can be applied. The configuration of the electronic device according to the present embodiment is not limited to the configuration illustrated in FIG. 24 and various publicly known configurations for an electronic device to which a solid state image sensor can be applied may be adopted.

7. Hardware Configuration

A series of operations of a solid state image sensor described in <1. First Embodiment>, <3. Second Embodiment>, or <4. Third Embodiment> above can be realized by various kinds of information processing being performed by the sensor controller 130 shown in FIG. 1 according to a predetermined program and operations of various components within the solid state image sensor being appropriately controlled. Such a program causing a solid state image sensor according to the first, second, or third embodiment to perform a series of operations may be installed, like the sensor controller 130 shown in FIG. 1, in a dedicated information processing apparatus like, for example, a microcomputer or installed in a general-purpose information processing apparatus like a personal computer (PC).

Figure 25:
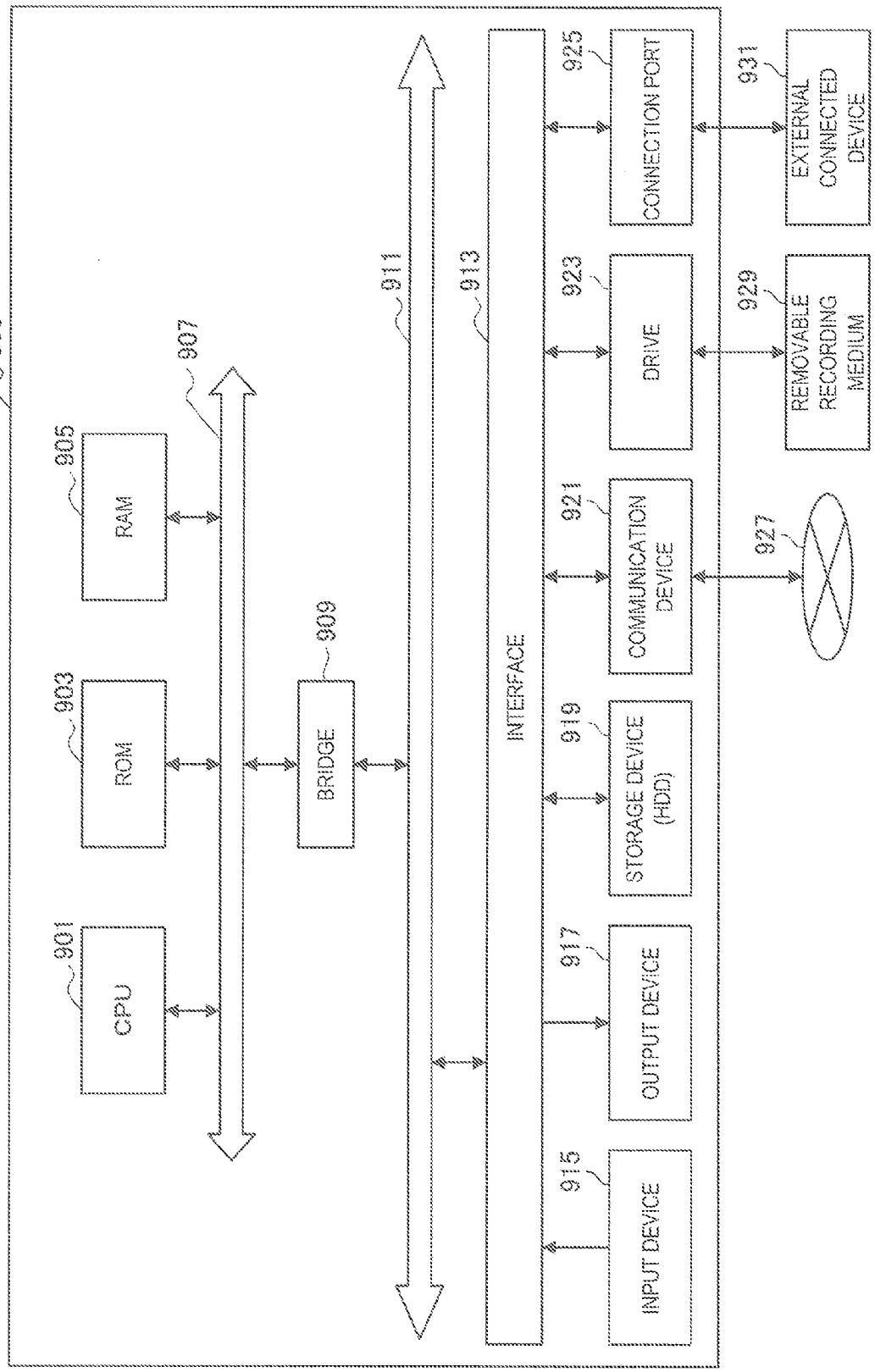
FIG. 25 is a block diagram illustrating a hardware configuration of an information processing apparatus according to the present embodiment.

The hardware configuration of an information processing apparatus on which such a program causing a solid state image sensor according to the first, second, or third embodiment to perform a series of operations can be installed will be described with reference to FIG. 25. FIG. 25 is a block diagram illustrating the hardware configuration of an information processing apparatus according to the present embodiment. An information processing apparatus 900 shown in FIG. 25 can realize an information processing apparatus on which a program causing, for example, the sensor controller 130 shown in FIG. 1, the imaging apparatus 40 shown in FIG. 24, and a solid state image sensor according to the first, second, or third embodiment to perform a series of operations.

The information processing apparatus 900 includes a CPU 901, a read only memory (ROM) 903, and a random access memory (RAM) 905. The information processing apparatus 900 also includes a host bus 907, a bridge 909, an external bus 911, an interface 913, an input device 915, an output device 917, a storage device 919, a communication device 921, a drive 923, and a connection port 925. Instead of the CPU 901 or together therewith, the information processing apparatus 900 may include a digital signal processor (DSP) or a processing circuit called application specific integrated circuit (ASIC).

The CPU 901 functions as an arithmetic processing unit and a control apparatus and controls an overall operation inside the information processing apparatus 900 or a portion thereof according to various programs recorded in the ROM 903, the RAM 905, the storage device 919, or a removable storage medium 929. The ROM 903 stores programs and operation parameters used by the CPU 901. The RAM 905 temporarily stores programs used for execution of the CPU 901 and parameters during execution thereof. The CPU 901, the ROM 903, and the RAM 905 are mutually connected by the host bus 907 configured by an internal bus such as a CPU bus. Further, the host bus 907 is connected to the external bus 911 such as a peripheral component interconnect/interface (PCI) bus via the bridge 909. In the present embodiment, the CPU 901 corresponds to, for example, a processor in the sensor controller 130 shown in FIG. 1, the control unit 415, the image processing unit 416, and the codec processing unit 418 shown in FIG. 24, The host bus 907 is connected to the external bus 911 such as a peripheral component interconnect/interface (PCI) bus via the bridge 909.

The input device 915 is configured by devices operated by the user, for example, a mouse, a keyboard, a touch panel, a button, a switch, or a lever. The input device 915 may be, for example, a remote control device (so-called remocon) using infrared rays or other radio waves or an external connected device 931 such as a mobile phone or PDA supporting the operation of the information processing apparatus 900. Further, the input device 915 is configured by an input control circuit or the like that generates an input signal based on, for example, information input by the user using the above operation means and outputs the input signal to the CPU 901. The user of the information processing apparatus 900 can input various kinds of data into the information processing apparatus 900 or instruct processing operations by operating the input device 915. In the present embodiment, for example, the user may input various kinds of information about operations of a solid state image sensor according to the first, second, or third embodiment or instructions into the information processing apparatus 900 via the input device 915. In the above application example, the input device 915 corresponds to, for example, the operation unit 414 of the imaging apparatus 40.

The output device 917 is configured as a device capable of notifying the user of acquired information visually or aurally. Such devices include a display device such as a CRT display device, a liquid crystal display device, a plasma display device, an EL display device, and a lamp, an audio output device such as a speaker and a headphone, a printer device and the like. The output device 917 outputs, for example, results obtained by various kinds of processing performed by the information processing apparatus 900. More specifically, the display device displays results obtained by various kinds of processing performed by the information processing apparatus 900 visually in various forms such as text, images, tables, and graphs. In the above application example, the display device corresponds to, for example, the display unit 417 of the imaging apparatus 40. On the other hand, the audio output device converts an audio signal including reproduced audio data and acoustic data into an analog signal and outputs the analog signal aurally.

The storage device 919 is a device for data storage configured as an example of a storage unit of the information processing apparatus 900. The storage device 919 is configured by, for example, a magnetic storage unit device such as an HDD, a semiconductor storage device, an optical storage device, or a magneto-optical storage device. The storage device 919 stores programs executed by the CPU 901, various kinds of data, and also various kinds of data acquired from outside. In the present embodiment, for example, various kinds of information about operations of a solid state image sensor according to the first, second, or third embodiment may be stored in the storage device 919. In the above application example, the storage device 919 corresponds to, for example, the recording unit 419 of the imaging apparatus 40.

The communication device 921 is, for example, a communication interface configured by communication devices to connect to a communication network 927. The communication device 921 is, for example, a communication card for a wire or wireless local area network (LAN), Bluetooth (registered trademark) or wireless USB (WUSB). The communication device 921 may also be a router for optical communication, a router for asymmetric digital subscriber line (ADSL), or a modem for various kinds of communication. The communication device 921 can transmit and receive signals and the like according to a predetermined protocol, for example, TCP/IP to/from, for example the Internet or other communication devices. The network 927 connected by the communication device 921 is configured by a network or the like connected by wire or wirelessly and may be, for example, the Internet, home LAN, infrared-ray communication, radio wave communication, or satellite communication. In the present embodiment, for example, various kinds of information about operations of a solid state image sensor according to the first, second, or third embodiment may be transmitted/received to/from other devices by the communication device 921 via the network 927.

The drive 923 is a reader writer for a storage medium and is attached to the information processing apparatus 900 internally or externally. The drive 923 reads information stored in the removable storage medium 929 such as an inserted magnetic disk, optical disk, magneto-optical disk, or semiconductor memory and outputs the information to the RAM 905. The drive 923 can also write information into the removable storage medium 929 such as an inserted magnetic disk, optical disk, magneto-optical disk, or semiconductor memory. The removable storage medium 929 is, for example, a DVD medium, an HD-DVD medium, a Blu-ray medium or the like. The removable storage medium 929 may also be CompactFlash (CF) (registered trademark), a flash memory, or a secure digital memory card (SD memory card) or the like. The removable storage medium 929 may also be, for example, an integrated circuit card (IC card) on which a non-contact IC chip is mounted or an electronic device. In the present embodiment, various kinds of information about operations of a solid state image sensor according to the first, second, or third embodiment may be read by the drive 923 from the removable storage medium 929 or written into the removable storage medium 929.

The connection port 925 is a port to directly connect a device to the information processing apparatus 900. Examples of the connection port 925 include a universal serial bus (USB) port, an IEEE1394 port, and a small computer system interface (SCSI) port. Other examples of the connection port 925 include an RS-232C port, an optical audio terminal, and a high-definition multimedia interface (HDMI) (registered trademark) port. By connecting the external connected device 931 to the connection port 925, the information processing apparatus 900 acquires various kinds of data directly from the external connected device 931 or provides various kinds of data to the external connected device 931. In the present embodiment, various kinds of information about operations of a solid state image sensor according to the first, second, or third embodiment may be acquired from the external connected device 931 via the connection port 925 or output to the external connected device 931.

In the foregoing, an example of the hardware configuration capable of realizing the function of the information processing apparatus 900 according to an embodiment of the present disclosure has been shown. Each of the above elements may be configured by using general members or by hardware dedicated to the function of each member. Therefore, the hardware configuration can be changed when appropriate in accordance with the technical level when the present embodiment is carried out.

A computer program to realize each function of the information processing apparatus 900 according to the present embodiment as described above can be produced and installed on PC or the like. Also, a computer readable recording medium in which such a computer program is stored can be provided. The recording medium is, for example, a magnetic disk, an optical disk, a magneto-optical disk, or a flash memory. The above computer program may also be delivered via, for example, a network without using the recording medium.

8. Supplementary Remarks

The preferred embodiments of the present disclosure have been described in detail above with reference to the appended drawings, but the technical scope of the present disclosure is not limited to such examples. A person skilled in the art may find various alterations and modifications within the scope of the appended claims, and it should be understood that they will naturally come under the technical scope of the present technology.

Effects described in this specification are only explanatory or illustrative and are not restrictive. That is, the technology according to the present disclosure can achieve, together with the above effects or instead of the above effects, other effects apparent to a person skilled in the art from the description of this specification.

For example, the above embodiment is described by taking a case when the solid state image sensor 10 is a CMOS image sensor as an example, but the first embodiment is not limited to such an example. The solid state image sensor 10 according to the first embodiment is at least an image sensor having the pixel array unit 110 in which the pixels 111 are arranged two-dimensionally and capable of controlling driving of any of the pixels 111 by specifying the address of the pixel row of the pixel array unit 110 and may be a solid state image sensor having other forms than the CMOS image sensor.

Also in the above embodiment, a case when the memory circuits holding V address signals in the address decoder circuit 151 are the latch circuits 152, 153 as SR latches is described, but the first embodiment is not limited to such an example. Memory circuits held by the address decoder circuit 151 according to the first embodiment at least has a function to hold a V address signal in response to a logical product of the V address signal and a memory input signal and may be memory circuits having other forms than the SR latch.

Also in the above embodiment, as an example of the case when the configuration and operation of the solid state image sensor 10 are suitably applied, a case when a photographing mode called a thinned-out read operation is applied is described as an example, but the first embodiment is not limited to such an example. The configuration and the operation of the solid state image sensor according to the first embodiment of the present disclosure is applicable to the configuration and the operation of the solid state image sensor in other photographing modes if an electronic shutter operation of predetermined pixels and a read operation of other pixels are both performed within a 1H period. As other photographing modes to which the first embodiment of the present technology can be applied include, for example, a photographing mode in which pixels are more reliably reset by performing an electronic shutter operation on pixels before a read operation thereon being performed to reduce an after-image and the like.

Additionally, the present technology may also be configured as below.

(1) A drive apparatus including:

an address decoder circuit provided in each pixel row of a pixel array inside a solid state image sensor, the address decoder circuit being configured to generate at least a control signal to cause, based on a V address signal to identify the pixel row in the pixel array, pixels of the pixel row corresponding to the V address signal to perform a read operation that reads accumulated charges from the relevant pixels or an electronic shutter operation that sweeps away the accumulated charges from the relevant pixels, wherein the V address signals of at least two mutually different systems are supplied to the address decoder circuit, and wherein at least the two mutually different address decoder circuits generate the control signal for at least the two mutually different pixel rows within one horizontal scanning period.

(2) The drive apparatus according to (1),
wherein the address decoder circuit includes a memory circuit that holds the V address signal in response to a logical product of the V address signal and a memory input signal, and
wherein the V address signal input into the memory circuit is a logical sum of the V address signals of the mutually different systems.

(3) The drive apparatus according to (2), further including:
a control unit configured to cause the memory circuit to hold the V address signal corresponding to the pixel row caused to perform the read operation or the electronic shutter operation by inputting the V address signal and the memory input signal into the address decoder circuit in predetermined timing.

(4) The drive apparatus according to (3),
wherein the memory input signal includes a read memory signal to cause the memory circuit to hold the V address signal that identifies the pixel row for which the read operation is performed and an electronic shutter memory signal to cause the memory circuit to hold the V address signal that identifies the pixel row for which the electronic shutter operation is performed, and
wherein the control unit causes the address decoder circuit to generate the control signal to cause the pixels of the pixel row identified by the V address signal to perform the read operation or the electronic shutter operation by inputting one of the read memory signal and the electronic shutter memory signal into the address decoder circuit together with the V address signal.

(5) The drive apparatus according to any one of (2) to (4),
wherein the address decoder circuit detects input of the memory input signal during a rise or a fall of the memory input signal.

(6) The drive apparatus according to (5),
wherein the memory circuit
generates the control signal to cause the pixels of the pixel row corresponding to the V address signal held when one of the rise and the fall of the memory input signal is detected to perform the read operation, and
generates the control signal to cause the pixels of the pixel row corresponding to the V address signal held when the other of the rise and the fall of the memory input signal is detected to perform the electronic shutter operation.

(7) The drive apparatus according to any one of (1) to (6), further including:
a pixel timing drive circuit causing the pixels to perform the read operation or the electronic shutter operation by generating a drive signal to drive the pixels of the pixel row identified by the V address signal based on the control signal.

(8) The drive apparatus according to (7), further including:
a control unit causing the pixel timing drive circuit to generate the drive signal in predetermined timing by inputting a pixel drive pulse that controls timing to drive transistors inside the pixel into the pixel timing drive circuit.

(9) The drive apparatus according to any one of (2) to (6),
wherein the memory circuit is an SR latch circuit, and
wherein the memory input signal is a latch set signal applied to an input terminal on a set side of the SR latch circuit.

(10) The drive apparatus according to any one of (1) to (9),
wherein the solid state image sensor is a CMOS image sensor.

(11) A drive method including:
generating a control signal for at least two mutually different pixel rows within one horizontal scanning period by at least two mutually different address decoder circuits by V address signals of at least two mutually different systems being supplied to the address decoder circuit provided in each of the pixel rows of a pixel array inside a solid state image sensor to generate the control signal to cause, based on the V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels.

(12) An electronic device including:
a solid state image sensor including a pixel array in which a plurality of pixels that receive light from a subject and outputs a pixel signal in accordance with the received light are arranged;
an optical system configured to guide the light from the subject up to the solid state image sensor in a housing; and
an image processing unit configured to generate a captured image as an image of the subject based on the pixel signals output from the plurality of pixels,
wherein the solid state image sensor
includes an address decoder circuit provided in each pixel row of the pixel array to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels,
wherein the V address signals of at least two mutually different systems are supplied to the address decoder circuit, and
wherein at least the two mutually different address decoder circuits generate the control signal for at least the two mutually different pixel rows within one horizontal scanning period.

(13) A drive apparatus including:
an address decoder circuit provided in each pixel row of a pixel array inside a solid state image sensor to generate at least a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels,
wherein the address decoder circuit includes a memory circuit that holds the V address signal in response to a logical product of the V address signal and a memory input signal, and
wherein the address decoder circuit detects input of the memory input signal during a rise or a fall of the memory input signal.

(14) The drive apparatus according to (13),
wherein the memory circuit
generates the control signal to cause the pixels of the pixel row corresponding to the V address signal held when one of the rise and the fall of the memory input signal is detected to perform the read operation, and
generates the control signal to cause the pixels of the pixel row corresponding to the V address signal held when the other of the rise and the fall of the memory input signal is detected to perform the electronic shutter operation.

(15) The drive apparatus according to (13) or (14),
wherein the memory input signal is a signal of one system.
(16) The drive apparatus according to any one of (13) to (15), further including:
a control unit configured to cause the memory circuit to hold the V address signal corresponding to the pixel row caused to perform the read operation or the electronic shutter operation by inputting the V address signal and the memory input signal into the address decoder circuit in predetermined timing.
(17) The drive apparatus according to any one of (13) to (16),
wherein the V address signals of at least two mutually different systems are supplied to the address decoder circuit, and
wherein at least the two mutually different address decoder circuits generate the control signal for at least the two mutually different pixel rows within one horizontal scanning period.
(18) The drive apparatus according to (17),
wherein the V address signal input into the memory circuit is a logical sum of the V address signals of the mutually different systems.
(19) The drive apparatus according to any one of (13) to (18), further including:
a pixel timing drive circuit causing the pixels to perform the read operation or the electronic shutter operation by generating a drive signal to drive the pixels of the pixel row identified by the V address signal based on the control signal.
(20) The drive apparatus according to (7), further including:
a control unit causing the pixel timing drive circuit to generate the drive signal in predetermined timing by inputting a pixel drive pulse that controls timing to drive transistors inside the pixel into the pixel timing drive circuit.
(21) The drive apparatus according to any one of (13) to (20),
wherein the memory circuit is an SR latch circuit, and
wherein the memory input signal is a latch set signal input to a set terminal of the SR latch circuit.
(22) The drive apparatus according to any one of (13) to (21),
wherein the solid state image sensor is a CMOS image sensor.
(23) A drive method including:
detecting a memory input signal input into an address decoder circuit provided in each pixel row of a pixel array inside a solid state image sensor to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels to cause a memory circuit provided inside the address decoder circuit to hold the V address signal during at least one of a rise and a fall of the memory input signal,
wherein the memory circuit holds the V address signal in response to a logical product of the V address signal and the memory input signal.
(24) An electronic device including:
a solid state image sensor including a pixel array in which a plurality of pixels that receive light from a subject and outputs a pixel signal in accordance with the received light are arranged;
an optical system configured to guide the light from the subject up to the solid state image sensor in a housing; and
an image processing unit configured to generate a captured image as an image of the subject based on the pixel signals output from the plurality of pixels,
wherein the solid state image sensor
includes an address decoder circuit provided in each pixel row of the pixel array to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels,
wherein the address decoder circuit includes a memory circuit holding the V address signal in response to a logical product of the V address signal and a memory input signal, and
wherein the address decoder circuit detects input of the memory input signal during at least one of a rise and a fall of the memory input signal.
(25) A drive method including:
generating a control signal for at least two mutually different pixel rows within one horizontal scanning period by at least two mutually different address decoder circuits by V address signals of at least two mutually different systems being supplied to the address decoder circuit provided in each of the pixel rows of a pixel array inside a solid state image sensor to generate the control signal to cause, based on the V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels,
wherein the address decoder circuit detects input of the memory input signal during at least one of a rise and a fall of the memory input signal.
(26) An electronic device including:
a solid state image sensor including a pixel array in which a plurality of pixels that receive light from a subject and outputs a pixel signal in accordance with the received light are arranged;
an optical system configured to guide the light from the subject up to the solid state image sensor in a housing; and
an image processing unit configured to generate a captured image as an image of the subject based on the pixel signals output from the plurality of pixels,
wherein the solid state image sensor
includes an address decoder circuit provided in each pixel row of the pixel array to generate a control signal to cause, based on a V address signal to identify the pixel row in the pixel array, pixels of the pixel row corresponding to the V address signal to perform a read operation that reads accumulated charges from the relevant pixels or an electronic shutter operation that resets the accumulated charges from the relevant pixels,
wherein the V address signals of at least two mutually different systems are supplied to the address decoder circuit,
wherein at least the two mutually different address decoder circuits generate the control signal for at least the two mutually different pixel rows within one horizontal scanning period, and
wherein the address decoder circuit detects input of the memory input signal during at least one of a rise and a fall of the memory input signal.

What is claimed is:

1. A drive apparatus comprising:
an address decoder circuit provided for a pixel row of a pixel array inside an image sensor, the address decoder circuit being configured to generate a control signal to cause, based on a V address signal to identify the pixel row in the pixel array, pixels of the pixel row corresponding to the V address signal to perform a read operation that reads accumulated charges from the pixels of the pixel row or an electronic shutter operation that sweeps away accumulated charges from the pixels of the pixel row,
wherein V address signals from different address buses of at least two different systems are supplied to the address decoder circuit for the pixel row, and
wherein at least two different address decoder circuits generate control signals for two respective pixel rows corresponding to the at least two different systems within one horizontal scanning period.

2. The drive apparatus according to claim 1,
wherein the address decoder circuit for the pixel row includes a memory circuit that holds the V address signal in response to a logical product of the V address signal and a memory input signal, and
wherein the V address signal input into the memory circuit is a logical sum of the V address signals of the at least two different systems.

3. The drive apparatus according to claim 2, further comprising:
a control unit configured to cause the memory circuit to hold the V address signal corresponding to the pixel row to perform the read operation or the electronic shutter operation by inputting the V address signal and the memory input signal into the address decoder circuit at a predetermined timing.

4. The drive apparatus according to claim 3,
wherein the memory input signal includes a read memory signal to cause the memory circuit to hold the V address signal that identifies the pixel row for which the read operation is performed and an electronic shutter memory signal to cause the memory circuit to hold the V address signal that identifies the pixel row for which the electronic shutter operation is performed, and
wherein the control unit causes the address decoder circuit to generate the control signal to cause one or more pixels of the pixel row identified by the V address signal to perform the read operation or the electronic shutter operation by inputting one of the read memory signal and the electronic shutter memory signal into the address decoder circuit together with the V address signal.

5. The drive apparatus according to claim 2, wherein the address decoder circuit detects the memory input signal during a rise or a fall of the memory input signal.

6. The drive apparatus according to claim 5,
wherein the memory circuit:
generates the control signal to cause the pixels of the pixel row corresponding to the V address signal held to perform the read operation when one of the rise and the fall of the memory input signal is detected, and
generates the control signal to cause the pixels of the pixel row corresponding to the V address signal held to perform the electronic shutter operation when another of the rise and the fall of the memory input signal is detected.

7. The drive apparatus according to claim 2,
wherein the memory circuit is set-reset (SR) latch circuit, and
wherein the memory input signal is a latch set signal applied to an input terminal on a set side of the SR latch circuit.

8. The drive apparatus according to claim 1, further comprising:
a pixel timing drive circuit configured to cause the pixels to perform the read operation or the electronic shutter operation by generating a drive signal to drive the pixels of the pixel row identified by the V address signal based on the control signal.

9. The drive apparatus according to claim 8, further comprising:
a control unit configured to cause the pixel timing drive circuit to generate the drive signal at a predetermined timing by inputting a pixel drive pulse that controls a timing to drive transistors inside a pixel into the pixel timing drive circuit.

10. The drive apparatus according to claim 1, wherein the image sensor is a CMOS image sensor.

11. A drive method comprising:
generating control signals for at least two different pixel rows within one horizontal scanning period by at least two different address decoder circuits, wherein V address signals from different address buses of at least two different systems are supplied to each address decoder circuit provided for each of the pixel rows of a pixel array inside an image sensor to generate each control signal to cause, based on a V address signal to identify a pixel row in the pixel array, pixels of the pixel row corresponding to the V address signal to perform a read operation that reads accumulated charges from the pixels of the pixel row or an electronic shutter operation that resets accumulated charges from the pixels of the pixel row.

12. An electronic device comprising:
an image sensor including a pixel array in which a plurality of pixels are arranged;
an optical system configured to guide light from a subject to the image sensor in a housing; and
an image processing unit configured to generate a captured image as an image of the subject based on pixel signals output from the plurality of pixels,
wherein the image sensor includes an address decoder circuit provided for each pixel row of the pixel array, the address decoder circuit being configured to generate a control signal to cause, based on a V address signal to identify a pixel row in the pixel array, pixels of the pixel row corresponding to the V address signal to perform a read operation that reads accumulated charges from the pixels of the pixel row or an electronic shutter operation that resets accumulated charges from the pixels of the pixel row,
wherein V address signals from different address buses of at least two different systems are supplied to the address decoder circuit for each pixel row, and
wherein at least two different address decoder circuits generate control signals for two respective pixel rows corresponding to the at least two different systems within one horizontal scanning period.

13. A drive apparatus comprising:
an address decoder circuit provided in each pixel row of a pixel array inside an image sensor to generate a control signal to cause, based on a V address signal from an address bus to identify a pixel row in the pixel array and a V address signal from a different address bus, pixels of the pixel row corresponding to the V address signal from the address bus to perform a read operation that reads accumulated charges from the pixels of the pixel row or an electronic shutter operation that resets accumulated charges from the pixels of the pixel row, wherein the address decoder circuit includes a memory circuit that holds the V address signal from the address bus in response to a logical product of the V address signal from the address bus and a memory input signal, and wherein the address decoder circuit detects input of the memory input signal during a rise or a fall of the memory input signal.

14. The drive apparatus according to claim 13, wherein the memory circuit generates the control signal to cause the pixels of the pixel row corresponding to the V address signal held to perform the read operation when one of the rise and the fall of the memory input signal is detected, and generates the control signal to cause the pixels of the pixel row corresponding to the V address signal held to perform the electronic shutter operation when the another of the rise and the fall of the memory input signal is detected.

15. The drive apparatus according to claim 13, wherein the memory input signal is a signal of one system.

16. The drive apparatus according to claim 13, further comprising:

a control unit configured to cause the memory circuit to hold the V address signal from the address bus corresponding to the pixel row to perform the read operation or the electronic shutter operation by inputting the V address signal from the address bus and the memory input signal into the address decoder circuit at predetermined timing.

17. The drive apparatus according to claim 13, wherein the V address signal from the address bus is from a first system and the V address signal from the second different address bus is from a second different system, wherein the two V address signals are supplied to the address decoder circuit, and wherein at least two different address decoder circuits generate control signals for the two respective pixel rows within one horizontal scanning period.

18. The drive apparatus according to claim 17, wherein the V address signal input into the memory circuit is a logical sum of V address signals of the respective systems.

19. A drive method comprising:

detecting a memory input signal input into an address decoder circuit provided in each pixel row of a pixel array inside an image sensor to generate a control signal to cause, based on a V address signal from an address bus to identify a pixel row in the pixel array and a V address signal from a different address bus, pixels of the pixel row corresponding to the V address signal to perform a read operation that reads accumulated charges from the pixels of the pixel row or an electronic shutter operation that resets accumulated charges from the pixels of the pixel row to cause a memory circuit provided inside the address decoder circuit to hold the V address signal from the address bus during at least one of a rise and a fall of the memory input signal, wherein the memory circuit holds the V address signal from the address bus in response to a logical product of the V address signal from the address bus and the memory input signal.

20. An electronic device comprising:

an image sensor including a pixel array in which a plurality of pixels are arranged;

an optical system configured to guide light from a subject to the image sensor in a housing; and an image processing unit configured to generate a captured image as an image of the subject based on pixel signals output from the plurality of pixels, wherein the image sensor includes an address decoder circuit provided for each pixel row of the pixel array, the address decoder circuit being configured to generate a control signal to cause, based on a V address signal from an address bus to identify a pixel row in the pixel array and a V address signal from a different address bus, pixels of the pixel row corresponding to the V address signal from an address bus to perform a read operation that reads accumulated charges from the pixels of the pixel row or an electronic shutter operation that resets accumulated charges from the pixels of the pixel row, wherein the address decoder circuit includes a memory circuit holding the V address signal from an address bus in response to a logical product of the V address signal from an address bus and a memory input signal, and wherein the address decoder circuit detects input of the memory input signal during at least one of a rise and a fall of the memory input signal.

* * * * *